(12) United States Patent
Bertram et al.

(10) Patent No.: US 12,447,179 B2
(45) Date of Patent: Oct. 21, 2025

(54) COMPOSITIONS COMPRISING CELL-DELIVERED VESICLES AND USES THEREOF

(71) Applicant: ProKidney, Grand Cayman (KY)

(72) Inventors: Timothy A. Bertram, George Town (KY); Deepak Jain, Winston-Salem, NC (US)

(73) Assignee: PROKIDNEY, Grand Cayman (KY)

( * ) Notice: Subject to any disclaimer, the term of this patent is extended or adjusted under 35 U.S.C. 154(b) by 1106 days.

(21) Appl. No.: 17/271,469

(22) PCT Filed: Aug. 28, 2019

(86) PCT No.: PCT/US2019/048536
§ 371 (c)(1),
(2) Date: Feb. 25, 2021

(87) PCT Pub. No.: WO2020/047071
PCT Pub. Date: Mar. 5, 2020

(65) Prior Publication Data
US 2021/0386786 A1    Dec. 16, 2021

Related U.S. Application Data

(60) Provisional application No. 62/725,651, filed on Aug. 31, 2018.

(51) Int. Cl.
| A61K 35/22 | (2015.01) |
| C12N 5/071 | (2010.01) |
| G01N 33/50 | (2006.01) |
| G01N 33/68 | (2006.01) |

(52) U.S. Cl.
CPC .......... *A61K 35/22* (2013.01); *C12N 5/0687* (2013.01); *G01N 33/5076* (2013.01); *G01N 33/6803* (2013.01); *C12N 2501/11* (2013.01); *C12N 2501/12* (2013.01); *C12N 2502/256* (2013.01)

(58) Field of Classification Search
CPC ............ C12N 5/0687; C12N 2502/256; G01N 2800/52
See application file for complete search history.

(56) References Cited

U.S. PATENT DOCUMENTS

| 6,224,893 | B1 | 5/2001 | Langer et al. |
| 6,306,406 | B1 | 10/2001 | Deluca |
| 6,346,274 | B1 | 2/2002 | Koll et al. |
| 7,563,822 | B2 | 7/2009 | Koizumi et al. |
| 8,318,484 | B2 | 11/2012 | Presnell et al. |
| 9,724,367 | B2 | 8/2017 | Basu et al. |
| 10,077,442 | B2 * | 9/2018 | Bertram ............... C12Q 1/6883 |
| 2002/0051808 | A1 | 5/2002 | Deluca |
| 2002/0182254 | A1 | 12/2002 | Calias et al. |
| 2007/0276507 | A1 | 11/2007 | Bertram et al. |
| 2011/0053157 | A1 | 3/2011 | Skog et al. |
| 2013/0330364 | A1 | 12/2013 | Basu et al. |
| 2015/0246073 | A1 * | 9/2015 | Basu ..................... A61K 35/22 435/7.1 |
| 2016/0101133 | A1 | 4/2016 | Basu et al. |
| 2016/0244751 | A1 * | 8/2016 | Ilagan ................. C12N 5/0686 |
| 2017/0205398 | A1 | 7/2017 | Bruce et al. |
| 2017/0281684 | A1 | 10/2017 | Basu et al. |
| 2021/0238600 | A1 * | 8/2021 | Bertram ............... C12N 15/113 |

FOREIGN PATENT DOCUMENTS

| AU | 2017260660 A1 | 12/2018 |
| CN | 103154236 A | 6/2013 |
| CN | 104937095 A | 9/2015 |
| CN | 105378062 A | 3/2016 |
| EP | 3190177 A1 | 7/2017 |
| JP | 2013528375 A | 7/2013 |
| JP | 2014502261 A | 1/2014 |
| JP | 2016504017 A | 2/2016 |
| WO | 2010056328 A1 | 5/2010 |
| WO | 2010093925 A2 | 8/2010 |
| WO | 2011143499 A1 | 11/2011 |
| WO | 2014066699 A1 | 5/2014 |
| WO | 2018022108 A1 | 2/2018 |
| WO | 2018237170 A1 | 12/2018 |

OTHER PUBLICATIONS

Expert Rev Mol Diagn. 2015; 15(7):907-23. Epub May 6, 2015 (Year: 2015).*
Lin et al. (2018) "Hepatocellular Carcinoma Cell-Secreted Exosomal MicroRNA-210 Promotes Angiogenesis In Vitro and In Vivo", Molecular therapy-Nucleic acids, 11:243-252.
Bruno et al. (2017) "Renal Regenerative Potential of Different Extracellular Vesicle Populations Derived from Bone Marrow Mesenchymal Stromal Cells", Tissue Engineering, 23(21-22):1262-1273.
Nargesi et al. (2017) "Mesenchymal Stem Cell-derived Extracellular Vesicles for Renal Repair", Current gene therapy, 17(1):29-42 (24 Pages).
(2016) Principle of the MACSPlex Exosome Kit MACSPlex Analysis of Plasma—Derived Extracellular Vesicles Background, Miltenyi Biotec, 3 pages.
Krause et al. (2018) "Exosomes as Secondary Inductive Signals Involved in Kidney Organogenesis", Journal of Extracellular Vesicles, 1422675, 7(1):19 Pages.

(Continued)

*Primary Examiner* — Fereydoun G Sajjadi
*Assistant Examiner* — Joel D Levin
(74) *Attorney, Agent, or Firm* — Mueting Raasch Group

(57) ABSTRACT

Provided herein are, inter alia, extracellular products (e.g., vesicles such as microvesicles, e.g., exosomes) produced by renal cells (such as bioactive renal cells, e.g., selected renal cells). Methods of altering components (such as miRNAs or proteins) of vesicles produced by cells, as well as methods of producing vesicles comprising various compounds are also included. Also provided are diagnostic and treatment methods.

23 Claims, 19 Drawing Sheets

(56) References Cited

OTHER PUBLICATIONS

Franchi et al., "Intravascular Delivery of Biologics to the Rat Kidney," Journal of Visualized Experiments, Sep. 1, 2016, entire document esp p. 2 protocol, (4 pages).
Jingushi et al., "Extracellular vesicles isolated from human renal cell carcinoma tissues disrupt vascular endothelial cell morphology via azurocidin," Oct. 4, 2017, entire document esp abstract and p. 2 (41 pages).
Basu et al. (2011) "Functional Evaluation of Primary Renal Cell/biomaterial Neo-kidney Augment Prototypes for Renal Tissue Engineering", Cell Transplant, 20(11-12): 1771-1790.
Bonventre, Joseph V. (2003) "Dedifferentiation and Proliferation of Surviving Epithelial Cells in Acute Renal Failure", J Am Soc Nephrol, 14 Suppl 1:S55-S61.
Bruce et al. (2015) "Selected Renal Cells Modulate Disease Progression in Rodent Models of Chronic Kidney Disease via NF-κB and TGF-β1 pathways", Regen Med., 10(7):815-839.
Camussi et al. (2010) "Exosomes/microvesicles as a Mechanism of Cell-to-cell Communication", Kidney Int., 78(9):838-848.
Chen et al. (2010) "Mesenchymal Stem Cell Secretes Microparticles Enriched in Pre-microRNAs", Nucleic Acids Res., 38(1):215-224.
Deregibus et al. (2007) "Endothelial Progenitor Cell Derived Microvesicles Activate an Angiogenic Program in Endothelial Cells by a Horizontal Transfer of mRNA", Blood, 110(7):2440-2448(10 pages).
Dragovic et al. (2011) "Sizing and phenotyping of cellular vesicles using Nanoparticle Tracking Analysis", Nanomedicine, 7(6):780-788.
Dursun et al. (2009) "The Relationship Between Circulating Endothelial Microparticles and Arterial Stiffness and Atherosclerosis in Children With Chronic Kidney Disease", Nephrol Dial Transplant., 24(8):2511-2518.
Erdbrugger et al. (2016) "Extracellular Vesicles in Renal Diseases: More than Novel Biomarkers?", J Am Soc Nephrol., 27(1):12-26.
Genheimer et al. (2012) "Molecular Characterization of the Regenerative Response Induced by Intrarenal Transplantation of Selected Renal Cells in a Rodent Model of Chronic Kidney Disease", Cells Tissues Organs, 196(4):374-384.
Humphreys et al. (2008) "Intrinsic Epithelial Cells Repair the Kidney After Injury", Cell Stem Cell, 2(3):284-291.
Humphreys et al. (2011) "Repair of Injured Proximal Tubule Does Not Involve Specialized Progenitors", Proc Natl Acad Sci U S A., 108(22):9226-9231.
Kalra et al. (2013) "Comparative Proteomics Evaluation of Plasma Exosome Isolation Techniques and Assessment of the Stability of Exosomes in Normal Human Blood Plasma", Proteomics, 13(22):3354-3364.
Kowal et al. (2014) "Biogenesis and Secretion of Exosomes", Curr Opin Cell Biol., 29:116-125.
Krause et al. (2015) "Exosomes as Renal Inductive Signals in Health and Disease, and Their Application as Diagnostic Markers and Therapeutic Agents", Front Cell Dev Biol., 3:65 (13 pages).
Lamichhane et al. (2014) "Emerging Roles for Extracellular Vesicles in Tissue Engineering and Regenerative Medicine", Tissue Eng Part B Rev., 21(1):45-54 (39 pages).
Lane et al. (2015) "Analysis of Exosome Purification Methods Using a Model Liposome System and Tunable-resistive Pulse Sensing", Sci Rep., 5:7639 (7 pages).
Lotvall et al. (2014) "Minimal Experimental Requirements for Definition of Extracellular Vesicles and Their Functions: a Position Statement From the International Society for Extracellular Vesicles", J Extracell Vesicles, 3:26913 (7 pages).
Martinez et al. (2011) "Microparticles in Angiogenesis: Therapeutic Potential", Circ Res., 109(1):110-119.
Nieuwland et al. (2010) "Why Do Cells Release Vesicles?", Thromb Res., 125 Suppl 1:S49-S51.
Revenfeld et al. (2014) "Diagnostic and Prognostic Potential of Extracellular Vesicles in Peripheral Blood", Clin Ther., 36(6):830-846.
Sahoo et al. (2011) "Exosomes From Human CD34(+) Stem Cells Mediate Their Proangiogenic Paracrine Activity", Circ Res, 109(7):724-728.
Simons et al. (2009) "Exosomes—vesicular Carriers for Intercellular Communication", Curr Opin Cell Bio., 21(4):575-581.
Stoorvogel et al. (2002) "The Biogenesis and Functions of Exosomes", Traffic, 3(5):321-330.
Tauro et al. (2012) "Comparison of Ultracentrifugation, Density Gradient Separation, and Immunoaffinity Capture Methods for Isolating Human Colon Cancer Cell Line LIM1863-derived Exosomes", Methods, 56(2):293-304.
Vader et al. (2016) "Extracellular Vesicles for Drug Delivery", Adv Drug Deliv Rev., 106(Pt A): 148-156.
Van Der Pol et al. (2010) "Optical and Non-optical Methods for Detection and Characterization of Microparticles and Exosomes", J Thromb Haemost., 8(12):2596-2607.
Wang et al. (2016) "Mesenchymal Stem Cells Deliver Exogenous MicroRNA-let7c via Exosomes to Attenuate Renal Fibrosis", Mol Ther., 24(7):1290-1301 (48 pages).
Zhang et al. (2016) "Extracellular Vesicles in Diagnosis and Therapy of Kidney Diseases", Am J Physiol Renal Physiol., 311(5):F844-F851 (25 pages).
Zhou et al. (2008) "Urinary Exosomal Transcription Factors, a New Class of Biomarkers for Renal Disease", Kidney Int, 74(5):613-621.
Wang et al. (2017) "Unique Molecular Profile of Exosomes Derived from Primary Human Proximal Tubular Epithelial Cells Under Diseased Conditions", Journal of Extracellular Vesicles, 6(1):(Article 1314073)1-13.

* cited by examiner

FIG. 7A-C

COMPOSITIONS COMPRISING CELL-DELIVERED VESICLES AND USES THEREOF

CROSS REFERENCE TO RELATED APPLICATIONS

The present application is a national stage application, filed under 35 U.S.C. § 371 of International Application No. PCT/US19/48536, filed Aug. 28, 2019, which claims the benefit of U.S. Provisional Application 62/725,651, filed Aug. 31, 2018. The entire contents of these applications are incorporated herein by reference in their entirety.

BACKGROUND

The study of extracellular vesicles, most notably exosomes, has been quickly increasing. Multiple articles have been published regarding exosome biogenesis (Kowal et al., 2014, *Curr Opin Cell Biol.* 29C:116-125), their diagnostic and prognostic potential (Revenfeld et al., 2014, *Clin Ther.* 36(6):830-846), and potential therapeutic application in tissue engineering and regenerative medicine (Lamichhane et al., 2014, *Tissue Eng Part B Rev.*). These vectors of mRNAs, miRNAs, proteins, and lipid mediators are able to act on target cells facilitating cell-cell communication and the exchange of functional genetic information (Simons and Raposo, 2009, *Curr Opin Cell Biol.* 21(4):575-581; Stoorvogel et al., 2002, *Traffic* 3(5):321-330; Nieuwland and Sturk, 2010, *Thrombosis Research* 125(Supplement 1):S49-S51).

SUMMARY OF THE INVENTION

Provided herein are, inter alia, extracellular products (e.g., vesicles such as microvesicles, e.g., exosomes) produced by renal cells (such as bioactive renal cells, e.g., selected renal cells). In certain embodiments, such products are used to treat renal diseases such as chronic kidney disease. Methods of altering components (such as miRNAs or proteins) of vesicles produced by cells, as well as methods of producing vesicles comprising various compounds are also included. Also provided are diagnostic and treatment methods.

In an aspect, provided herein is a method of treating a renal disease in a subject. In certain embodiments, the method comprises administering to the subject an effective amount of isolated secreted renal cell vesicles, wherein the vesicles are administered by intravenous injection or by transcatheter delivery.

In an aspect, provided herein is a method for detecting at least one compound in a vesicle. In certain embodiments, the method comprises obtaining the vesicle and detecting whether the at least one compound is in the vesicle, wherein (i) the at least one compound is a protein, and the protein is CD9, CD81, CD146, CD326, CD40, CD42a, CD44, CD49e, and/or SSEA-4; (ii) the at least one compound comprises miRNAs, wherein the miRNAs include at least two of miR-145, miR-22, miR-7, miR-10a, miR-143, and/or let7b; and/or (iii) the at least one compound is not expressed or produced by renal cells in a native kidney.

In an aspect, provided herein is a method for monitoring treatment with a bioactive renal cell population in a subject who has been administered the bioactive renal cell population. In certain embodiments, the method comprises detecting whether at least one compound is present in a vesicle from the subject according to a method disclosed herein.

In an aspect, provided herein is a method of identifying whether a vesicle is regenerative. In certain embodiments, the method comprises (i) detecting whether a protein and/or miRNAs are in the vesicle according to a method disclosed herein; and (ii) identifying the vesicle as regenerative if the protein and/or miRNAs are detected in the vesicle.

In an aspect, provided herein is a method of detecting the level of at least one miRNA in vesicles from a bioactive renal cell population. In certain embodiments, the method comprises (i) detecting whether one or more of the following miRNA molecules is increased in the vesicles compared to a control: miR-1248, miR-3168, miR-7113-5p, miR-758-3p, miR-937-3p, miR-4455, miR-4521, miR-203a-3p, miR-22-3p, miR-574-3p, miR-181b-5p, miR-1260b, and/or miR-181b-5p; and (ii) detecting whether one or more of the following miRNA molecules is decreased in the vesicles compared to a control: miR-1-3p, miR-1-3p, miR-143-3p, miR-150-5p, miR-509-3p, miR-653-5p, miR-204-5p, miR-192-5p, and/or miR-363-3p. In certain embodiments, the miRNA is mammalian miRNA such as human miRNA.

In an aspect, provided herein is a method of treating a renal disease in a subject. In certain embodiments, the method comprises a administering to the subject an effective amount of vesicles from a vesicle preparation, wherein a vesicle from the vesicle preparation has been identified as regenerative according to a method disclosed herein.

In certain embodiments, provided herein is a method of treating a renal disease in a subject, the method comprising administering to the subject an effective amount of a composition comprising a bioactive renal cell population supplemented with renal cell vesicles that have not been secreted by the bioactive renal cell population.

In an aspect, provided herein is a method of altering the level of at least one miRNA and/or protein in vesicles produced by a population of bioactive renal cells, the method comprising culturing the population under hypoxic conditions.

In an aspect, provided herein is a vesicle comprising a compound that is not produced by renal cells in a native kidney.

In an aspect, provided herein is a composition comprising the vesicle disclosed herein and a pharmaceutically acceptable carrier.

In an aspect, provided herein is a composition comprising a renal cell vesicle and a non-renal cell vesicle.

In an aspect, provided herein is a composition comprising a vesicle produced by a primary renal cell and a vesicle produced by a selected renal cell.

In an aspect, provided herein is a method of treating a renal disease in a subject. In certain embodiments, the method comprises administering to the subject an effective amount of the composition disclosed herein.

In an aspect, provided herein is a method of producing vesicles (e.g., microvesicles such as an exosomes) from cells, wherein the vesicles comprise a compound that is not produced by the cells. In certain embodiments, the method comprises isolating the vesicles from a cell culture supernatant, wherein the cell culture supernatant is from a culture of cells that were contacted with (e.g., incubated in media containing) the compound. In certain embodiments, the method comprises isolating the vesicles (e.g., microvesicles such as exosomes) from a cell culture supernatant, and then incorporating the compound into the vesicles by permeabilizing the exosome membranes to facilitate entry of the compound (e.g., by sonication, lipofection, electroporation etc.).

In an aspect, provided herein is a method of producing a renal exosome, wherein the exosome comprises a compound that is not produced by renal cells in a native kidney. In certain embodiments, the method comprises isolating a vesicle from a renal cell culture supernatant, wherein the renal cell culture supernatant is from a culture of renal cells comprising a bioactive renal cell population that has been contacted with the compound.

DETAILED DESCRIPTION OF THE INVENTION

Figure 1:
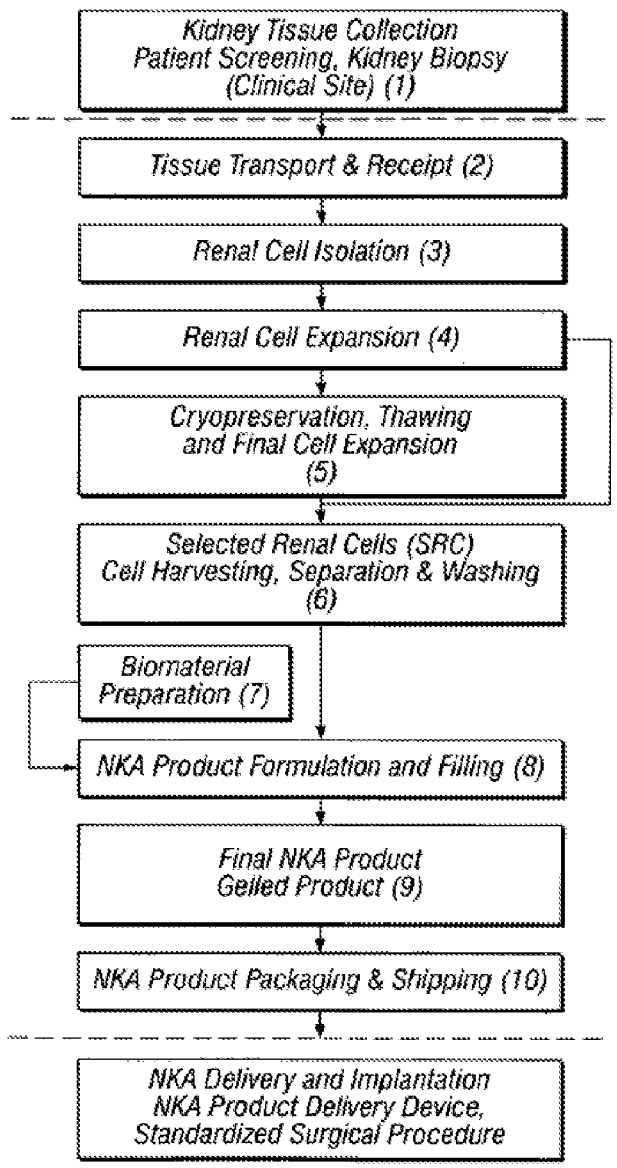
FIG. 1: Flow diagram of a non-limiting example of an overall NKA manufacturing process.

Provided herein are, inter alia, extracellular products (e.g., vesicles such as microvesicles, e.g., exosomes) produced by renal cells (such as bioactive renal cells, e.g., selected renal cells).

All references cited throughout the disclosure are expressly incorporated by reference herein in their entirety. In the event that one or more of the incorporated literature, patents, and similar materials differs from or contradicts this application, including but not limited to defined terms, term usage, described techniques, or the like, this application controls.

Definitions

Unless defined otherwise, technical and scientific terms used herein have the same meaning as commonly understood by one of ordinary skill in the art to which this invention belongs. Principles of Tissue Engineering, 3rd Ed. (Edited by R Lanza, R Langer, & J Vacanti), 2007 provides one skilled in the art with a general guide to many of the terms used in the present application. One skilled in the art will recognize many methods and materials similar or equivalent to those described herein, which could be used in the practice of the present invention. Indeed, the present invention is in no way limited to the methods and materials described.

As used herein, the singular forms "a," "an," and "the" are intended to include the plural forms as well, unless the context clearly indicates otherwise. As used herein, the term "and/or" includes any and all combinations of one or more of the associated listed items.

In this disclosure, "comprises," "comprising," "containing," and "having" and the like can have the meaning ascribed to them in U.S. Patent law and can mean "includes," "including," and the like. "Consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

As used herein, the term "about" in the context of a numerical value or range means ±10% of the numerical value or range recited or claimed, unless the context requires a more limited range.

The term "cell population" as used herein refers to a number of cells obtained by isolation directly from a suitable tissue source, usually from a mammal. In certain embodiments, the isolated cell population may be subsequently cultured in vitro. Those of ordinary skill in the art will appreciate that various methods for isolating and culturing cell populations for use with the present disclosure and various numbers of cells in a cell population that are suitable for use in the present disclosure. In certain embodiments, a cell population may be an unfractionated, heterogeneous cell population or an enriched homogeneous cell population derived from an organ or tissue, e.g., the kidney. In certain embodiments, a heterogeneous cell population may be isolated from a tissue biopsy or from whole organ tissue. In certain embodiments, the heterogeneous cell population may be derived from in vitro cultures of mammalian cells, established from tissue biopsies or whole organ tissue. An unfractionated heterogeneous cell population may also be referred to as a non-enriched cell population. In certain embodiments, the cell populations contain bioactive cells. Homogenous cell populations comprise a greater proportion of cells of the same cell type, sharing a common phenotype, or having similar physical properties, as compared to an unfractionated, heterogeneous cell population. In certain embodiments, a homogeneous cell population may be isolated, extracted, or enriched from heterogeneous kidney cell population. In certain embodiments, an enriched cell population is obtained as a cell fraction using separation by centrifugation across a density boundary, barrier, or interface of a heterogeneous cell suspension. In certain embodiments, an enriched cell population is obtained as a cell fraction using continuous or discontinuous (single step or multi-step) density gradient separation of a heterogeneous cell suspension. In certain embodiments, a cell population may comprise 1, 2, 3, 4, or more types of kidney cells. In certain embodiments, a homogenous or heterogeneous cell population sourced from the kidney is combined with a homogenous or heterogeneous cell population sourced from a tissue or organ other than the kidney, without further limitation.

As used herein, the term "bioactive" means "possessing biological activity," such as a pharmacological or a therapeutic activity. In certain embodiments, the bioactivity is enhancement of renal function and/or effect on renal homeostasis. In certain embodiments, the biological activity is, without limitation, analgesic; antiviral; anti-inflammatory; antineoplastic; immune stimulating; immune modulating; enhancement of cell viability, antioxidation, oxygen carrier, cell recruitment, cell attachment, immunosuppressant, angiogenesis, wound healing activity, mobilization of host stem or progenitor cells, cellular proliferation, stimulation of cell migration to injury sites, amelioration of cell and tissue fibrosis, interference with the epithelial-mesenchymal signaling cascade, secretion of cytokines, growth factors, proteins, nucleic acids, exosomes, microvesicles or any combination thereof.

The term "bioactive renal cells" or "BRCs" as used herein refers to renal cells having one or more of the following properties when administered into the kidney of a subject: capability to reduce (e.g., slow or halt) the worsening or progression of chronic kidney disease or a symptom thereof, capability to enhance renal function, capability to affect (improve) renal homeostasis, and capability to promote healing, repair and/or regeneration of renal tissue or kidney. In certain embodiments, microvesicles from BRCs and/or BRCs may be administered to a patient, wherein the haplotype of the BRCs is different than the patient's haplotype. In certain embodiments, the BRCs are cells capable of enhancing renal function, affect (improve) renal homeostasis, and/or promote healing, repair and/or regeneration of renal tissue or kidney without immunologic rejection. In certain embodiments, these cells may include functional tubular cells (e.g., based on improvements in creatinine excretion and protein retention), glomerular cells (e.g., based on improvement in protein retention), vascular cells, and/or other cells of the corticomedullary junction. In certain embodiments, the BRCs have a regenerative effect on the kidney. In certain embodiments, BRCs comprise, consist essentially of, or consist of selected renal cells (SRCs). In certain embodiments, BRCs are SRCs. In certain embodiments, BRCs are obtained from isolation and expansion of renal cells from kidney tissue. In certain embodiments, BRCs are obtained from isolation and expansion of renal cells from kidney tissue using methods that select for bioactive cells (e.g., cells with regenerative capacity).

In certain embodiments, SRCs are cells obtained from isolation and expansion of renal cells from a suitable renal tissue source, wherein the SRCs contain a greater percentage of one or more cell types and lack or have a lower percentage of one or more other cell types, as compared to a starting kidney cell population. In certain embodiments, the SRCs contain an increased proportion of BRCs compared to a starting kidney cell population. In certain embodiments, an SRC population is an isolated population of kidney cells enriched for specific bioactive components and/or cell types and/or depleted of specific inactive and/or undesired components or cell types for use in the treatment of kidney disease, i.e., providing stabilization and/or improvement and/or regeneration of kidney function. In certain embodiments, microvesicles from SRCs and/or SRCs may be administered to a patient, wherein the hyplotyle of the SRCs is different than the patient's haplotype. In certain embodiments, the SRCs are capable of providing stabilization and/or improvement and/or regeneration of kidney function. SRCs provide superior therapeutic and regenerative outcomes as compared with a starting population. In certain embodiments, SRCs are obtained from the patient's renal cortical tissue via a kidney biopsy. In certain embodiments, SRCs are selected (e.g., by MACS or FACS) based on their expression of one or more markers. In certain embodiments, SRCs are depleted (e.g., by MACS or FACS) of one or more cell types based on the expression of one or more markers on the cell types. In certain embodiments, depletion or selection of cells comprises bead/antibody coupling to pull out cells with certain proteins on their cell surface. In certain embodiments, SRCs are selected from a population of bioactive renal cells. In certain embodiments, SRCs are selected by density gradient separation of expanded renal cells. In certain embodiments, SRCs are selected by separation of expanded renal cells by centrifugation across a density boundary, barrier, or interface, or single step discontinuous step gradient separation. In certain embodiments, SRCs are selected by continuous or discontinuous density gradient separation of expanded renal cells that have been cultured under hypoxic conditions. In certain embodiments, SRCs are selected by density gradient separation of expanded renal cells that have been cultured under hypoxic conditions for at least about 8, 12, 16, 20, or 24 hours. In certain embodiments, SRCs are selected by separation by centrifugation across a density boundary, barrier, or interface of expanded renal cells that have been cultured under hypoxic conditions. In certain embodiments, SRCs are selected by separation of expanded renal cells that have been cultured under hypoxic conditions for at least about 8, 12, 16, 20, or 24 hours by centrifugation across a density boundary, barrier, or interface (e.g., single-step discontinuous density gradient separation). In certain embodiments, SRCs are composed primarily of renal tubular cells. In certain embodiments, other parenchymal (e.g., vascular) and stromal (e.g., collecting duct) cells may be present in SRCs. In certain embodiments, less than about 10%, 9%, 8%, 7%, 6%, 5%, 4%, 3%, 2%, or 1% of the cells in a population of SRCs are vascular cells. In certain embodiments, less than about 10%, 9%, 8%, 7%, 6%, 5%, 4%, 3%, 2%, or 1% of the cells in a population of SRCs are collecting duct cells. In certain embodiments, less than about 10%, 9%, 8%, 7%, 6%, 5%, 4%, 3%, 2%, or 1% of the cells in a population of SRCs are vascular or collecting duct cells. Methods to obtain SRCs are disclosed, for example, in Example 1 herein, Presnell et al. WO/2010/056328, Ilagan et al. PCT/US2011/036347, and Jain et al. PCT/US2016/044866.

The term "native organ" shall mean the organ of a living subject. The subject may be healthy or unhealthy. An unhealthy subject may have a disease associated with that particular organ.

The term "native kidney" shall mean the kidney of a living subject. The subject may be healthy or unhealthy. An unhealthy subject may have a kidney disease.

The term "regenerative effect" shall mean an effect which provides a benefit to a native organ, such as the kidney. The effect may include, without limitation, a reduction in the degree of injury to a native organ or an improvement in, restoration of, or stabilization of a native organ function or structure. Renal injury may be in the form of fibrosis, inflammation, glomerular hypertrophy, atrophy, etc. and related to a disease associated with the native organ in the subject.

An "enriched" cell population or preparation refers to a cell population derived from a starting cell population (e.g., an unfractionated, heterogeneous cell population from an organ such as a kidney) that contains a greater percentage of a specific cell type than the percentage of that cell type in the starting population. For example, a starting kidney cell population can be enriched for a first, a second, a third, a fourth, a fifth, and so on, cell population of interest. As used herein, the terms "cell population", "cell preparation" and "cell phenotype" are used interchangeably.

The term "hypoxic" culture conditions as used herein refers to culture conditions in which cells are subjected to a reduction in available oxygen levels in the culture system relative to standard culture conditions in which cells are cultured at atmospheric oxygen levels (about 21%). In certain embodiments, a hypoxic culture condition in which the level of oxygen in the culture system is less than 15, 14, 13, 12, 11, 10, 9, 8, 7, 6, 5, 4, 3, 2, or 1%.

The term "biomaterial" as used herein refers to a natural or synthetic biocompatible material that is suitable for introduction into living tissue supporting the selected bioactive cells in a viable state. A natural biomaterial is a material that is made by or originates from a living system. Synthetic biomaterials are materials which are not made by or do not originate directly from a living system, but are instead synthesized or composed by specific chemical procedures and protocols well known to those of ordinary skill in the art. The biomaterials disclosed herein may be a combination of natural and synthetic biocompatible materials. As used herein, biomaterials include, for example, polymeric matrices and scaffolds. Those of ordinary skill in the art will appreciate that the biomaterial(s) may be configured in various forms, for example, as porous foam, gels, liquids, beads, solids, and may comprise one or more natural or synthetic biocompatible materials. In certain embodiments, the biomaterial is the liquid form of a solution that is capable of becoming a hydrogel.

The term "hydrogel" is used herein to refer to a substance formed when an organic polymer (natural or synthetic) is cross-linked via covalent, ionic, or hydrogen bonds to create a three-dimensional structure (e.g., an open-lattice structure) that entraps water molecules to form a gel. Examples of materials which can be used to form a hydrogel include polysaccharides such as alginate, polyphosphazines, and polyacrylates, which are crosslinked tonically, or block copolymers such as Pluronics™ or Tetronics™, polyethylene oxide-polypropylene glycol block copolymers which are crosslinked by temperature or pH, respectively. In certain embodiments, a hydrogel is a biodegradable gelatin-based hydrogel.

In certain embodiments, biomaterials include, for example, extracellular matrix derived from an existing kidney of human or animal origin, wherein the native cell population has been eliminated through application of detergents and/or other chemical agents known to those of ordinary skill in the art. In certain embodiments, the biomaterial is a liquid form of a solution that is capable of becoming a hydrogel and is layered with or without certain cell populations by application of three-dimensional bioprinting methodologies known to those skilled in the art. In certain embodiments, the biomaterial is configured to mimic the three dimensional fractal organization of decellurized kidney.

The term "modified release" or the equivalent terms "controlled release", "delayed release", or "slow release" refer to formulations that release an active agent, such as bioactive cells, over time or at more than one point in time following administration to an individual. Modified release of an active agent, which can occur over a range of desired times, e.g., minutes, hours, days, weeks, or longer, depending upon the formulation, is in contrast to formulations in which substantially the entire dosage unit is available immediately after administration. In certain embodiments, for tissue engineering and regenerative medicine applications modified release formulations provide for the release of an active agent at multiple time points following local administration (e.g., administration of an active agent directly to a solid organ). For example, a modified release formulation of bioactive cells may provide an initial release of cells immediately at the time of administration and a later, second release of cells at a later time. In certain embodiments, the time delay for the second release of an active agent may be minutes, hours, or days after the initial administration. In general, the period of time for delay of release corresponds to the period of time that it takes for a biomaterial carrier of the active agent to lose it structural integrity. The delayed release of an active agent begins as soon as such integrity begins to degrade and is completed by the time integrity fails completely. Those of ordinary skill in the art will appreciate other suitable mechanisms of release.

The term "ambient temperature" refers to the temperature at which the formulations of the present disclosure will be administered to a subject. Generally, the ambient temperature is the temperature of a temperature-controlled environment. Ambient temperature ranges from about 18° C. to about 30° C. In certain embodiments, ambient temperature is about 18° C., about 19° C., about 20° C., about 21° C., about 22° C., about 23° C., about 24° C., about 25° C., about 26° C., about 27° C., about 28° C., about 29° C., or about 30° C.

Non-limiting examples of kidney diseases include disorders associated with any stage or degree of acute or chronic renal failure that results in a loss of the kidney's ability to perform the function of blood filtration and elimination of excess fluid, electrolytes, and wastes from the blood. In certain embodiments, kidney disease may also include endocrine dysfunctions such as anemia (erythropoietin-deficiency), and mineral imbalance (Vitamin D deficiency). Kidney disease may originate in the kidney or may be secondary to a variety of conditions, including (but not limited to) heart failure, hypertension, diabetes, autoimmune disease, or liver disease. Kidney disease may be a condition of chronic renal failure that develops after an acute injury to the kidney. For example, injury to the kidney by ischemia and/or exposure to toxicants may cause acute renal failure; incomplete recovery after acute kidney injury may lead to the development of chronic renal failure.

The term "treatment" refers to both therapeutic treatment and prophylactic or preventative measures for kidney disease, anemia, tubular transport deficiency, or glomerular filtration deficiency wherein the object is to reverse, prevent or slow down (e.g., reduce the worsening of) the targeted disorder. Those in need of treatment include those already having a kidney disease, anemia, tubular transport deficiency, or glomerular filtration deficiency as well as those prone to or at risk of having a kidney disease, anemia, tubular transport deficiency, or glomerular filtration deficiency or those in whom the kidney disease, anemia, tubular transport deficiency, or glomerular filtration deficiency is to be prevented. The term "treatment" as used herein includes the stabilization and/or improvement of kidney function.

In certain embodiments, "in vivo contacting" a native organ with an active agent (such as an enriched population of cells and/or a product thereof) refers to direct contact in vivo between the active agent and the native organ. For example, products secreted by an enriched population of renal cells may in vivo contact a native kidney (alone or together with the cells, e.g., in a construct). In certain embodiments, the direct in vivo contacting may be paracrine, endocrine, or juxtacrine in nature. In certain embodiments, the products secreted may be a heterogeneous population of different products described herein.

In certain embodiments, provided herein is a "construct" or "formulation" comprising one or more cell populations, and/or one or more cell products (such as microvesicles, e.g., exosomes) deposited on or in a surface of a biomaterial (such as a scaffold or matrix made up of one or more synthetic or naturally-occurring biocompatible materials). In certain embodiments, the one or more cell populations may be coated with, deposited on, embedded in, attached to, seeded, or entrapped in a biomaterial made up of one or more synthetic or naturally-occurring biocompatible biomaterials, polymers, proteins, or peptides. In certain embodiments, the naturally occurring biomaterial is decellularized kidney of human or animal origin. In certain embodiments, the biomaterial has been structurally engineered through three dimensional bioprinting. In certain embodiments, one or more cell populations and/or cell products may be combined with a biomaterial or scaffold or matrix in vitro or in vivo. In certain embodiments, one or more biomaterials used to generate the construct or formulation may be selected to direct, facilitate, or permit dispersion and/or integration of the cellular components of the construct with the endogenous host tissue, or to direct, facilitate, or permit the survival, engraftment, tolerance, or functional performance of the cellular components of the construct or formulation. In certain embodiments, the one or more biocompatible materials used to form the scaffold/biomaterial is selected to direct, facilitate, or permit the formation of multicellular, three-dimensional, organization of at least one of the cell populations deposited thereon. In certain embodiments, the biomaterials direct, promote, or facilitate the assembly of defined three dimensional cellular aggregates or organoids that recapitulate aspects of native kidney tissue, including but not limited to organizational polarity. In certain embodiments, the biomaterials direct the assembly of defined tubular structures that recapitulate aspects of native kidney tissue, including lumens. In certain embodiments, the biomaterials promote or facilitate the secretion of proteins, nucleic acids and microvesicles from the cell populations. In certain embodiments, the one or more biomaterials used to generate the construct may also be selected to mimic or recapitulate aspects of the specific three dimensional organization or environmental niche within a native kidney or renal parenchyma representing the original biological environment from which a cell populations was derived. Without being bound by any scientific theory, recreation of the original biological niche from which these cell populations were sourced is believed to further promote or facilitate cell viability and potency.

The term "cellular aggregate" or "spheroid" refers to an aggregate or assembly of cells cultured to allow 3D growth as opposed to growth as a monolayer. It is noted that the term "spheroid" does not imply that the aggregate is a geometric sphere. In certain embodiments, the aggregate may be highly organized with a well defined morphology and polarity or it may be an unorganized mass; it may include a single cell type or more than one cell type. In certain embodiments, the cells may be primary isolates, or a permanent cell line, or a combination of the two. Included in this definition are organoids and organotypic cultures. In certain embodiments, the spheroids (e.g., cellular aggregates or organoids) are formed in a spinner flask. In certain embodiments, the spheroids (e.g., cellular aggregates or organoids) are formed in a 3-dimensional matrix.

The term "Neo-Kidney Augment (NKA)" refers to a bioactive cell formulation which is an injectable product composed of SRCs formulated in a biomaterial comprised of a gelatin-based hydrogel. The term "Advance Cell Therapy (ACT)" is also used in reference to treatment with NKA. In certain embodiments, NKA is an injectable product comprising an immune-compatible renal cell population (e.g., immune-compatible SRCs) formulated in a biomaterial comprised of a gelatin-based hydrogel. In certain embodiments, NKA is an injectable product composed of genomically modified immunoprivilaged, homologous SRCs that are incapable of immune rejection formulated in a biomaterial comprised of a gelatin-based hydrogel.

The term "subject" shall mean any single human subject, including a patient, eligible for treatment, who is experiencing or has experienced one or more signs, symptoms, or other indicators of a kidney disease. Such subjects include without limitation subjects who are newly diagnosed or previously diagnosed and are now experiencing a recurrence or relapse, or are at risk for a kidney disease, no matter the cause. The subject may have been previously treated for a kidney disease, or not so treated.

The term "patient" refers to any animal, more preferably a mammal (including such non-human animals as, for example, dogs, cats, horses, rabbits, zoo animals, cows, pigs, sheep, and non-human primates) for which treatment is desired. Most preferably, the patient is a human.

The term "sample" or "patient sample" or "biological sample" shall generally mean any biological sample obtained from a subject or patient, body fluid, body tissue, cell line, tissue culture, or other source. The term includes tissue biopsies such as, for example, kidney biopsies. The term includes cultured cells such as, for example, cultured mammalian kidney cells. Methods for obtaining tissue biopsies and cultured cells from mammals are well known in the art. Depending on context, if the term "sample" is used alone it shall still mean that the "sample" is a "biological sample" or "patient sample", i.e., the terms are used interchangeably.

The term "test sample" refers to a sample from a subject that has been treated by a method of the present disclosure. The test sample may originate from various sources in the mammalian subject including, without limitation, blood, semen, serum, urine, bone marrow, mucosa, tissue, etc.

The term "control" or "control sample" refers a negative or positive control in which a negative or positive result is expected to help correlate a result in the test sample. Controls that are suitable for the present disclosure include, without limitation, a sample known to exhibit indicators characteristic of normal kidney function, a sample obtained from a subject known not to have kidney disease, and a sample obtained from a subject known to have kidney disease. In certain embodiments, the control may be a sample obtained from a subject prior to being treated by a method of the present disclosure. In certain embodiments, a suitable control may be a test sample obtained from a subject known to have any type or stage of kidney disease, and a sample from a subject known not to have any type or stage of kidney disease. A control may be a normal healthy matched control. Those of skill in the art will appreciate other controls suitable for use in the present disclosure.

"Regeneration prognosis", "regenerative prognosis", or "prognostic for regeneration" generally refers to a forecast or prediction of the probable regenerative course or outcome of the administration or implantation of a cell population, cell product or construct described herein. For a regeneration prognosis, the forecast or prediction may be informed by one or more of the following: improvement of a functional organ (e.g., the kidney) after implantation or administration, development of a functional kidney after implantation or administration, development of improved kidney function or capacity after implantation or administration, and expression of certain markers by the native kidney following implantation or administration.

"Regenerated organ" refers to a native organ after implantation or administration of a cell population, cell product, or construct as described herein. In certain embodiments, the regenerated organ is characterized by various indicators including, without limitation, development of function or capacity in the native organ, improvement of function or capacity in the native organ, the amelioration of certain markers and physiological indices associated with disease, and/or the expression of certain markers in the native organ. Those of ordinary skill in the art will appreciate that other indicators may be suitable for characterizing a regenerated organ.

"Regenerated kidney" refers to a native kidney after implantation or administration of a cell population, admixture, or construct as described herein. In certain embodiments, the generated kidney is characterized by various indicators including, without limitation, development of function or capacity in the native kidney, improvement of function or capacity in the native kidney, the amelioration of certain markers and physiological indices associated with renal disease and the expression of certain markers in the native kidney. Those of ordinary skill in the art will appreciate that other indicators may be suitable for characterizing a regenerated kidney.

A "small molecule" is a compound that is less than 2000 daltons in mass. The molecular mass of the small molecule is preferably less than 1000 daltons, more preferably less than 600 daltons, e.g., the compound is less than 500 daltons, 400 daltons, 300 daltons, 200 daltons, or 100 daltons. In certain embodiments, the small molecule is an organic compound.

A "microvesicle" is a cell-derived membranous extracellular vesicle between 30 and 1,000 nanometers (nm) in diameter. An "exosome" is a cell-derived membranous microvesicle that is about 30-150 nm in diameter. In certain embodiments, an exosome is a cell-derived membranous microvesicle that is about 50-100 nm in diameter. Additional features typically shared by exosomes are known in in the art. Non-limiting descriptions relating to microvesicles and exosomes are provided in Zhang et al. (2016) *Am J Physiol Renal Physiol.* 311(5):F844-F851, the entire contents of which are incorporated herein by reference.

As used herein, "effective" when referring to an amount of a therapeutic agent (such as microvesicles, e.g., exosomes, alone or in combination with bioactive renal cells) refers to the quantity of the agent that is sufficient to yield a desired therapeutic response without undue adverse side effects (such as toxicity, irritation, or allergic response) commensurate with a reasonable benefit/risk ratio when used in the manner of this disclosure.

Secreted Products

Provided herein are products secreted by bioactive renal cells (e.g., SRCs) such as vesicles. In certain embodiments, the vesicles comprise microvesicles.

In certain embodiments, the microvesicles are about 30-150, 30-200, 30-500, 30-1000, 500-1000, 50-1000, 50-200, 50-150, 50-100, 100-150, 100-200, or 100-300 nm in diameter.

In certain embodiments, the vesicles comprise, consist essentially, of or consist of exosomes. In certain embodiments, the exosomes are about 50-100 nm in diameter. In certain embodiments, the exosomes are 30-100, 50-150, 50-100, 100-150, or 30-150 nm in diameter. In certain embodiments, the exosomes are from about 30, 35, 40, 45, 50, 55, or 60 nm to about 100, 110, 120, 130, 140, or 150 nm in diameter.

In certain embodiments, a vesicle comprises an active agent (such as a compound) on the outer surface thereof, in the lipid bilayer thereof, and/or in the lumen thereof. In certain embodiments, the compound attenuates one or more cellular pathways. In certain embodiments, the compound is a protein, a small molecule, or polynucleotide. In certain embodiments, the protein is a transmembrane protein that is in the membrane of the vesicles. In certain embodiments, the compound is lipophilic and is in the lipidbilayer of the exosome. In certain embodiments, the polynucleotide is an miRNA molecule.

In certain embodiments, the compound is expressed or produced by bioactive renal cells. In certain embodiments, the compound is not expressed or produced by bioactive renal cells. In certain embodiments, the compound was added to the media of cells that produced the vesicles (e.g., the cells were incubated in media containing the compound). In certain embodiments, the compound entered the cells and was included in the vesicles that were created by the cells. In certain embodiments, the vesicles are purified or isolated from cells and then incubated in a solution (e.g. media) containing the compound. In certain embodiments, vesicles are isolated or purified from cells and then a compound is incorporated into the vesicles by a technique for permeabilizing the vesicle membranes to facilitate entry of the compound (such as by sonication, lipofection, electroporation etc.).

In certain embodiments, the compound is not produced by naturally occurring renal cells. In certain embodiments, the compound is a cytokine. In certain embodiments, the compound is an artificial compound. In certain embodiments, the artificial compound is a drug. In certain embodiments, the artificial compound is a small molecule. In certain embodiments, the artificial compound is a biologic. In certain embodiments, the artificial compound is not expressed or produced by renal cells in a native kidney. In certain embodiments, the compound is a cell viability agent. In certain embodiments, the compound is a compound that is used to treat a disease (such as a kidney disease or some other disease). In certain embodiments, the compound is tolerogenic or anti-inflammatory.

In certain embodiments, the compound is approved for administration to a human for the treatment of a disease by the United States Food and Drug Administration. In certain embodiments, the compound is used in the cure, mitigation, treatment, or prevention of disease. In certain embodiments, the compound is used to alter the structure or function of a mammalian cell or organism.

In certain embodiments, the vesicles comprises a compound that attenuates Plasminogen Activation Inhibitor-1 (PAI-1) signaling and/or Transforming Growth Factor Beta (TGFβ) signaling. In certain embodiments, the vesicles comprise a compound that attenuates canonical Wnt signaling. In certain embodiments, the vesicles comprise a compound that attenuates non-canonical Wnt signaling. In certain embodiments, the vesicles comprise a compound that attenuates CXCR4-mediated signaling. In certain embodiments, the vesicles comprise a compound that downregulates an inflammatory cytokine. In certain embodiments, the inflammatory cytokine is IL8. In certain embodiments, the vesicles comprise a compound that attenuates Notch signaling.

In certain embodiments, the compound is a cell surface molecule used for immunophenotyping of cells. In certain embodiments, the compound is CD9, CD63, CD81, CD133, CD146, CD326, CD40, CD42a, CD44, or CD49e.

In certain embodiments, the compound is a protein receptor. In certain embodiments, the protein receptor is retinoid-related receptor (ROR4).

In certain embodiments, the compound is a developmental stage marker. In certain embodiments, the developmental stage marker is stage-specific embryonic antigen-4 (SSEA-4).

In certain embodiments, the compound is a stress-protecting protein. In certain embodiments, the stress-protecting protein is heat shock protein (HSP) 70, or HSP90.

In certain embodiments, the compound is a scaffolding protein. In certain embodiments, the scaffolding protein is TST101.

In certain embodiments, the compound is an miRNA and is in the lumen of a vesicle.

In certain embodiments, the miRNA is a cell cycle regulation miRNA. In certain embodiments, the cell cycle regulation miRNA is let7a, miR-143, or miR22.

In certain embodiments, the miRNA is a cell senescence-modulating miRNA. In certain embodiments, the cell scenescence-modulating miRNA is miR-34.

In certain embodiments, the miRNA is a cell migration-modulating miRNA. In certain embodiments, the cell migration-modulating miRNA is miR30-C.

In certain embodiments, the miRNA is a cell growth regulating miRNA. In certain embodiments, the cell growth regulating miRNA is miR194-2.

In certain embodiments, the miRNA is a cell signal pathway-modulating miRNA. In certain embodiments, the cell signal pathway-modulating miRNA is miR-142.

In certain embodiments, the miRNA is an inflammation-modulating miRNA. In certain embodiments, the inflammation-modulating miRNA is miR-10a.

In certain embodiments, the miRNA is an angiogenesis-modulating miRNA. In certain embodiments, the angiogenesis-modulating miRNA is miR-296 and/or miR-146a. In certain embodiments, the miRNA is a kinase activity-modulating miRNA. In certain embodiments, the kinase activity-modulating miRNA is miR-83.

In certain embodiments, the compound is an miRNA that inhibits PAI-1, TGFβ, canonical Wnt signaling, non-canonical Wnt signaling, CXCR4-mediated signaling, and/or Notch signaling.

In certain embodiments, renal fibrosis is reduced or prevented by inhibition of epithelial-to-mesenchymal transition (EMT).

In certain embodiments, vesicles provided herein comprise miR-145, miR-22, miR-7, miR-10a, miR-143, and/or let7b.

In certain embodiments, vesicles provided herein comprise miR-1248, miR-3168, miR-7113-5p, miR-758-3p, miR-937-3p, miR-4455, miR-4521, miR-203a-3p, miR-22-3p, miR-574-3p, miR-181b-5p, miR-1260b, and/or miR-181b-5p.

In certain embodiments, vesicles provided herein vesicles comprise CD9, CD63, CD81, CD133, CD146, CD326, CD40, CD42a, CD44, CD49e, and/or SSEA-4.

In certain embodiments, vesicles provided herein the vesicles comprise CD63, CD9, and/or CD81, and the CD63, CD9, and/or CD81 or a portion thereof on the outer surface of the vesicles. In certain embodiments, a portion of one or more of these proteins is on the inside of a vesicle.

In certain embodiments, vesicles provided herein comprise CD133, CD326, and/or CD49e, and the CD133, CD326, and/or CD49e is on the outer surface of the vesicles.

In certain embodiments, the proliferation of renal cells contacted by the vesicles increases compared to renal cells that are not contacted with the vesicles. In certain embodiments, vessel formation by endothelial cells contacted by the vesicles increases compared to endothelial cells that are not contacted with the vesicles. In certain embodiments, nephron tubule formation of renal cells contacted by the vesicles increases compared to renal cells that are not contacted with the vesicles.

In certain embodiments, the vesicles comprise a phospholipid, a sphingolipid, cholesterol, a cerimide, and/or phosphatidyl choline.

In certain embodiments, the vesicles are in a composition that comprises a pharmaceutically acceptable carrier. In certain embodiments, the pharmaceutically acceptable carrier comprises an aqueous solution. In certain embodiments, the pharmaceutically acceptable carrier is temperature-sensitive. In certain embodiments, the pharmaceutically acceptable carrier is a hydrogel. In certain embodiments, the pharmaceutically acceptable carrier comprises gelatin.

In certain embodiments, the vesicles have been produced by BRCs such as primary renal cells. In certain embodiments, the vesicles have been produced by SRCs. Included herein are compositions comprising vesicles from primary renal cells as well as vesicles from SRCs. Also provided are compositions further comprising vesicles secreted by endothelial cells or mesenchymal stem cells. In certain embodiments, a composition provided herein comprises non-renal cell vesicles. In certain embodiments, a non-renal cell vesicle has been secreted by a non-renal endothelial progenitor cell, a non-renal mesenchymal stem cell, or a non-renal adipose-derived progenitor.

In an aspect, provided herein is a method for detecting at least one compound in a vesicle. In certain embodiments, the method comprises obtaining the vesicle and detecting whether the at least one compound is in the vesicle, wherein (i) the at least one compound is a protein, and the protein is CD9, CD81, CD146, CD326, CD40, CD42a, CD44, CD49e, and/or SSEA-4; (ii) the at least one compound comprises miRNAs, wherein the miRNAs include at least two of miR-145, miR-22, miR-7, miR-10a, miR-143, and/or let7b;

and/or (iii) the at least one compound is not expressed or produced by renal cells in a native kidney.

In certain embodiments, the vesicle is obtained in or from a biological sample from a subject. In certain embodiments, the biological sample is urine. In certain embodiments, the vesicle is obtained in or from a supernatant of a culture of renal cells. In certain embodiments, the vesicle has been secreted by a renal cell. In certain embodiments, the renal cell is a bioactive renal cell. In certain embodiments, the renal cell is a selected renal cell.

In certain embodiments, detecting whether the protein is in the vesicle comprises an immunoassay. In certain embodiments, detecting whether the protein is in the vesicle comprises an enzyme-linked immunosorbent assay (ELISA), protein immunoprecipitation, immunoelectrophoresis, Western blot, or protein immunostaining. In certain embodiments, detecting whether the protein is in the vesicle comprises a spectrometry method. In certain embodiments, detecting whether the protein is in the vesicle comprises high-performance liquid chromatography (HPLC) or liquid chromatography-mass spectrometry (LC/MS).

In certain embodiments, detecting whether the miRNAs are in the vesicle comprises a polymerase chain reaction (PCR). In certain embodiments, detecting whether the miRNAs are in the vesicle comprises reverse-transcriptase PCR. In certain embodiments, detecting whether the miRNAs are in the vesicle comprises microarray analysis. In certain embodiments, detecting whether the miRNAs are in the vesicle comprises RNA sequencing. In certain embodiments, detecting whether the miRNAs are in the vesicle comprises contacting the vesicle, or a processed sample suspected of comprising nucleic acids from the vesicle, with probes or primers that are complementary to the miRNAs. In certain embodiments, detecting whether the miRNAs are in the vesicle does not comprise microarray analysis. In certain embodiments, detecting whether the miRNAs are in the vesicle comprises microarray analysis with a microarray, wherein the microarray comprises probes for less than 1000, 500, or 100 different miRNAs.

In certain embodiments, the compound is a small molecule.

In certain embodiments, the compound is expressed or produced by bioactive renal cells. In certain embodiments, the compound is not expressed or produced by bioactive renal cells. In certain embodiments, the compound is expressed or produced by bioactive renal cells. In certain embodiments, the compound is not expressed or produced by bioactive renal cells. In certain embodiments, the compound was added to the media of cells that produced the vesicles (e.g., the cells were incubated in media containing the compound). In certain embodiments, the compound entered the cells and was included in the vesicles that were created by the cells. In certain embodiments, the vesicles are purified or isolated from cells and then incubated in a solution (e.g. media) containing the compound. In certain embodiments, vesicles are isolated or purified from cells and then a compound is incorporated into the vesicles by a technique for permeabilizing the exosome membranes to facilitate entry of the compound (such as by sonication, lipofection, electroporation etc.).

In certain embodiments, the compound is not produced by naturally occurring renal cells. In certain embodiments, the compound is a cytokine. In certain embodiments, the compound is an artificial compound. In certain embodiments, the compound is a drug. In certain embodiments, the artificial compound is not expressed or produced by renal cells in a native kidney. In certain embodiments, the compound is a cell viability agent. In certain embodiments, the compound is a compound that is used to treat a disease (such as a kidney disease or some other disease). In certain embodiments, the compound is tolerogenic or anti-inflammatory. In certain embodiments, the compound is approved for administration to a human for the treatment of a disease by the United States Food and Drug Administration. In certain embodiments, the compound is used in the cure, mitigation, treatment, or prevention of disease. In certain embodiments, the compound is used to alter the structure or function of a mammalian cell or organism.

In an aspect, provided herein is a method for monitoring treatment with a bioactive renal cell population in a subject who has been administered the bioactive renal cell population. In certain embodiments, the method comprises detecting whether at least one compound is present in a vesicle from the subject according to a method disclosed herein.

In certain embodiments, the method comprises detecting whether at least one compound is present in a vesicle from the subject according to a method disclosed herein at a first time point and a second time point. In certain embodiments, the first time point is before the subject has been administered the bioactive renal cell population and the second time point is after the subject has been administered the bioactive renal cell population. In certain embodiments, the first time point and the second time point are after the subject has been administered the bioactive renal cell population. In certain embodiments, the method further comprises identifying a regenerative effect in the subject if the level of the compound is higher at the first time point compared to the second time point.

In certain embodiments, the method further comprises identifying a regenerative effect in the subject if the level of the compound is higher than a control. In certain embodiments, the method further comprises the control is the level in a corresponding subject who has not been administered the bioactive renal cell population.

Also included herein is a method of identifying whether a vesicle is regenerative. In certain embodiments, the method comprises (i) detecting whether a protein and/or miRNAs are in the vesicle according to a method disclosed herein; and (ii) identifying the vesicle as regenerative if the protein and/or miRNAs are detected in the vesicle.

In an aspect, provided herein is a method of detecting the level of at least one miRNA in vesicles from a bioactive renal cell population. In certain embodiments, the method comprises (i) detecting whether one or more of the following miRNA molecules is increased in the vesicles compared to a control: miR-1248, miR-3168, miR-7113-5p, miR-758-3p, miR-937-3p, miR-4455, miR-4521, miR-203a-3p, miR-22-3p, miR-574-3p, miR-181b-5p, miR-1260b, and/or miR-181b-5p; and/or (ii) detecting whether one or more of the following miRNA molecules is decreased in the vesicles compared to a control: miR-1-3p, miR-1-3p, miR-143-3p, miR-150-5p, miR-509-3p, miR-653-5p, miR-204-5p, miR-192-5p, and/or miR-363-3p. In certain embodiments, the bioactive renal cell is a selected renal cell. In certain embodiments, the control is the level of the one or more miRNA molecules vesicles from a primary renal cell population. In certain embodiments, the control is the level of the one or more miRNA molecules vesicles from another bioactive renal cell population.

The present subject matter also provides a method of altering the level of at least one miRNA and/or protein in vesicles produced by a population of bioactive renal cells, the method comprising culturing the population under hypoxic conditions. In certain embodiments, culturing the population under hypoxic conditions comprises culturing the population in the presence of less than about 5%, 4%, 3%, 2%, or 1% oxygen for, e.g., 8-72 hours. n certain embodiments, culturing the population under hypoxic conditions comprises culturing the population in the presence of about 1-5%, 2-5%, 2-4%, 1-3%, or 1.5-2.5% oxygen for, e.g., 8-72 hours. In certain embodiments, culturing the population under hypoxic conditions comprise culturing the population in the presence of less than 5% oxygen for at least about 8, 12, 16, 20, 24, or 48 hours. In certain embodiments, culturing the population under hypoxic conditions comprise culturing the population in the presence of about 1%, 1.5%, 2%, 2.5%, 3%, 3.5%, 4%, 4.5%, or 5% oxygen for about 8, 12, 16, 20, 24, or 48 hours.

In certain embodiments, the method further comprises passaging the bioactive renal cells at least about 1, 2, or 3 times before culturing the population under hypoxic conditions.

In certain embodiments, (a) the at least one miRNA is miR-145, miR-22, miR-7, miR-10a, miR-143, let7b, miR-1248, miR-3168, miR-7113-5p, miR-758-3p, miR-937-3p, miR-4455, miR-4521, miR-203a-3p, miR-22-3p, miR-574-3p, miR-181b-5p, miR-1260b, and/or miR-181b-5p; and/or (b) the at least one protein is CD9, CD63, CD81, CD133, CD146, CD326, CD40, CD42a, CD44, CD49e, SSEA-4, TST101, HSP70, HSP90, and/or ROR4.

In an aspect, provided herein is a method of producing an exosome from cells, wherein the exosome comprises a compound that is not produced by the cells. In certain embodiments, the method comprises isolating the exosome from a cell culture supernatant, wherein the cell culture supernatant is from a culture of cells that were contacted with the compound. In an aspect, provided herein is a method of producing a renal exosome, wherein the exosome comprises a compound that is not produced by renal cells in a native kidney. In certain embodiments, the method comprises isolating a vesicle from a renal cell culture supernatant, wherein the renal cell culture supernatant is from a culture of renal cells comprising a bioactive renal cell population that has been contacted with the compound. In certain embodiments, the compound is an artificial compound. In certain embodiments, the compound is a small molecule. In certain embodiments, the compound is a cell viability agent. In certain embodiments, the compound is a drug.

In an aspect, included herein is a vesicle (such as a microvesicle, e.g., an exosome) comprising a compound that is not produced by renal cells in a native kidney.

In certain embodiments, the compound is a protein, a small molecule, or polynucleotide. In certain embodiments, the compound is not expressed or produced by primary renal cells that are cultured in the absence of the compound. In certain embodiments, the compound is an artificial compound.

In certain embodiments, a compound (such as a protein or small molecule drug) "passive loaded" into vesicles (e.g., microvesicles such as exosomes), e.g. by incubation of cells with media containing the compound or by incubation of purified vesicles (e.g., microvesicles such as exosomes) with media containing the compound. In certain embodiments, a compound (such as a protein or small molecule drug) is "actively loaded" into purified or isolated vesicles (e.g., microvesicles such as exosomes) by permeabilizing (such as by sonication, lipofection, electroporation, etc.) the vesicle membrane to facilitate entry of the compound.

In certain embodiments, the vesicle is in a composition that comprises cells that produced the vesicle. In certain embodiments, the vesicle has been isolated from the cells that produced it. In certain embodiments, the vesicle is a renal vesicle. In certain embodiments, the vesicle has been produced by a bioactive renal cell.

In certain embodiments, a composition provided herein comprises a renal cell vesicle and a non-renal cell vesicle. In certain embodiments, the renal cell vesicle has been secreted by a bioactive renal cell. In certain embodiments, the non-renal cell vesicle has been secreted by a non-renal endothelial progenitor cell, a non-renal mesenchymal stem cell, or a non-renal adipose-derived progenitor.

In certain embodiments, a composition provided herein comprises a vesicle produced by a primary renal cell and a vesicle produced by a selected renal cell.

In certain embodiments, the vesicle further comprises a pharmaceutically acceptable carrier.

In certain embodiments, a regenerative effect may be provided by cells and/or by products secreted from bioactive renal cells (such as vesicles). In certain embodiments, the regenerative effect may be characterized by one or more of the following: a reduction in epithelial-mesenchymal transition (which may be via attenuation of TGF-β signaling); a reduction in renal fibrosis; a reduction in renal inflammation; differential expression of a stem cell marker in the native kidney; migration of implanted cells and/or native cells to a site of renal injury, e.g., tubular injury; engraftment of implanted cells at a site of renal injury, e.g., tubular injury; stabilization of one or more indicators of kidney function (as described herein); de novo formation of S-shaped bodies/comma-shaped bodies associated with nephrogenesis, de novo formation of renal tubules or nephrons, restoration of erythroid homeostasis (as described herein); and any combination thereof (see also Basu et al., 2011. Functional evaluation of primary renal cell/biomaterial neo-kidney augment prototypes for renal tissue engineering. *Cell Transplantation* 20: 1771-90; Bruce et al., 2015. Selected renal cells modulate disease progression in rodent models of chronic kidney disease via NF-κB and TGF-β1 pathways. *Regenerative Medicine* 10: 815-839, the entire content of each of which is incorporated herein by reference).

In certain embodiments, as an alternative to a tissue biopsy, a regenerative outcome in the subject receiving treatment can be assessed from examination of a bodily fluid, e.g., urine. It has been discovered that microvesicles (e.g., exosomes) obtained from subject-derived urine sources contain certain components including, without limitation, specific proteins and miRNAs that are ultimately derived from the renal cell populations impacted by treatment. These components may include, without limitation, factors involved in stem cell replication and differentiation, apoptosis, inflammation and immuno-modulation, fibrosis, epithelial-mesenchymal transition, TGF-β signaling, and/or PAI-1 signaling. In certain embodiments, a temporal analysis of microvesicle (e.g., exosome) associated miRNA/protein expression patterns allows for continuous monitoring of regenerative outcomes within the kidney of subjects receiving the cell populations, cell products, or constructs of the present disclosure.

In certain embodiments, the present disclosure provides methods of assessing whether a kidney disease (KD) patient is responsive to treatment with a therapeutic formulation. In certain embodiments, the method may include the step of determining or detecting the amount of microvesicles (or their luminal contents), e.g., exosomes, in a test sample obtained from a KD patient treated with a therapeutic, as compared to or relative to the amount of microvesicles (such as exosomes) in a control sample (e.g., a sample derived from the same patient prior to treatment with the therapeutic), wherein a higher or lower amount of microvesicles (e.g., exosomes) or their luminal contents in the test sample as compared to the amount of microvesicles (e.g., exosomes) or their luminal contents in the control sample is indicative of the treated patient's responsiveness to treatment with the therapeutic.

In certain embodiments, the kidney-derived microvesicles (e.g., exosomes) and/or the luminal contents of kidney derived microvesicles (e.g., exosomes) may be shed into the urine of a subject and may be analyzed for biomarkers indicative of regenerative outcome or treatment efficacy. In certain embodiments, non-invasive prognostic methods provided herein may include the step of obtaining a urine sample from the subject before and/or after administration or implantation of a bioactive renal cell population, cell product, or construct described herein. Microvesicles and other secreted products may be isolated from the urine samples using standard techniques including without limitation, centrifugation to remove unwanted debris (Zhou et al. 2008. Kidney Int. 74(5):613-621; Skog et al. U.S. Published Patent Application No. 20110053157, each of which is incorporated herein by reference in its entirety) precipitation to separate microvesicles (e.g., exosomes) from urine, polymerase chain reaction and nucleic acid sequencing to identify specific nucleic acids and mass spectroscopy and/or 2D gel electrophoresis to identify specific proteins associated with regenerative outcomes.

Cell Populations

Included herein are compositions and formulations comprising vesicles (e.g., microvesicles such as exosomes) produced by a renal cell population (e.g., BRCs such as primary cells and/or SRCs). In certain embodiments, the vesicles may be, e.g., isolated from cells or combined with cells that did not produced them. Non-limiting examples and features of BRCs useful for the production of vesicles are provided herein.

In certain embodiments, a therapeutic composition or formulation provided herein contains microvesicles (e.g., exosomes) secreted by an isolated, heterogeneous population of kidney cells that is enriched for specific bioactive components or cell types and/or depleted of specific inactive or undesired components or cell types. In certain embodiments, the therapeutic composition or formulation provided herein contains or further contains an isolated, heterogeneous population of kidney cells that is enriched for specific bioactive components or cell types and/or depleted of specific inactive or undesired components or cell types. In certain embodiments, such compositions and formulations are used in the treatment of kidney disease, e.g., providing stabilization and/or improvement and/or regeneration of kidney function and/or structure. In certain embodiments, the compositions contain microvesicles (e.g., exosomes) secreted by isolated renal cell fractions that lack cellular components as compared to a healthy individual yet retain therapeutic properties, e.g., provide stabilization and/or improvement and/or regeneration of kidney function. In certain embodiments, the compositions contain isolated renal cell fractions that lack cellular components as compared to a healthy individual yet retain therapeutic properties, e.g., provide stabilization and/or improvement and/or regeneration of kidney function. In certain embodiments, the cell populations described herein may be derived from healthy individuals, individuals with a kidney disease, or subjects as described herein.

Included herein are therapeutic compositions of microvesicles (e.g., exosomes) and/or selected renal cell populations that are to be administered to a target organ or tissue in a subject. In certain embodiments, provided herein is a composition comprising microvesicles (e.g., exosomes) secreted by BRCs (e.g., SRCs). In certain embodiments, the composition further comprises BRCs (e.g., SRCs) that did not secrete the microvesicles (e.g., exosomes). In certain embodiments, the composition comprises NKA that is "spiked" with microvesicles (e.g., microvesicles such as exosomes are added to NKA to produce vesicle enhanced NKA). In certain embodiments, BRCs (e.g., SRCs) from which microvesicles (e.g., exosomes) may be obtained include, e.g., any BRCs (e.g., SRCs) disclosed herein. In certain embodiments, vesicles are obtained from SRCs produced according to methods described in Example 1. In certain embodiments, a formulation provided herein is NKA to which isolated vesicles (such as microvesicles, e.g., exosomes) have been added (the NKA has been "spiked" or supplemented with the vesicles).

In certain embodiments, a bioactive selected renal cell population generally refers to a cell population potentially having therapeutic properties upon administration to a subject. In certain embodiments, upon administration to a subject in need, a bioactive renal cell population can provide stabilization and/or improvement and/or repair and/or regeneration of kidney function in the subject. In certain embodiments, the therapeutic properties may include a repair or regenerative effect.

In certain embodiments, the renal cell population is an unfractionated, heterogeneous cell population or an enriched homogeneous cell population derived from a kidney. In certain embodiments, the heterogeneous cell population is isolated from a tissue biopsy or from whole organ tissue. In certain embodiments, the renal cell population is derived from an in vitro culture of mammalian cells, established from tissue biopsies or whole organ tissue. In certain embodiments, a renal cell population comprises subfractions or subpopulations of a heterogeneous population of renal cells, enriched for bioactive components (e.g., bioactive renal cells) and depleted of inactive or undesired components or cells.

In certain embodiments, the renal cell population expresses GGT and a cytokeratin. In certain embodiments, the GGT has a level of expression greater than about 10%, about 15%, about 18%, about 20%, about 25%, about 30%, about 35%, about 40%, about 45%, about 50%, about 55%, or about 60%. In certain embodiments, the GGT is GGT-1. In certain embodiments, cells of the renal cell population expresses GGT-1, a cytokeratin, VEGF, and KIM-1. In certain embodiments, greater than 18% of the cells in the renal cell population express GGT-1. In certain embodiments, greater than 80% of the cells in the renal cell population express the cytokeratin. In certain embodiments, the cytokeratin is selected from CK8, CK18, CK19 and combinations thereof. In certain embodiments, the cytokeratin is CK8, CK18, CK19, CK8/CK18, CK8/CK19, CK18/CK19 or CK8/CK18/CK19, wherein the "/" refers to a combination of the cytokeratins adjacent thereto. In certain embodiments, the cytokeratin has a level of expression greater than about 80%, about 85%, about 90%, or about 95%. In certain embodiments, greater than 80% of the cells in the renal cell population express the cytokeratin. In certain embodiments, the renal cell population expresses AQP2. In certain embodiments, less than 40% of the cells express AQP2. In certain embodiments, at least 3% of the cells in the renal cell population express AQP2.

In certain embodiments, greater than 18% of the cells within the cell population express GGT-1 and greater than 80% of the cells within the cell population express a cytokeratin. In certain embodiments, the cytokeratin is CK18. In certain embodiments, 4.5% to 81.2% of the cells in the cell population express GGT-1, 3.0% to 53.7% of the cells within the cell population express AQP2, and 81.1% to 99.7% of the cells within the cell population express CK18.

In certain embodiments, the renal cell population comprises cells that express one or more of any combination of the biomarkers selected from AQP1, AQP2, AQP4, Calbindin, Calponin, CD117, CD133, CD146, CD24, CD31 (PECAM-1), CD54 (ICAM-1), CD73, CK18, CK19, CK7, CK8, CK8, CK18, CK19, combinations of CK8, CK18 and CK19, Connexin 43, Cubilin, CXCR4 (Fusin), DBA, E-cadherin (CD324), EPO (erythropoeitin) GGT1, GLEPP1 (glomerular epithelial protein 1), Haptoglobulin, Itgb1 (Integrin 01), KIM-1 (kidney injury molecule-1), T1M-1 (T-cell immunoglobulin and mucin-containing molecule), MAP-2 (microtubule-associated protein 2), Megalin, N-cadherin, Nephrin, NKCC (Na—K—Cl-cotransporters), OAT-1 (organic anion transporter 1), Osteopontin, Pan-cadherin, PCLP1 (podocalyxin-like 1 molecule), Podocin, SMA (smooth muscle alpha-actin), Synaptopodin, THP (tamm-horsfall protein), Vinientin, and aGST-1 (alpha glutathione S-transferase).

In certain embodiments, the renal cell population is enriched for epithelial cells compared to a starting population, such as a population of cells in a kidney tissue biopsy or a primary culture thereof (e.g., the renal cell population comprises at least about 5%, 10%, 15%, 20%, or 25% more epithelial cells than the starting population). In certain embodiments, the renal cell population is enriched for tubular cells compared to a starting population, such as a population of cells in a kidney tissue biopsy or a primary culture thereof (e.g., the renal cell population comprises at least about 5%, 10%, 15%, 20%, or 25% more tubular cells than the starting population). In certain embodiments, the tubular cells comprise proximal tubular cells. In certain embodiments, the renal cell population has a lesser proportion of distal tubular cells, collecting duct cells, endocrine cells, vascular cells, or progenitor-like cells compared to the starting population. In certain embodiments, the renal cell population has a lesser proportion of distal tubular cells compared to the starting population. In certain embodiments, the renal cell population has a lesser proportion of collecting duct cells compared to the starting population. In certain embodiments, the renal cell population has a lesser proportion of endocrine cells compared to the starting population. In certain embodiments, the renal cell population has a lesser proportion of vascular cells compared to the starting population. In certain embodiments, the renal cell population has a lesser proportion of progenitor-like cells compared to the starting population. In certain embodiments, the renal cell population has a greater proportion of tubular cells and lesser proportions of EPO producing cells, glomerular cells, and vascular cells when compared to the non-enriched population (e.g., a starting kidney cell population). In certain embodiments, the renal cell population has a greater proportion of tubular cells and lesser proportions of EPO producing cells and vascular cells when compared to the non-enriched population. In certain embodiments, the renal cell population has a greater proportion of tubular cells and lesser proportions of glomerular cells and vascular cells when compared to the non-enriched population.

In certain embodiments, cells of the renal cell population, express hyaluronic acid (HA). In certain embodiments, the size range of HA is from about 5 kDa to about 20000 kDa. In certain embodiments, the HA has a molecular weight of 5 kDa, 60 kDa, 800 kDa, and/or 3000 kDa. In certain embodiments, the renal cell population synthesizes and/or stimulate synthesis of high molecular weight HA through expression of Hyaluronic Acid Synthase-2 (HAS-2), especially after intra-renal implantation. In certain embodiments, cells of the renal cell population express higher molecular weight species of HA in vitro and/or in vivo, through the actions of HAS-2. In certain embodiments, cells of the renal cell population express higher molecular weight species of HA both in vitro and in vivo, through the actions of HAS-2. In certain embodiments, a higher molecular weight species of HA is HA having a molecular weight of at least 100 kDa. In certain embodiments, the higher molecular weight species of HA is HA having a molecular weight from about 800 kDa to about 3500 kDa. In certain embodiments, the higher molecular weight species of HA is HA having a molecular weight from about 800 kDa to about 3000 kDa. In certain embodiments, the higher molecular weight species of HA is HA having a molecular weight of at least 800 kDa. In certain embodiments, the higher molecular weight species of HA is HA having a molecular weight of at least 3,000 kDa. In certain embodiments, the higher molecular weight species of HA is HA having a molecular weight of about 800 kDa. In certain embodiments, the higher molecular weight species of HA is HA having a molecular weight of about 3000 kDa. In certain embodiments, HAS-2 synthesizes HA with a molecular weight of $2 \times 10^5$ to $2 \times 10^6$ Da. In certain embodiments, smaller species of HA are formed through the action of degradative hyaluronidases. In certain embodiments, the higher molecular weight species of HA is HA having a molecular weight from about 200 kDa to about 2000 kDa. In certain embodiments, the higher molecular weight species of HA is HA having a molecular weight of about 200 kDa. In certain embodiments, the higher molecular weight species of HA is HA having a molecular weight of about 2000 kDa. In certain embodiments, the higher molecular weight species of HA is HA having a molecular weight of at least 200 kDa. In certain embodiments, the higher molecular weight species of HA is HA having a molecular weight of at least 2000 kDa. In certain embodiments, the higher molecular weight species of HA is HA having a molecular weight of at least 5000 kDa. In certain embodiments, the higher molecular weight species of HA is HA having a molecular weight of at least 10000 kDa. In certain embodiments, the higher molecular weight species of HA is HA having a molecular weight of at least 15000 kDa. In certain embodiments, the higher molecular weight species of HA is HA having a molecular weight of about 20000 kDa.

In certain embodiments, the population comprises cells that are capable of receptor-mediated albumin transport.

In certain embodiments, cells of the renal cell population are hypoxia resistant.

In certain embodiments, the renal cell population comprises one or more cell types that express one or more of any combination of: megalin, cubilin, N-cadherin, E-cadherin, Aquaporin-1, and Aquaporin-2.

In certain embodiments, the renal cell population comprises one or more cell types that express one or more of any combination of: megalin, cubilin, hyaluronic acid synthase 2 (HAS2), Vitamin D3 25-Hydroxylase (CYP2D25), N-cadherin (Ncad), E-cadherin (Ecad), Aquaporin-1 (Aqp1), Aquaporin-2 (Aqp2), RAB17, member RAS oncogene family (Rab17), GATA binding protein 3 (Gata3), FXYD domain-containing ion transport regulator 4 (Fxyd4), solute carrier family 9 (sodium/hydrogen exchanger), member 4 (Slc9a4), aldehyde dehydrogenase 3 family, member B1

(Aldh3b1), aldehyde dehydrogenase 1 family, member A3 (Aldh1a3), and Calpain-8 (Capn8).

In certain embodiments, the renal cell population comprises one or more cell types that express one or more of any combination of: megalin, cubilin, hyaluronic acid synthase 2 (HAS2), Vitamin D3 25-Hydroxylase (CYP2D25), N-cadherin (Ncad), E-cadherin (Ecad), Aquaporin-1 (Aqp1), Aquaporin-2 (Aqp2), RAB17, member RAS oncogene family (Rab17), GATA binding protein 3 (Gata3), FXYD domain-containing ion transport regulator 4 (Fxyd4), solute carrier family 9 (sodium/hydrogen exchanger), member 4 (Slc9a4), aldehyde dehydrogenase 3 family, member 81 (Aldh3b1), aldehyde dehydrogenase 1 family, member A3 (Aldh1a3), and Calpain-8 (Capn8), and Aquaporin-4 (Aqp4).

In certain embodiments, the renal cell population comprises one or more cell types that express one or more of any combination of: aquaporin 7 (Aqp7), FXYD domain-containing ion transport regulator 2 (Fxyd2), solute carrier family 17 (sodium phosphate), member 3 (Slc17a3), solute carrier family 3, member 1 (Slc3a1), claudin 2 (Cldn2), napsin A aspartic peptidase (Napsa), solute carrier family 2 (facilitated glucose transporter), member 2 (Slc2a2), alanyl (membrane) aminopeptidase (Anpep), transmembrane protein 27 (Tmem27), acyl-CoA synthetase medium-chain family member 2 (Acsm2), glutathione peroxidase 3 (Gpx3), fructose-1,6-biphosphatase 1 (Fbp1), alanine-glyoxylate aminotransferase 2 (Agxt2), platelet endothelial cell adhesion molecule (Pecam), and podocin (Podn).

In certain embodiments, the renal cell population comprises one or more cell types that express one or more of any combination of: PECAM, VEGF, KDR, HIF1a, CD31, CD146, Podocin (Podn), and Nephrin (Neph), chemokine (C-X-C motif) receptor 4 (Cxcr4), endothelin receptor type B (Ednrb), collagen, type V, alpha 2 (Col5a2), Cadherin 5 (Cdh5), plasminogen activator, tissue (Plat), angiopoietin 2 (Angpt2), kinase insert domain protein receptor (Kdr), secreted protein, acidic, cysteine-rich (osteonectin) (Sparc), serglycin (Srgn), TIMP metallopeptidase inhibitor 3 (Timp3), Wilms tumor 1 (Wt1), wingless-type MMTV integration site family, member 4 (Wnt4), regulator of G-protein signaling 4 (Rgs4), Erythropoietin (EPO).

In certain embodiments, the renal cell population comprises one or more cell types that express one or more of any combination of: PECAM, vEGF, KDR, HIF1a, podocin, nephrin, EPO, CK7, CK8/18/19.

In certain embodiments, the renal cell population comprises one or more cell types that express one or more of any combination of: PECAM, vEGF, KDR, HIF1a, CD31, and CD146.

In certain embodiments, the renal cell population comprises one or more cell types that express one or more of any combination of: Podocin (Podn) and Nephrin (Neph).

In certain embodiments, the renal cell population comprises one or more cell types that express one or more of any combination of: PECAM, vEGF, KDR, HIF1a, and EPO.

In certain embodiments, the presence (e.g., expression) and/or level/amount of various biomarkers in a sample or cell population can be analyzed by a number of methodologies, many of which are known in the art and understood by the skilled artisan, including, but not limited to, immunohistochemical ("IHC"), Western blot analysis, immunoprecipitation, molecular binding assays, ELISA, ELIFA, fluorescence activated cell sorting ("FACS"), MassARRAY, proteomics, biochemical enzymatic activity assays, in situ hybridization, Southern analysis, Northern analysis, whole genome sequencing, polymerase chain reaction ("PCR") including quantitative real time PCR ("qRT-PCR") and other amplification type detection methods, such as, for example, branched DNA, SISBA, TMA and the like), RNA-Seq, FISH, microarray analysis, gene expression profiling, and/or serial analysis of gene expression ("SAGE"), as well as any one of the wide variety of assays that can be performed by protein, gene, and/or tissue array analysis. Non-limiting examples of protocols for evaluating the status of genes and gene products include Northern Blotting, Southern Blotting, Western Blotting, Immunoblotting, and PCR Analysis. In certain embodiments, multiplexed immunoassays such as those available from Rules Based Medicine or Meso Scale Discovery may also be used. In certain embodiments, the presence (e.g., expression) and/or level/amount of various biomarkers in a sample or cell population can be analyzed by a number of methodologies, many of which are known in the art and understood by the skilled artisan, including, but not limited to, "-omics" platforms such as genome-wide transcriptomics, proteomics, secretomics, lipidomics, phospatomics, exosomics etc., wherein high-throughput methodologies are coupled with computational biology and bioinformatics techniques to elucidate a complete biological signature of genes, miRNA, proteins, secreted proteins, lipids, microvesicles etc. that are expressed and/or not expressed by the cell population under consideration.

In certain embodiments, a method of detecting the presence of two or more biomarkers in a renal cell population comprises contacting a sample comprising the population with an antibody directed to a biomarker under conditions permissive for binding of the antibody to its cognate ligand (i.e., biomarker), and detecting the presence of the bound antibody, e.g., by detecting whether a complex is formed between the antibody and the biomarker. In certain embodiments, the detection of the presence of one or more biomarkers is by immunohistochemistry. In certain embodiments, a method of detecting the presence of biomarkers in or on a microvesicle (such as an exosome) comprises contacting a sample (e.g., a sample suspected of comprising or believed to comprise) the microvesicle with an antibody directed to a biomarker under conditions permissive for binding of the antibody to its cognate ligand (i.e., biomarker), and detecting the presence of the bound antibody, e.g., by detecting whether a complex is formed between the antibody and the biomarker.

The term "detecting" as used herein encompasses quantitative and/or qualitative detection.

In certain embodiments, a biomarker is detected by a monoclonal or a polyclonal antibody.

In certain embodiments, a renal cell population are identified with one or more reagents that allow detection of a biomarker disclosed herein, such as AQP1, AQP2, AQP4, Calbindin, Calponin, CD117, CD133, CD146, CD24, CD31 (PECAM-1), CD54 (ICAM-1), CD73, CK18, CK19, CK7, CK8, CK8/18, CK8/18/19, Connexin 43, Cubilin, CXCR4 (Fusin), DBA, E-cadherin (CD324), EPO (erythropoeitin), GGT1, GLEPP1 (glomerular epithelial protein 1), Haptoglobulin, Itgbl (Integrin p), KIM-1 (kidney injury molecule-1), T1M-1 (T-cell immunoglobulin and mucirs-containing molecule), MAP-2 (microtubule-associated protein 2), Megalin, N-cadherin, Nephrin, NKCC (Na—K—Cl-cotransporters), OAT-1 (organic anion transporter 1), Osteopontin, Pan-cadherin, PCLP1 (podocalyxin-like 1 molecule), Podocin, SMA (smooth muscle alpha-actin), Synaptopodin, THP (tamm-horsfall protein), Vimentin, and/or αGST-1 (alpha glutathione 5-transferase).

In certain embodiments, the source of cells is the same as the intended target organ or tissue. In certain embodiments, BRCs or SRCs may be sourced from the kidney to be used in a formulation to be administered to the kidney. In certain embodiments, the cell population is derived from a kidney biopsy. In certain embodiments, a cell populations is derived from whole kidney tissue. In certain embodiments, a cell population is derived from in vitro cultures of mammalian kidney cells, established from kidney biopsies or whole kidney tissue.

In certain embodiments, the BRCs or SRCs comprise heterogeneous mixtures or fractions of bioactive renal cells. In certain embodiments, the BRCs or SRCs may be derived from or are themselves renal cell fractions from healthy individuals. In certain embodiments, included herein is a renal cell population or fraction obtained from an unhealthy individual that may lack certain cell types when compared to the renal cell population of a healthy individual (e.g., in a kidney or biopsy thereof). In certain embodiments, provided herein is a therapeutically-active cell population lacking cell types compared to a healthy individual, as well as microvesicles (e.g., exosomes) secreted by the population. Methods of detecting such cells and microvesicles (e.g., exosomes) are also provided. In certain embodiments, a cell population is isolated and expanded from an autologous cell population.

In certain embodiments, SRCs are obtained from isolation and expansion of renal cells from a patient's renal cortical tissue via a kidney biopsy. In certain embodiments, renal cells are isolated from the kidney tissue by enzymatic digestion, expanded using standard cell culture techniques, and selected by centrifugation across a density boundary, barrier, or interface from the expanded renal cells. In certain embodiments, renal cells are isolated from the kidney tissue by enzymatic digestion, expanded using standard cell culture techniques, and selected by continuous or discontinuous single or multistep density gradient centrifugation from the expanded renal cells. In certain embodiments, SRCs are composed primarily of renal epithelial cells which are known for their regenerative potential. In certain embodiments, other parenchymal (vascular) and stromal cells may be present in the autologous SRC population.

In certain embodiments, BRCs are an isolated population of regenerative renal cells naturally involved in renal repair and regeneration. In certain embodiments, BRC are obtained from renal cells isolated from kidney tissue by enzymatic digestion and expanded using standard cell culture techniques. In certain embodiments, the cell culture medium may be designed to expand bioactive renal cells with regenerative capacity. In certain embodiments, the cell culture medium does not contain any differentiation factors. In certain embodiments, an expanded heterogeneous renal cell population is cultured in hypoxic conditions to further enrich the composition of cells with regenerative capacity. Without wishing to be bound by theory, this may be due to one or more of the following phenomena: 1) selective survival, death, or proliferation of specific cellular components during the hypoxic culture period; 2) alterations in cell granularity and/or size in response to the hypoxic culture, thereby effecting alterations in buoyant density and subsequent localization during density gradient separation; and 3) alterations in cell gene/protein expression in response to the hypoxic culture period, thereby resulting in differential characteristics of the cells within the isolated and expanded population.

In certain embodiments, a bioactive renal cell population is obtained from isolation and expansion of renal cells from kidney tissue (such as tissue obtained from a biopsy) under culturing conditions that enrich for cells capable of kidney regeneration.

In certain embodiments, renal cells from kidney tissue (such as tissue obtained from a biopsy) are passaged 1, 2, 3, 4, 5, or more times to produce expanded bioactive renal cells (such as a cell population enriched for cells capable of kidney regeneration). In certain embodiments, renal cells from kidney tissue (such as tissue obtained from a biopsy) are passaged 1 time to produce expanded bioactive renal cells. In certain embodiments, renal cells from kidney tissue (such as tissue obtained from a biopsy) are passaged 2 times to produce expanded bioactive renal cells. In certain embodiments, renal cells from kidney tissue (such as tissue obtained from a biopsy) are passaged 3 times to produce expanded bioactive renal cells. In certain embodiments, renal cells from kidney tissue (such as tissue obtained from a biopsy) are passaged 4 times to produce expanded bioactive renal cells. In certain embodiments, renal cells from kidney tissue (such as tissue obtained from a biopsy) are passaged 5 times to produce expanded bioactive renal cells. In certain embodiments, passaging the cells depletes the cell population of non-bioactive renal cells. In certain embodiments, passaging the cells depletes the cell population of at least one cell type. In certain embodiments, passaging the cells depletes the cell population of cells having a density greater than 1.095 g/ml. In certain embodiments, passaging the cells depletes the cell population of small cells of low granularity. In certain embodiments, passaging the cells depletes the cell population of cells that are smaller than erythrocytes. In certain embodiments, passaging the cells depletes the cell population of cells with a diameter of less than 6 μm. In certain embodiments, passaging cells depletes cell population of cells with a diameter less than 2 μm. In certain embodiments, passaging the cells depletes the cell population of cells with lower granularity than erythrocytes. In certain embodiments, the viability of the cell population increases after 1 or more passages. In certain embodiments, descriptions of small cells and low granularity are used when analyzing cells by fluorescence activated cell sorting (FACs), e.g., using the X-Y axis of a scatter-plot of where the cells show up.

In certain embodiments, the expanded bioactive renal cells are grown under hypoxic conditions for at least about 6, 9, 10, 12, or 24 hours but less than 48 hours, or from 6 to 9 hours, or from 6 to 48 hours, or from about 12 to about 15 hours, or about 8 hours, or about 12 hours, or about 24 hours, or about 36 hours, or about 48 hours. In certain embodiments, cells grown under hypoxic conditions are selected based on density. In certain embodiments, the bioactive renal cell population is an SRC population obtained after continuous or discontinuous (single step or multistep) density gradient separation of the expanded renal cells (e.g., after passaging and/or culture under hypoxic conditions). In certain embodiments, the bioactive renal cell population is an SRC population obtained after separation of the expanded renal cells by centrifugation across a density boundary, barrier, or interface (e.g., after passaging and/or culture under hypoxic conditions). In certain embodiments, a hypoxic culture condition is a culture condition in which cells are subjected to a reduction in available oxygen levels in the culture system relative to standard culture conditions in which cells are cultured at atmospheric oxygen levels (about 21%). In certain embodiments, cells cultured under hypoxic culture conditions are cultured at an oxygen level of about 5% to about 15%, or about 5% to about 10%, or about 2% to about 5%, or about 2% to about 7%, or about 2% or about 3%, or about 4%, or about 5%. In certain embodiments, the SRCs exhibit a buoyant density greater than about 1.0419 g/mL. In certain embodiments, the SRCs exhibit a buoyant density greater than about 1.04 g/mL. In certain embodiments, the SRCs exhibit a buoyant density greater than about 1.045 g/mL. In certain embodiments, the BRCs or SRCs contain a greater percentage of one or more cell populations and lacks or is deficient in one or more other cell populations, as compared to a starting kidney cell population.

In certain embodiments, expanded bioactive renal cells may be subjected to density gradient separation to obtain SRCs. In certain embodiments, BRCs are subjected to both hypoxic culture conditions and density gradient separation to obtain SRCs. In certain embodiments, continuous or discontinuous single step or multistep density gradient centrifugation is used to separate harvested renal cell populations based on cell buoyant density. In certain embodiments, expanded bioactive renal cells may be separated by centrifugation across a density boundary, barrier or interface to obtain SRCs. In certain embodiments, centrifugation across a density boundary or interface is used to separate harvested renal cell populations based on cell buoyant density. In certain embodiments, the SRCs are generated by using, in part, OPTIPREP (Axis-Shield) medium, comprising a solution of 60% (w/v) of the nonionic iodinated compound iodixanol in water. One of skill in the art, however, will recognize that other media, density gradients (continuous or discontinuous), density boundaries, barriers, interfaces or other means, e g, immunological separation using cell surface markers known in the art, comprising necessary features for isolating cell populations described herein may be used to obtain bioactive renal cells. In certain embodiments, a cellular fraction exhibiting buoyant density greater than about 1.04 g/mL is collected after centrifugation as a distinct pellet. In certain embodiments, cells maintaining a buoyant density of less than 1.04 g/mL are excluded and discarded. In certain embodiments, a cellular fraction exhibiting buoyant density greater than about 1.0419 g/mL is collected after centrifugation as a distinct pellet. In certain embodiments, cells maintaining a buoyant density of less than 1.0419 g/mL are excluded and discarded. In certain embodiments, a cellular fraction exhibiting buoyant density greater than about 1.045 g/mL is collected after centrifugation as a distinct pellet. In certain embodiments, cells maintaining a buoyant density of less than 1.045 g/mL are excluded and discarded.

In certain embodiments, cell buoyant density is used to obtain an SRC population and/or to determine whether a renal cell population is a bioactive renal cell population. In certain embodiments, cell buoyant density is used to isolate bioactive renal cells. In certain embodiments, cell buoyant density is determined by centrifugation across a single-step OptiPrep (7% iodixanol; 60% (w/v) in OptiMEM) density interface (single step discontinuous density gradient). Optiprep is a 60% w/v solution of iodixanol in water. When used in an exemplary density interface or single step discontinuous density gradient, the Optiprep is diluted with OptiMEM (a cell culturing basal medium) to form a final solution of 7% iodixanol (in water and OptiMEM). The formulation of OptiMEM is a modification of Eagle's Minimal Essential Medium, buffered with HEPES and sodium bicarbonate, and supplemented with hypoxanthine, thymidine, sodium pyruvate, L-glutamine or GLUTAMAX, trace elements and growth factors. The protein level is minimal (15 µg/mL), with insulin and transferrin being the only protein supplements. Phenol red is included at a reduced concentration as a pH indicator. In certain embodiments, OptiMEM may be supplemented with 2-mercaptoethanol prior to use.

In certain embodiments, the OptiPrep solution is prepared and refractive index indicative of desired density is measured (R.I. 1.3456+/−0.0004) prior to use. In certain embodiments, renal cells are layered on top of the solution. In certain embodiments, the density interface or single step discontinuous density gradient is centrifuged at 800 g for 20 min at room temperature (without brake) in either a centrifuge tube (e.g., a 50 ml conical tube) or a cell processor (e.g. COBE 2991). In certain embodiments, the cellular fraction exhibiting buoyant density greater than about 1.04 g/mL is collected after centrifugation as a distinct pellet. In certain embodiments, cells maintaining a buoyant density of less than 1.04 g/mL are excluded and discarded. In certain embodiments, the cellular fraction exhibiting buoyant density greater than about 1.0419 g/mL is collected after centrifugation as a distinct pellet. In certain embodiments, cells maintaining a buoyant density of less than 1.0419 g/mL are excluded and discarded. In certain embodiments, the cellular fraction exhibiting buoyant density greater than about 1.045 g/mL is collected after centrifugation as a distinct pellet. In certain embodiments, cells maintaining a buoyant density of less than 1.045 g/mL are excluded and discarded. In certain embodiments, prior to the assessment of cell density or selection based on density, cells are cultured until they are at least 50% confluent and incubated overnight (e.g., at least about 8 or 12 hours) in a hypoxic incubator set for 2% oxygen in a 5% $CO_2$ environment at 37° C.

In certain embodiments, cells obtained from a kidney sample are expanded and then processed (e.g. by hypoxia and centrifugation separation) to provide a SRC population. In certain embodiments, an SRC population is produced using reagents and procedures described herein. In certain embodiments, a sample of cells from an SRC population is tested for viability before cells of the population are administration to a subject. In certain embodiments, a sample of cells from an SRC population is tested for the expression of one or more of the markers disclosed herein before cells of the population administration to a subject.

In certain embodiments, the SRCs are produced by a process comprising expanding primary renal cells (e.g., by 1, 2, 3, 4, 5, or more passages), culturing the expanded renal cells under hypoxic conditions, and then contacting the cells with a nephrotoxin (such as iodixanol, e.g., 7% iodixanol). In certain embodiments, the SRCs are produced by a process comprising expanding primary renal cells (e.g., by 1, 2, 3, 4, 5, or more passages), culturing the expanded renal cells under hypoxic conditions, and then selecting cells with a density gradient as disclosed herein. In certain embodiments, the SRCs are produced by a process comprising expanding primary renal cells (e.g., by 1, 2, 3, 4, 5, or more passages), culturing the expanded renal cells under hypoxic conditions, and then enriching tubular cells from the cells and/or depleting vascular or collecting duct cells from the expanded cells that have been cultured under hypoxic conditions.

Non-limiting examples of compositions and methods for preparing SRCs are disclosed in U.S. Patent Application Publication No. 2017/0281684 A1, the entire content of which is incorporated herein by reference.

In certain embodiments, the BRCs or SRCs are derived from a native autologous or allogeneic kidney sample. In certain embodiments, the BRCs or SRCs are derived from a non-autologous kidney sample. In certain embodiments, the sample may be obtained by kidney biopsy.

In certain embodiments, renal cell isolation and expansion provides a mixture of renal cell types including renal epithelial cells and stromal cells. In certain embodiments, SRC are obtained by continuous or discontinuous density gradient separation of the expanded renal cells. In certain embodiments, the primary cell type in the density gradient separated SRC population is of tubular epithelial phenotype. In certain embodiments, SRC are obtained by separation of the expanded renal cells by centrifugation across a density boundary, barrier, or interface. In certain embodiments, the primary cell type in the SRC population separated across a density boundary/barrier/interface is of tubular epithelial phenotype. In certain embodiments, the characteristics of SRC obtained from expanded renal cells are evaluated using a multi-pronged approach. In certain embodiments, cell morphology, growth kinetics and cell viability are monitored during the renal cell expansion process. In certain embodiments, SRC buoyant density and viability is characterized by centrifugation on or through a density gradient medium and Trypan Blue exclusion. In certain embodiments, SRC phenotype is characterized by flow cytometry and SRC function is demonstrated by expression of VEGF and KIM-1. In certain embodiments, cell function of SRC, preformulation, can also be evaluated by measuring the activity of two specific enzymes; GGT (γ-glutamyl transpeptidase) and LAP (leucine aminopeptidase), found in kidney proximal tubules.

In certain embodiments, cellular features that contribute to separation of cellular subpopulations via a density medium (size and granularity) can be exploited to separate cellular subpopulations via flow cytometry (forward scatter=a reflection of size via flow cytometry, and side scatter=a reflection of granularity). In certain embodiments, a density gradient or separation medium should have low toxicity towards the specific cells of interest. In certain embodiments, while the density medium should have low toxicity toward the specific cells of interest, the instant disclosure contemplates the use of mediums which play a role in the selection process of the cells of interest. In certain embodiments, and without wishing to be bound by theory, it appears that the cell populations disclosed herein recovered by the medium comprising iodixanol are iodixanol-resistant, as there is an appreciable loss of cells between the loading and recovery steps, suggesting that exposure to iodixanol under the conditions of the density gradient or density boundary, density, barrier, or density interface leads to elimination of certain cells. In certain embodiments, cells appearing after an iodixanol density gradient or density interface separation are resistant to any untoward effects of iodixanol and/or density gradient or interface exposure. In certain embodiments, a contrast medium comprising a mild to moderate nephrotoxin is used in the isolation and/or selection of a cell population, e.g. a SRC population. In certain embodiments, a "mild" nephrotoxin is a nephrotoxin that kills no more than 10% of primary renal cells when the cells are incubated in a standard medium formulation supplemented with 7% w/v of the nephrotoxin for 12 hours as assessed by a standard live/dead dye exclusion cell viability assay. In certain embodiments, SRCs are iodixanol-resistant. In certain embodiments, the density medium should not bind to proteins in human plasma or adversely affect key functions of the cells of interest.

In certain embodiments, a cell population has been enriched and/or depleted of one or more kidney cell types using fluorescent activated cell sorting (FACS). In certain embodiments, kidney cell types may be enriched and/or depleted using BD FACSAria™ or equivalent. In certain embodiments, kidney cell types may be enriched and/or depleted using FACSAria III™ or equivalent.

In certain embodiments, a cell population has been enriched and/or depleted of one or more kidney cell types using magnetic cell sorting. In certain embodiments, one or more kidney cell types may be enriched and/or depleted using the Miltenyi autoMACS® system or equivalent.

In certain embodiments, a renal cell population has been subject to three-dimensional culturing. In certain embodiments, the methods of culturing the cell populations are via continuous perfusion. In certain embodiments, the cell populations cultured via three-dimensional culturing and continuous perfusion demonstrate greater cellularity and interconnectivity when compared to cell populations cultured statically. In certain embodiments, the cell populations cultured via three dimensional culturing and continuous perfusion demonstrate greater expression of EPO, as well as enhanced expression of renal tubule-associate genes such as E-cadherin when compared to static cultures of such cell populations. In certain embodiments, a cell population cultured via continuous perfusion demonstrates a greater level of glucose and glutamine consumption when compared to a cell population cultured statically.

In certain embodiments, low or hypoxic oxygen conditions may be used in the methods to prepare a cell population provided for herein. In certain embodiments, a method of preparing a cell population may be used without the step of low oxygen conditioning. In certain embodiments, normoxic conditions may be used.

In certain embodiments, a renal cell population has been isolated and/or cultured from kidney tissue. Non-limiting examples of methods are disclosed herein for separating and isolating the renal cellular components, e.g., enriched cell populations that will be used in the formulations for therapeutic use, including the treatment of kidney disease, anemia, EPO deficiency, tubular transport deficiency, and glomerular filtration deficiency. In certain embodiments, a cell population is isolated from freshly digested, i.e., mechanically or enzymatically digested, kidney tissue or from a heterogeneous in vitro culture of mammalian kidney cells.

In certain embodiments, the renal cell population comprises EPO-producing kidney cells. In certain embodiments, a subject has anemia and/or EPO deficiency. In certain embodiments, EPO-producing kidney cell populations that are characterized by EPO expression and bioresponsiveness to oxygen, such that a reduction in the oxygen tension of the culture system results in an induction in the expression of EPO. In certain embodiments, the EPO-producing cell populations are enriched for EPO-producing cells. In certain embodiments, the EPO expression is induced when the cell population is cultured under conditions where the cells are subjected to a reduction in available oxygen levels in the culture system as compared to a cell population cultured at normal atmospheric (about 21%) levels of available oxygen. In certain embodiments, EPO-producing cells cultured in lower oxygen conditions express greater levels of EPO relative to EPO-producing cells cultured at normal oxygen conditions. In general, the culturing of cells at reduced levels of available oxygen (also referred to as hypoxic culture conditions) means that the level of reduced oxygen is reduced relative to the culturing of cells at normal atmospheric levels of available oxygen (also referred to as normal or normoxic culture conditions). In certain embodiments, hypoxic cell culture conditions include culturing cells at about less than 1% oxygen, about less than 2% oxygen, about less than 3% oxygen, about less than 4% oxygen, or about less than 5% oxygen. In certain embodiments, culture conditions include culturing cells at about 10% oxygen, about 12% oxygen, about 13% oxygen, about 14% oxygen, about 15% oxygen, about 16% oxygen, about 17% oxygen, about 18% oxygen, about 19% oxygen, about 20% oxygen, or about 21% oxygen.

In certain embodiments, induction or increased expression of EPO is obtained and can be observed by culturing cells at about less than 5% available oxygen and comparing EPO expression levels to cells cultured at atmospheric (about 21%) oxygen. In certain embodiments, the induction of EPO is obtained in a culture of cells capable of expressing EPO by a method that includes a first culture phase in which the culture of cells is cultivated at atmospheric oxygen (about 21%) for some period of time and a second culture phase in which the available oxygen levels are reduced and the same cells are cultured at about less than 5% available oxygen. In certain embodiments, the EPO expression that is responsive to hypoxic conditions is regulated by HIF1α. In certain embodiments, other oxygen manipulation culture conditions known in the art may be used for the cells described herein.

In certain embodiments, the formulation contains enriched populations of EPO-producing mammalian cells characterized by bio-responsiveness (e.g., EPO expression) to perfusion conditions. In certain embodiments, the perfusion conditions include transient, intermittent, or continuous fluid flow (perfusion). In certain embodiments, the EPO expression is mechanically-induced when the media in which the cells are cultured is intermittently or continuously circulated or agitated in such a manner that dynamic forces are transferred to the cells via the flow. In certain embodiments, the cells subjected to the transient, intermittent, or continuous fluid flow are cultured in such a manner that they are present as three-dimensional structures in or on a material that provides framework and/or space for such three-dimensional structures to form. In certain embodiments, the cells are cultured on porous beads and subjected to intermittent or continuous fluid flow by means of a rocking platform, orbiting platform, or spinner flask. In certain embodiments, the cells are cultured on three-dimensional scaffolding and placed into a device whereby the scaffold is stationary and fluid flows directionally through or across the scaffolding. Those of ordinary skill in the art will appreciate that other perfusion culture conditions known in the art may be used for the cells described herein.

In certain embodiments, a cell population is derived from a kidney biopsy. In certain embodiments, a cell population is derived from whole kidney tissue. In certain embodiments, a cell population is derived from an in vitro culture of mammalian kidney cells, established from kidney biopsies or whole kidney tissue. In certain embodiments, the renal cell population is a SRC population. In certain embodiments, a cell population is an unfractionated cell population, also referred to herein as a non-enriched cell population.

Compositions containing a variety of active agents (e.g., other than renal cells or microvesicles) are included herein. In certain embodiments, microvesicles (e.g., exosomes) provided herein comprise a compound that was present in the culture medium of the renal cell population that secreted the microvesicles (e.g., exosomes). In certain embodiments, microvesicles (e.g., exosomes) provided herein comprise a compound that was present in the the renal cell population that secreted the microvesicles (e.g., exosomes).

Non-limiting examples of suitable active agents include, without limitation, cellular aggregates, acellular biomaterials, secreted products from bioactive cells, large and small molecule therapeutics, as well as combinations thereof. For example, one type of bioactive cells may be combined with biomaterial-based microcarriers with or without therapeutic molecules or another type of bioactive cells. In certain embodiments, unattached cells may be combined with acellular particles.

In certain embodiments, cells of the renal cell population are within spheroids. In certain embodiments, the renal cell population is in the form of spheroids. In certain embodiments, spheroids comprising bioactive renal cells are administered to a subject. In certain embodiments, the spheroids comprise at least one non-renal cell type or population of cells. In certain embodiments, the a spheroids are produced in a method comprising (i) combining a bioactive renal cell population and a non-renal cell population, and (ii) culturing the bioactive renal cell population and the non-renal cell population in a 3-dimensional culture system comprising a spinner flask until the spheroids form.

In certain embodiments, the non-renal cell population comprises an endothelial cell population or an endothelial progenitor cell population. In certain embodiments, the bioactive cell population is an endothelial cell population. In certain embodiments, the endothelial cell population is a cell line. In certain embodiments, the endothelial cell population comprises human umbilical vein endothelial cells (HUVECs). In certain embodiments, the non-renal cell population is a mesenchymal stem cell population. In certain embodiments, the non-renal cell population is a stem cell population of hematopoietic, mammary, intestinal, placental, lung, bone marrow, blood, umbilical cord, endothelial, dental pulp, adipose, neural, olfactory, neural crest, or testicular origin. In certain embodiments, the non-renal cell population is an adipose-derived progenitor cell population. In certain embodiments, the cell populations are xenogeneic, syngeneic, allogeneic, autologous or combinations thereof. In certain embodiments, the bioactive renal cell population and non-renal cell population are cultured at a ratio of from 0.1:9.9 to 9.9:0.1. In certain embodiments, the bioactive renal cell population and non-renal cell population are cultured at a ratio of about 1:1. In certain embodiments, the renal cell population and bioactive cell population are suspended in growth medium.

The expanded bioactive renal cells may be further subjected to continuous or discontinuous density medium separation to obtain the SRC. Specifically, continuous or discontinuous single step or multistep density gradient centrifugation is used to separate harvested renal cell populations based on cell buoyant density. In certain embodiments, the expanded bioactive renal cells may be further subjected to separation by centrifugation across a density boundary, barrier, or interface to obtain the SRC. Specifically, centrifugation across a density boundary, barrier, or interface is used to separate harvested renal cell populations based on cell buoyant density. In certain embodiments, the SRC are generated by using, in part, the OPTIPREP (Axis-Shield) medium, comprising a 60% solution of the nonionic iodinated compound iodixanol in water. One of skill in the art, however, will recognize that any density gradient medium without limitation of specific medium or other means, e.g., immunological separation using cell surface markers known in the art, comprising necessary features for isolating the cell populations of the instant disclosure may be used in accordance with the disclosure. For example, Percoll® [colloidal silica particles of 15-30 nm diameter (23% w/w in water) which have been coated with polyvinylpyrrolidone (PVP)] or sucrose may be used to form a density gradient or density boundary. In certain embodiments, the cellular fraction exhibiting buoyant density greater than about 1.04 g/mL is collected after centrifugation as a distinct pellet. In certain embodiments, cells maintaining a buoyant density of less than 1.04 g/mL are excluded and discarded. In certain embodiments, the cellular fraction exhibiting buoyant density greater than about 1.0419 g/mL is collected after centrifugation as a distinct pellet. In certain embodiments, cells maintaining a buoyant density of less than 1.0419 g/mL are excluded and discarded. In certain embodiments, the cellular fraction exhibiting buoyant density greater than about 1.045 g/mL is collected after centrifugation as a distinct pellet. In certain embodiments, cells maintaining a buoyant density of less than 1.045 g/mL are excluded and discarded.

In certain embodiments, therapeutic compositions, and formulations thereof, of the present disclosure may contain (i) isolated, heterogeneous populations of kidney cells, enriched for specific bioactive components or cell types and/or depleted of specific inactive or undesired components or cell types, and/or (ii) microvesicles (e.g., exosomes) secreted by such cells, for use in the treatment of kidney disease, i.e., providing stabilization and/or improvement and/or regeneration of kidney function and/or structure. Non-limiting examples of cells for providing such stabilization and/or improvement were previously described in Presnell et al. U.S. Pat. No. 8,318,484 and Ilagan et al. PCT/US2011/036347 and Jain et al. PCT/US2016/044866, the entire contents of each of which are incorporated herein by reference. In certain embodiments, compositions provided herein may contain isolated renal cell fractions that lack cellular components as compared to a healthy individual yet retain therapeutic properties, i.e., provide stabilization and/or improvement and/or regeneration of kidney function. In certain embodiments, the cell populations, cell fractions, and/or secreted products of cells described herein may be derived from healthy individuals, individuals with a kidney disease, or subjects as described herein.

In certain embodiments, the source of cells is the same as the intended target organ or tissue. For example, BRCs and/or SRCs may be sourced from the kidney to be used in a formulation to be administered to the kidney. In certain embodiments, the cell populations are derived from a kidney biopsy. In certain embodiments, the cell populations are derived from whole kidney tissue. In certain embodiments, the cell populations are derived from in vitro cultures of mammalian kidney cells, established from kidney biopsies or whole kidney tissue. In certain embodiments, the BRCs and/or SRCs comprise heterogeneous mixtures or fractions of bioactive renal cells. The BRCs and/or SRCs may be derived from or are themselves renal cell fractions from healthy individuals. In addition, the present disclosure provides renal cell fractions obtained from an unhealthy individual that may lack certain cellular components when compared to the corresponding renal cell fractions of a healthy individual, yet still retain therapeutic properties. The present disclosure also provides therapeutically-active cell populations lacking cellular components compared to a healthy individual, which cell populations can be, in certain embodiments, isolated and expanded from autologous sources in various disease states.

In certain embodiments, the SRCs are obtained from isolation and expansion of renal cells from a patient's renal cortical tissue via a kidney biopsy. Renal cells are isolated from the kidney tissue by enzymatic digestion, expanded using standard cell culture techniques, and selected by centrifugation of the expanded renal cells across a density boundary, barrier, or interface. In this embodiment, SRC are composed primarily of renal tubular epithelial cells which are known for their regenerative potential (Bonventre J V. Dedifferentiation and proliferation of surviving epithelial cells in acute renal failure. J Am Soc Nephrol. 2003; 14(Suppl. 1):555-61; Humphreys B D, Czerniak S, DiRocco D P, et al. Repair of injured proximal tubule does not involve specialized progenitors. PNAS. 2011; 108:9226-31; Humphreys B D, Valerius M T, Kobayashi A, et al. Intrinsic epithelial cells repair the kidney after injury. Cell Stem Cell. 2008; 2:284-91). Other parenchymal (vascular) and stromal cells may be present in the autologous SRC population. In certain embodiments, renal cells are selected by centrifugation through a continuous or discontinuous single step or multistep gradient.

Included herein are therapeutic compositions comprising both vesicles (e.g., microvesicles such as exosomes) and selected renal cells. In certain embodiments, the combination of vesicles and cells provides stabilization and/or improvement and/or repair and/or regeneration of kidney function in the subject. The therapeutic properties may include a repair or regenerative effect.

In certain embodiments, the cells are genetically modified (e.g., genomically modified and/or modified via RNAi) immunoprovileged BRCs (such as SRCs).

In certain embodiments, the vesicles are obtained from genetically modified (e.g., genomically modified and/or modified via RNAi) immunoprovileged BRCs (such as SRCs).

In certain embodiments, the genetically modified BRCs are genomically modified BRCs (i.e., BRCs with a genetic modification in the genomes thereof). In certain embodiments, the genetically modified BRCs comprise an exogenous polynucleotide (such as a plasmid or a viral vector) that expresses an RNA interference (RNAi) molecule that reduces expression of a genomic immunogenicity gene in a BRC. In certain embodiments, the RNAi molecule is a short interfering or a short hairpin RNA molecule. In certain embodiments, the method includes genetically modifying a genomic immunogenicity gene in a BRC.

In certain embodiments, the gene encodes a protein within a major histocompatibility complex (MHC) class I molecule or a MHC class II molecule. In certain embodiments, the gene is a beta-2 microglobulin (B2M also known as (32M), human leukocyte antigen (HLA)-A, HLA-B, HLA-C, HLA-DRA, HLA-DRB1, HLA-DRB3, HLA-DRB4, HLA-DRB5, HLA-DPA1, HLA-DPA2, HLA-DQA1, or HLA-DQB1 gene.

In certain embodiments, the gene encodes a minor histocompatibility antigen (MiHA or mHA). In certain embodiments, the gene is a HA-1, HA-2, HA-8, HB-1, HY-A1, HY-A2, HY-B7, HY-B8, HY-B60, or HY-DQ5 gene.

In certain embodiments, any allelic variant of an HLA gene, B2M, or an mHA gene mentioned herein may be modified (e.g., deleted) or targeted with RNA interference.

In certain embodiments, genetically modifying the gene comprises mutating the gene. In certain embodiments, mutating the gene comprises deleting the gene or a portion thereof.

In certain embodiments, genetically modifying a cell includes mutating any combination of two or more of a B2M, HLA-A, HLA-B, HLA-C, HLA-DRA, HLA-DRB1, HLA-DRB3, HLA-DRB4, HLA-DRB5, HLA-DPA1, HLA-DPA2, HLA-DQA1, and/or HLA-DQB1 gene.

In certain embodiments, the genetically modified BRCs are genetically modified primary renal cells. In certain embodiments, the genetically modified primary renal cells have been passaged at least about 1, 2, 3, 4, 5 or more times before or after genetic modification. In certain embodiments, the method further includes obtaining SRCs from the genetically modified BRCs. In certain embodiments, SRCs are obtained, and then genetically modified.

In certain embodiments, the BRCs are SRCs. Various non-limiting examples of SRCs are disclosed herein.

In certain embodiments, a BRC is genetically modified while within a population of BRCs, wherein fewer than all of the cells in the population of BRCs becomes genetically modified. In certain embodiments, the method further comprises isolating or enriching a genetically modified BRC from a population of BRCs. In certain embodiments, the method further comprises isolating or enriching a genetically modified SRC from a population of SRCs. In certain embodiments, a population of BRCs (e.g. SRCs) is subjected to genetic modification to yield a population of BRCs in which some cells are genetically modified and other cells are not. In certain embodiments, some of the genetically modified cells are homozygous for the modification. In certain embodiments, some of the genetically modified cells are heterozygous for the modification. In certain embodiments, cells that are homozygous for the modification are enriched or selected. In certain embodiments, cells that are heterozygous for the modification are enriched or selected. In certain embodiments, cells that are homozygous or heterozygous for the modification are enriched or selected. In certain embodiments, the modification is a mutation that reduces the expression of a protein encoded by the gene. In certain embodiments, the mutation reduces the level of the protein on the surface of modified cells. In certain embodiments, cells that express the protein are depleted or excluded. In certain embodiments, the mutation reduces the level of a MHC class I molecule and/or a MHC class II molecule on the surface of a cell. In certain embodiments, cells with the mutation do not have a MHC class I molecule and/or a MHC class II molecule on the surface thereof. In certain embodiments, cells that express a MHC class I molecule on the surfaces thereof are depleted or excluded. In certain embodiments, cells that express a MHC class II molecule on the surfaces thereof are depleted or excluded. In certain embodiments, a cell sorting method is used to remove cells that express the protein, a MHC class I molecule, and/or a MHC class II molecule from the population. In certain embodiments, the cell sorting method comprises an agent (such as an antibody) that binds to the protein, a MHC class I molecule, and/or a MHC class II molecule. In certain embodiments, depletion or selection of cells comprises bead/antibody coupling to pull out cells with certain proteins on their cell surface. In certain embodiments, the cell sorting method is magnetic activated cell sorting (MACS) or fluorescence-activated cell sorting (FACS). In certain embodiments, the gene chosen for genetic modification is one whose protein is expressed on the cell surface, so FACS and/or MACS technology can differentiate (e.g., based on antibody binding onto the surface) of the live cell. In certain embodiments, MACs is used to remove cells that express a MHC molecule (such as a MHC class I molecule or a MHC class II molecule) from cells that do not. In certain embodiments, an integrating or non-integrating vector may be used to express another HLA component polypeptide to further modify or modulate the adaptive or innate immune system as for example, to prevent targeting and lysis by Natural-Killer (NK) cells.

In certain embodiments, genetically modifying (e.g., mutating) the gene comprises (i) expressing a gene editing protein in the BRC; or (ii) delivering a gene editing protein across the cell membrane of the BRC. In certain embodiments, the gene editing protein is a zinc finger nuclease (ZFN), a transcription activator-like effector nuclease (TALEN), a megaTAL, or an RNA-guided endonuclease. In certain embodiments, the RNA-guided endonuclease is a Cas protein. In certain embodiments, the Cas protein is a Cas9 protein. In certain embodiments, genetically modifying the gene further comprises (i) expressing a guide single-guide RNA (gRNA) in the BRC; or (ii) delivering a guide single-guide RNA (gRNA) across the cell membrane of the BRC. In certain embodiments, the Cas9 protein and the gRNA are part of a ribonucleoprotein complex.

In certain embodiments, genetically modifying the gene reduces the amount of MHC class I on the surface of the cell. In certain embodiments, genetically modifying the gene reduces the amount of MHC class II on the surface of the cell. In certain embodiments, the method comprises genetically modifying at two or more genes, wherein at least one of the genes encodes a protein within a MHC class I molecule and at least one of the genes is encodes a protein within a MHC class II molecule. In certain embodiments, at least one of the genes is an HLA gene.

Non-limiting descriptions regarding genetically modified BRCs, including production methods, are described in PCT Application No. PCT/US18/38801, filed Jun. 21, 2018.

In certain embodiments, the source of cells is the same as the intended target organ or tissue from the same or different sources. For example, BRCs and/or SRCs may be sourced from the kidney to be used in a formulation to be administered to the kidney (together with or separately from vesicles). In certain embodiments, BRCs and/or SRCs may be sourced from the kidney to be used to produce vesicles to be administered to the kidney. In certain embodiments, the cell populations are derived from a kidney biopsy. In certain embodiments, the cell populations are derived from whole kidney tissue. In certain embodiments, the cell populations are derived from in vitro cultures of mammalian kidney cells, established from kidney biopsies or whole kidney tissue. In certain embodiments, the BRC and/or SRC comprise heterogeneous mixtures or fractions of genetically modified (e.g., genomically modified and/or modified via RNAi) immunoprivilaged bioactive renal cells. The BRC and/or SRC may be derived from or are themselves renal cell fractions from healthy individuals. In addition, the present invention provides renal cell fractions obtained from an unhealthy individual that may lack certain cellular components when compared to the corresponding renal cell fractions of a healthy individual, yet still retain therapeutic properties. The present invention also provides therapeutically-active cell populations lacking cellular components compared to a healthy individual, which cell populations can be, in one embodiment, isolated and expanded from kidneys sourced from various mammals.

In certain embodiments, the SRCs are obtained from isolation and expansion of renal cells from a different patient's renal cortical tissue via a kidney biopsy. In certain embodiments, renal cells are isolated from the kidney tissue by enzymatic digestion, expanded using standard cell culture techniques, and selected by density gradient centrifugation from the expanded renal cells. In certain embodiments, SRC are composed primarily of renal epithelial cells which are known for their immunoprivilaged and regenerative potential. Other parenchymal (vascular) and stromal cells may be sparsely present in the SRC population.

As described herein, the present invention is based, in part, on the surprising finding that certain subfractions of a heterogeneous population of renal cells, enriched for bioactive components and depleted of inactive or undesired components, provide superior therapeutic and regenerative outcomes than the starting population.

In certain embodiments, renal cell isolation and expansion provides a mixture of renal cell types including renal epithelial cells and stromal cells. In certain embodiments, SRC are obtained by density gradient separation of the expanded renal cells. In certain embodiments, the primary cell type in the density gradient separated SRC population is of tubular epithelial phenotype. In certain embodiments, SRC phenotype is characterized by flow cytometry and SRC function is demonstrated by expression of VEGF and KIM-1.

Those of ordinary skill in the art will appreciate that other methods of isolation and culturing known in the art may be used for the cells described herein. Those of ordinary skill in the art will also appreciate that bioactive cell populations may be derived from sources other than those specifically listed above, including, without limitation, tissues and organs other than the kidney, body fluids and adipose.

SRC Phenotype

In certain embodiments, microvesicles (e.g., exosomes) secreted by SRCs and/or SRCs are administered to a subject who has or is at risk of a kidney disease.

In certain embodiments, cell phenotype is monitored by expression analysis of renal cell markers using flow cytometry. Phenotypic analysis of cells is based on the use of antigenic markers specific for the cell type being analyzed. Flow cytometric analysis provides a quantitative measure of cells in the sample population which express the antigenic marker being analyzed.

A variety of markers have been reported in the literature as being useful for phenotypic characterization of renal tubular epithelial cells: (i) cytokeratins; (ii) transport membrane proteins (aquaporins and cubilin); (iii) cell binding molecules (adherins and cluster of differentiation and lectins); and (iv) metabolic enzymes (glutathione and gamma-glutamyl transpeptidase (GGT)). (Table 1) Since the majority of cells found in cultures derived from whole kidney digests are epithelial and endothelial cells, the markers examined focus on the expression of proteins specific for these two groups.

TABLE 1

Phenotypic Markers for SRC Characterization

| Antigenic marker | Reactivity |
| --- | --- |
| CK8/18/19 | Epithelial cells, proximal and distal tubules |
| CK8 | Epithelial cells, proximal tubules |
| CK18 | Epithelial cells, proximal tubules |
| CK19 | Epithelial cells, collecting ducts, distal tubules |
| CK7 | Epithelial cells, collecting ducts, distal tubules |
| CXCR4 | Epithelial cells, distal and proximal tubules |
| E-cadherin | Epithelial cells, distal tubules |
| Cubilin | Epithelial cells, proximal tubules |
| Aquaporin1 | Epithelial cells, proximal tubules, descending thin limb |
| GGT1 | Fetal and adult kidney cells, proximal tubules |
| Aquaporin2 | Renal collecting duct cells, distal tubules |
| DBA | Renal collecting duct cells, distal tubules |
| CD31 | Endothelial cells of the kidney (rat) |
| CD146 | Endothelial cells of the kidney (canine, human) |
| MHC//minor HC Antigen | Reduced to render cells immunoprivileged |

Table 2 provides selected markers, range and mean percentage values of phenotypic in the SRC population and the rationale for their selection.

TABLE 2

Marker Selected for Phenotypic Analysis of SRC

| Phenotypic Marker | Expression Range | Average | Rationale | Expression Level |
| --- | --- | --- | --- | --- |
| CK18 | 81.1 to 99.7% (n = 87) | 96.7% | Epithelial marker | High |
| GGT1 | 4.5 to 81.2% (n = 63) | 50.7% | Functional Tubular marker | Moderate |
| MHC//minor HC Antigen | Reduced to render cells immunoprivileged | >90% | Immuno-privilege | Low |

Cell Function

SRC actively secrete proteins which can be detected through analysis of conditioned medium. Cell function is assessed by the ability of cells to metabolize PrestoBlue and to secrete VEGF (Vascular Endothelial Growth Factor) and KIM-1 (Kidney Injury Molecule-1).

Table 3 presents VEGF and KIM-1 quantities present in conditioned medium from renal cells and SRC cultures. Renal cells were cultured to near confluence. Conditioned medium from overnight exposure to the renal cell cultures was tested for VEGF and KIM-1.

TABLE 3

Production of VEGF and KIM-1 by Human Renal Cells and SRC

| Conditioned Medium | VEGF | | KIM-1 | |
| --- | --- | --- | --- | --- |
| | ng/mL | ng/million cells | ng/mL | ng/million cells |
| Renal Cell Culture (n = 15) | 0.50 to 2.42 | 2.98 to 14.6 | 0.20 to 3.41 | 1.14 to 15.2 |
| SRC (n = 14) | 0.80 to 3.85 | 4.83 to 23.07 | 0.32 to 2.10 | 1.93 to 12.59 |

SRC Enzymatic Activity

Cell function of SRC, pre-formulation, can also be evaluated by measuring the activity of two specific enzymes; GGT (γ-glutamyl transpeptidase) and LAP (leucine aminopeptidase), found in kidney proximal tubules.

Although microvesicle (e.g., exosome) and selected renal cell compositions are described herein, the present invention contemplates compositions containing a variety of other active agents. Other suitable active agents include, without limitation, cellular aggregates, acellular biomaterials, large and small molecule therapeutics, as well as combinations thereof. For example, one type of bioactive cells may be combined with biomaterial-based microcarriers with or without therapeutic molecules or another type of bioactive cells, unattached cells may be combined with acellular particles.

Cellular Aggregates

In an aspect, the formulations of the present disclosure contain cellular aggregates or spheroids and/or microvesicles (e.g., exosomes) secreted by such aggregates or spheroids and/or microvesicles (e.g., exosomes) secreted by bioactive cells that are not in aggregates or spheroids.

In certain embodiments, a cellular aggregate comprises a bioactive cell population described herein. In certain embodiments, the cellular aggregate comprises bioactive renal cells such as, for example, renal cell admixtures, enriched renal cell populations, and combinations of renal cell fractions and admixtures of renal cells with mesenchymal stem cells, endothelial progenitor cells, cells derived from the stromal vascular fraction of adipose, or any other non-renal cell population without limitation.

In certain embodiments, the bioactive renal cells of the disclosure may be cultured in 3D formats as described further herein. In certain embodiments, the term "organoid" refers to an accumulation of cells, with a phenotype and/or function, that recapitulates aspects of native kidney. In certain embodiments, organoids comprise mixed populations of cells, of a variety of lineages, which are typically found in vivo in a given tissue. In certain embodiments, the organoids of this disclosure are formed in vitro, via any means, whereby the cells of the disclosure form aggregates, which in turn may form spheroids, organoids, or a combination thereof. Such aggregates, spheroids or organoids, in certain embodiments, assume a structure consistent with a particular organ. In certain embodiments, such aggregates, spheroids or organoids, express surface markers, which are typically expressed by cells of the particular organ. In certain embodiments, such aggregates, spheroids or organoids, produce compounds or materials, which are typically expressed by cells of the particular organ. In certain embodiments, the cells of the disclosure may be cultured on natural substrates, e.g., gelatin. In certain embodiments, the cells of the disclosure may be cultured on synthetic substrates, e.g., PLGA.

Biomaterials

A variety of biomaterials may be combined with an active agent to provide the therapeutic formulations of the present disclosure. In certain embodiments, the biomaterials may be in any suitable shape (e.g., beads) or form (e.g., liquid, gel, etc.). Suitable biomaterials in the form of polymeric matrices are described in Bertram et al. U.S. Published Application 20070276507 (incorporated herein by reference in its entirety). In certain embodiments, polymeric matrices or scaffolds may be shaped into any number of desirable configurations to satisfy any number of overall system, geometry, or space restrictions. In certain embodiments, a biomaterial is in the form of a liquid suspension. In certain embodiments, the matrices or scaffolds of the present disclosure may be three-dimensional and shaped to conform to the dimensions and shapes of an organ or tissue structure. For example, in the use of the polymeric scaffold for treating kidney disease, tubular transport deficiency, or glomerular filtration deficiency, a three-dimensional (3-D) matrix may be used that recapitulates aspects or the entirety of native kidney tissue structure and organization as well as that of renal parenchyma.

A variety of differently shaped 3-D scaffolds may be used. Naturally, the polymeric matrix may be shaped in different sizes and shapes to conform to differently sized patients. The polymeric matrix may also be shaped in other ways to accommodate the special needs of the patient. In certain embodiments, the polymeric matrix or scaffold may be a biocompatible, material (such as a porous polymeric scaffold). The scaffolds may be formed from a variety of synthetic or naturally-occurring materials including, but not limited to, open-cell polylactic acid (OPLA®), cellulose ether, cellulose, cellulosic ester, fluorinated polyethylene, phenolic, poly-4-methylpentene, polyacrylonitrile, polyamide, polyamideimide, polyacrylate, polybenzoxazole, polycarbonate, polycyanoarylether, polyester, polyestercarbonate, polyether, polyetheretherketone, polyetherimide, polyetherketone, polyethersulfone, polyethylene, polyfluoroolefin, polyimide, polyolefin, polyoxadiazole, polyphenylene oxide, polyphenylene sulfide, polypropylene, polystyrene, polysulfide, polysulfone, polytetrafluoroethylene, polythioether, polytriazole, polyurethane, polyvinyl, polyvinylidene fluoride, regenerated cellulose, silicone, urea-formaldehyde, collagens, gelatin, alginate, laminins, fibronectin, silk, elastin, alginate, hyaluronic acid, agarose, or copolymers or physical blends thereof. Scaffolding configurations may range from soft porous scaffolds to rigid, shape-holding porous scaffolds. In certain embodiments, a scaffold is configured as a liquid solution that is capable of becoming a hydrogel, e.g., hydrogel that is above a melting temperature.

In certain embodiments, the scaffold is derived from an existing kidney or other organ of human or animal origin, where the native cell population has been eliminated through application of detergent and/or other chemical agents and/or other enzymatic and/or physical methodologies known to those of ordinary skill in the art. In this embodiment, the native three dimensional structure of the source organ is retained together with all associated extracellular matrix components in their native, biologically active context. In certain embodiments, the scaffold is extracellular matrix derived from human or animal kidney or other organ. In certain embodiments, the configuration is assembled into a tissue-like structure through application of three dimensional bioprinting methodologies. In certain embodiments, the configuration is the liquid form of a solution that is capable of becoming a hydrogel.

In certain embodiments, the biomaterial is a hydrogel. Hydrogels may be formed from a variety of polymeric materials and are useful in a variety of biomedical applications. Hydrogels can be described physically as three-dimensional networks of hydrophilic polymers. Depending on the type of hydrogel, they contain varying percentages of water, but altogether do not dissolve in water. Despite their high water content, hydrogels are capable of additionally binding great volumes of liquid due to the presence of hydrophilic residues. Hydrogels swell extensively without changing their gelatinous structure. The basic physical features of a hydrogel can be specifically modified, according to the properties of the polymers used and a device used to administer the hydrogel.

The hydrogel material preferably does not induce an inflammatory response. Examples of other materials which can be used to form a hydrogel include (a) modified alginates, (b) polysaccharides (e.g. gellan gum and carrageenans) which gel by exposure to monovalent cations, (c) polysaccharides (e.g., hyaluronic acid) that are very viscous liquids or are thixotropic and form a gel over time by the slow evolution of structure, (d) gelatin or collagen, and (e) polymeric hydrogel precursors (e.g., polyethylene oxide-polypropylene glycol block copolymers and proteins). U.S. Pat. No. 6,224,893 B1 provides a detailed description of the various polymers, and the chemical properties of such polymers, that are suitable for making hydrogels in accordance with the present disclosure.

In certain embodiments, the hydrogel used to formulate the biomaterials of the present disclosure is gelatin-based. Gelatin is a non-toxic, biodegradable and water-soluble protein derived from collagen, which is a major component of mesenchymal tissue extracellular matrix (ECM). Collagen is the main structural protein in the extracellular space in the various connective tissues in animal bodies. As the main component of connective tissue, it is the most abundant protein in mammals, making up from 25% to 35% of the whole-body protein content. Depending upon the degree of mineralization, collagen tissues may be rigid (bone), compliant (tendon), or have a gradient from rigid to compliant (cartilage). Collagen, in the form of elongated fibrils, is mostly found in fibrous tissues such as tendons, ligaments and skin. It is also abundant in corneas, cartilage, bones, blood vessels, the gut, intervertebral discs and the dentin in teeth. In muscle tissue, it serves as a major component of the endomysium. Collagen constitutes one to two percent of muscle tissue, and accounts for 6% of the weight of strong, tendinous muscles. Collagen occurs in many places throughout the body. Over 90% of the collagen in the human body, however, is type I.

To date, 28 types of collagen have been identified and described. They can be divided into several groups according to the structure they form: Fibrillar (Type I, II, III, V, XI). Non-fibrillar FACIT (Fibril Associated Collagens with Interrupted Triple Helices) (Type IX, XII, XIV, XVI, XIX). Short chain (Type VIII, X). Basement membrane (Type IV). Multiplexin (Multiple Triple Helix domains with Interruptions) (Type XV, XVIII). MACIT (Membrane Associated Collagens with Interrupted Triple Helices) (Type XIII, XVII). Other (Type VI, VII). The five most common types are: Type I: skin, tendon, vascular ligature, organs, bone (main component of the organic part of bone). Type II: cartilage (main collagenous component of cartilage) Type III: reticulate (main component of reticular fibers), commonly found alongside type I. Type IV: forms basal lamina, the epithelium-secreted layer of the basement membrane. Type V: cell surfaces, hair and placenta.

Gelatin retains informational signals including an arginine-glycine-aspartic acid (RGD) sequence, which promotes cell adhesion, proliferation and stem cell differentiation. A characteristic property of gelatin is that it exhibits Upper Critical Solution Temperature behavior (UCST). In certain embodiments, above a specific temperature threshold of 40° C., gelatin can be dissolved in water by the formation of flexible, random single coils. Upon cooling, hydrogen bonding and Van der Waals interactions occur, resulting in the formation of triple helices. These collagen-like triple helices act as junction zones and thus trigger the sol-gel transition. Gelatin is widely used in pharmaceutical and medical applications.

In certain embodiments, the hydrogel used to formulate the injectable cell compositions herein is based on porcine gelatin, which may be sourced from porcine skin and is commercially available, for example from Nitta Gelatin NA Inc (NC, USA) or Gelita USA Inc. (IA, USA). Gelatin may be dissolved, for example, in Dulbecco's phosphate-buffered saline (DPBS) to form a thermally responsive hydrogel, which can gel and liquefy at different temperatures. In certain embodiments, the hydrogel used to formulate the injectable cell compositions herein is based on recombinant human or animal gelatin expressed and purified using methodologies known to those of ordinary skill in the art. In certain embodiments, an expression vector containing all or part of the cDNA for Type I, alpha I human collagen is expressed in the yeast *Pichia pastoris*. Other expression vector systems and organisms will be known to those of ordinary skill in the art. In a particular embodiment, the gelatin-based hydrogel of the present disclosure is liquid at and above room temperature (22-28° C.) and gels when cooled to refrigerated temperatures (2-8° C.).

Those of ordinary skill in the art will appreciate that other types of synthetic or naturally-occurring materials known in the art may be used to form scaffolds as described herein.

In certain embodiments, the biomaterial used in accordance with the present disclosure is comprised of hyaluronic acid (HA) in hydrogel form, containing HA molecules ranging in size from 5.1 kDA to >2×10$^5$ kDa. HA may promote branching morphogenesis and three dimensional self-organization of associated bioactive cell populations. In certain embodiments, the biomaterial used in accordance with the present disclosure is comprised of hyaluronic acid in porous foam form, also containing HA molecules ranging in size from 5.1 kDA to >2×10$^5$ kDa. In certain embodiments, the hydrogel is derived from, or contains extracellular matrix sourced from kidney or any other tissue or organ without limitation. In yet another embodiment, the biomaterial used in accordance with the present disclosure is comprised of a poly-lactic acid (PLA)-based foam, having an open-cell structure and pore size of about 50 microns to about 300 microns.

Temperature-Sensitive Biomaterials

The biomaterials described herein may also be designed or adapted to respond to certain external conditions, e.g., in vitro or in vivo. In certain embodiments, the biomaterials are temperature-sensitive (e.g., either in vitro or in vivo). In certain embodiments, the biomaterials are adapted to respond to exposure to enzymatic degradation (e.g., either in vitro or in vivo). The biomaterials' response to external conditions can be fine-tuned as described herein. Temperature sensitivity of the formulation described can be varied by adjusting the percentage of a biomaterial in the formulation. For example, the percentage of gelatin in a solution can be adjusted to modulate the temperature sensitivity of the gelatin in the final formulation (e.g., liquid, gel, beads, etc.). Alternatively, biomaterials may be chemically crosslinked to provide greater resistance to enzymatic degradation. For instance, a carbodiimide crosslinker may be used to chemically crosslink gelatin beads thereby providing a reduced susceptibility to endogenous enzymes.

In an aspect, the formulations described herein incorporate biomaterials having properties which create a favorable environment for the active agent, such as microvesicles (e.g., exosomes) and/or bioactive renal cells, to be administered to a subject. In certain embodiments, the formulation contains a first biomaterial that provides a favorable environment from the time the active agent is formulated with the biomaterial up until the point of administration to the subject. In certain embodiments, the favorable environment concerns the advantages of having bioactive cells suspended in a substantially solid state versus cells in a fluid (as described herein) prior to administration to a subject. In certain embodiments, the first biomaterial is a temperature-sensitive biomaterial. The temperature-sensitive biomaterial may have (i) a substantially solid state at about 8° C. or below, and (ii) a substantially liquid state at ambient temperature or above. In certain embodiments, the ambient temperature is about room temperature.

In certain embodiments, the biomaterial is a temperature-sensitive biomaterial that can maintain at least two different phases or states depending on temperature. The biomaterial is capable of maintaining a first state at a first temperature, a second state at a second temperature, and/or a third state at a third temperature. The first, second or third state may be a substantially solid, a substantially liquid, or a substantially semi-solid or semi-liquid state. In certain embodiments, the biomaterial has a first state at a first temperature and a second state at a second temperature, wherein the first temperature is lower than the second temperature.

In certain embodiments, the state of the temperature-sensitive biomaterial is a substantially solid state at a temperature of about 8° C. or below. In certain embodiments, the substantially solid state is maintained at about 1° C., about 2° C., about 3° C., about 4° C., about 5° C., about 6° C., about 7° C., or about 8° C. In certain embodiments, the substantially solid state has the form of a gel. In certain embodiments, the state of the temperature-sensitive biomaterial is a substantially liquid state at ambient temperature or above. In certain embodiments, the substantially liquid state is maintained at about 25° C., about 25.5° C., about 26° C., about 26.5° C., about 27° C., about 27.5° C., about 28° C., about 28.5° C., about 29° C., about 29.5° C., about 30° C., about 31° C., about 32° C., about 33° C., about 34° C., about 35° C., about 36° C., or about 37° C. In certain embodiments, the ambient temperature is about room temperature.

In certain embodiments, the state of the temperature-sensitive biomaterial is a substantially solid state at a temperature of about ambient temperature or below. In certain embodiments, the ambient temperature is about room temperature. In certain embodiments, the substantially solid state is maintained at about 17° C., about 16° C., about 15° C., about 14° C., about 13° C., about 12° C., about 11° C., about 10° C., about 9° C., about 8° C., about 7° C., about 6° C., about 5° C., about 4° C., about 3° C., about 2° C., or about 1° C. In certain embodiments, the substantially solid state has the form of a bead. In certain embodiments, the state of the temperature-sensitive biomaterial is a substantially liquid state at a temperature of about 37° C. or above. In certain embodiments, the substantially solid state is maintained at about 37° C., about 38° C., about 39° C., or about 40° C.

The temperature-sensitive biomaterials may be provided in the form of a solution, in the form of a solid, in the form of beads, or in other suitable forms described herein and/or known to those of ordinary skill in the art. The microvesicles (e.g., exosomes) and/or cell populations and preparations described herein may be coated with, deposited on, embedded in, attached to, seeded, suspended in, or entrapped in a temperature-sensitive biomaterial. In certain embodiments, the cell populations described herein may be assembled as three dimensional cellular aggregates or organoids or three dimensional tubular structures prior to complexing with the temperature-sensitive biomaterial or may be assembled as such upon complexing with the temperature-sensitive biomaterial. In certain embodiments, the temperature-sensitive biomaterial may be provided without any cells, such as, for example in the form of spacer beads. In this embodiment, the temperature sensitive biomaterial functions in a purely passive role to create space within the target organ for regenerative bioactivity, for example, angiogenesis or infiltration and migration of host cell populations.

In certain embodiments, the temperature-sensitive biomaterial has a transitional state between a first state and a second state. In certain embodiments, the transitional state is a solid-to-liquid transitional state between a temperature of about 8° C. and about ambient temperature. In certain embodiments, the ambient temperature is about room temperature. In certain embodiments, the solid-to-liquid transitional state occurs at one or more temperatures of about 8° C., about 9° C., about 10° C., about 11° C., about 12° C., about 13° C., about 14° C., about 15° C., about 16° C., about 17° C., and about 18° C.

The temperature-sensitive biomaterials have a certain viscosity at a given temperature measured in centipoise (cP). In certain embodiments, the biomaterial has a viscosity at 25° C. of about 1 cP to about 5 cP, about 1.1 cP to about 4.5 cP, about 1.2 cP to about 4 cP, about 1.3 cP to about 3.5 cP, about 1.4 cP to about 3.5 cP, about 1.5 cP to about 3 cP, about 1.55 cP to about 2.5 cP, or about 1.6 cP to about 2 cP. In certain embodiments, the biomaterial has a viscosity at 37° C. of about 1.0 cP to about 1.15 cP. The viscosity at 37° C. may be about 1.0 cP, about 1.01 cP, about 1.02 cP, about 1.03 cP, about 1.04 cP, about 1.05 cP, about 1.06 cP, about 1.07 cP, about 1.08 cP, about 1.09 cP, about 1.10 cP, about 1.11 cP, about 1.12 cP, about 1.13 cP, about 1.14 cP, or about 1.15 cP. In certain embodiments, the biomaterial is a gelatin solution. The gelatin is present at about 0.5%, about 0.55%, about 0.6%, about 0.65%, about 0.7%, about 0.75%, about 0.8%, about 0.85%, about 0.9%, about 0.95% or about 1%, (w/v) in the solution. In one example, the biomaterial is a 0.75% (w/v) gelatin solution in PBS. In certain embodiments, the 0.75% (w/v) solution has a viscosity at 25° C. of about 1.6 cP to about 2 cP. In certain embodiments, the 0.75% (w/v) solution has a viscosity at 37° C. of about 1.07 cP to about 1.08 cP. The gelatin solution may be provided in PBS, DMEM, or another suitable solvent.

In an aspect, the formulation contains microvesicles (e.g., exosomes) and/or bioactive cells combined with a second biomaterial that provides a favorable environment for the combined microvesicles (e.g., exosomes) and/or cells from the time of formulation up until a point after administration to the subject. In certain embodiments, the favorable environment provided by the second biomaterial concerns the advantages of administering microvesicles (e.g., exosomes) and/or cells in a biomaterial that retains structural integrity up until the point of administration to a subject and for a period of time after administration. In certain embodiments, the structural integrity of the second biomaterial following implantation is minutes, hours, days, or weeks. In certain embodiments, the structural integrity is less than one month, less than one week, less than one day, or less than one hour. The relatively short term structural integrity provides a formulation that can deliver the active agent and biomaterial to a target location in a tissue or organ with controlled handling, placement or dispersion without being a hindrance or barrier to the interaction of the incorporated elements with the tissue or organ into which it was placed.

In certain embodiments, the second biomaterial is a temperature-sensitive biomaterial that has a different sensitivity than the first biomaterial. The second biomaterial may have (i) a substantially solid state at about ambient temperature or below, and (ii) a substantially liquid state at about 37° C. or above. In certain embodiments, the ambient temperature is about room temperature.

In certain embodiments, the second biomaterial is crosslinked beads. The crosslinked beads may have finely tunable in vivo residence times depending on the degree of crosslinking, as described herein. In certain embodiments, the crosslinked beads comprise microvesicles (e.g., exosomes) and/or bioactive cells and are resistant to enzymatic degradation as described herein. In certain embodiments, the formulations of the present disclosure may include the first biomaterial combined with an active agent, e.g., microvesicles (e.g., exosomes) and/or bioactive cells, with or without a second biomaterial combined with an active agent, e.g., microvesicles (e.g., exosomes) and/or bioactive cells. In certain embodiments, where a formulation includes a second biomaterial, it may be a temperature sensitive bead and/or a crosslinked bead.

In an aspect, the present disclosure provides formulations that contain biomaterials which degrade over a period of time on the order of minutes, hours, or days. This is in contrast to a large body of work focusing on the implantation of solid materials that then slowly degrade over days, weeks, or months. In certain embodiments, the biomaterial has one or more of the following characteristics: biocompatibility, biodegradeability/bioresorbablity, a substantially solid state prior to and during implantation into a subject, loss of structural integrity (substantially solid state) after implantation, and cytocompatible environment to support cellular viability and proliferation. The biomaterial's ability to keep implanted particles spaced out during implantation enhances native tissue ingrowth. In certain embodiments, the biomaterial also facilitates implantation of solid formulations. In certain embodiments, the biomaterial provides for localization of the formulation described herein since insertion of a solid unit helps prevent the delivered materials from dispersing within the tissue during implantation. For cell-based formulations, a solid biomaterial also improves stability and viability of anchorage dependent cells compared to cells suspended in a fluid. However, the short duration of the structural integrity means that soon after implantation, the biomaterial does not provide a significant barrier to tissue ingrowth or integration of the delivered cells/materials with host tissue.

In an aspect, the present disclosure provides formulations that contain biomaterials which are implanted in a substantially solid form and then liquefy/melt or otherwise lose structural integrity following implantation into the body. This is in contrast to the significant body of work focusing on the use of materials that can be injected as a liquid, which then solidify in the body.

Biocompatible Beads

In an aspect, the formulation includes a temperature-sensitive biomaterial described herein and a population of biocompatible beads containing a biomaterial. In certain embodiments, the beads are crosslinked. Crosslinking may be achieved using any suitable crosslinking agent known to those of ordinary skill in the art, such as, for example, carbodiimides; aldehydes (e.g. furfural, acrolein, formaldehyde, glutaraldehyde, glyceryl aldehyde), succinimide-based crosslinkers {Bis(sulfosuccinimidyl) suberate (BS3), Disuccinimidyl glutarate (DSG), Disuccinimidyl suberate (DSS), Dithiobis(succinimidyl propionate), Ethylene glycolbis(sulfosuccinimidylsuccinate), Ethylene glycolbis(succinimidylsuccinate) (EGS), Bis(Sulfosuccinimidyl) glutarate (BS2G), Disuccinimidyl tartrate (DST); epoxides (Ethylene glycol diglycidyl ether, 1,4 Butanediol diglycidyl ether); saccharides (glucose and aldose sugars); sulfonic acids and p-toluene sulfonic acid; carbonyldiimidazole; genipin; imines; ketones; diphenylphosphorylazide (DDPA); terephthaloyl chloride; cerium (III) nitrate hexahydrate; microbial transglutaminase; and hydrogen peroxide. Those of ordinary skill in the art will appreciate other suitable crosslinking agents and crosslinking methods for use in accordance with the present disclosure.

In certain embodiments, the beads are carbodiimide-crosslinked beads. In certain embodiments, the carbodiimide-crosslinked beads may be crosslinked with a carbodiimide selected from the group consisting of 1-Ethyl-3-[3-dimethylaminopropyl] carbodiimide hydrochloride (EDC), DCC-N,N'-dicyclohexylcarbodiimide (DCC), and N,N'-Diisopropylcarbodiimide (DIPC). Beads treated with lower concentration of EDC were expected to have a higher number of free primary amines, while samples treated with high concentrations of crosslinker would have most of the primary amines engaged in amide bonds. The intensity of the orange color developed by the covalent bonding between the primary amine and picrylsulfonic acid, detectable spectrophotometrically at 335 nm, is proportional to the number of primary amines present in the sample. When normalized per milligram of protein present in the sample, an inverse correlation between the number of free amines present and the initial concentration of EDC used for crosslinking can be observed. This result is indicative of differential bead crosslinking, dictated by the amount of carbodiimide used in the reaction. In general, crosslinked beads exhibit a reduced number of free primary amines as compared to non-crosslinked beads.

In certain embodiments, the crosslinked beads have a reduced susceptibility to enzymatic degradation as compared to non-crosslinked biocompatible beads, thereby providing beads with finely tunable in vivo residence times. In certain embodiments, the crosslinked beads are resistant to endogenous enzymes, such as collagenases. In certain embodiments, the provision of crosslinked beads is part of a delivery system that facilitate one or more of: (a) delivery of attached cells to the desired sites and creation of space for regeneration and ingrowth of native tissue and vascular supply; (b) ability to persist at the site long enough to allow cells to establish, function, remodel their microenvironment and secrete their own extracellular matrix (ECM); (c) promotion of integration of the transplanted cells with the surrounding tissue; (d) ability to implant cells in a substantially solid form; (e) short term structural integrity that does not provide a significant barrier to tissue ingrowth, de novo angiogenesis or integration of delivered cells/materials with the host tissue; (f) localized in vivo delivery in a substantially solid form thereby preventing dispersion of cells within the tissue during implantation; (g) improved stability and viability of anchorage dependent cells compared to cells suspended in a fluid; and (h) biphasic release profile when cells are delivered 1) in a substantially solid form (e.g., attached to beads), and 2) in a substantially liquid form (e.g., suspended in a fluid); i) recapitulation and mimicry of the three dimensional biological niche or renal parenchyma from which bioactive cell populations were derived.

In certain embodiments, the present disclosure provides crosslinked beads containing gelatin. In certain embodiments, non-crosslinked gelatin beads are not suitable for a bioactive cell formulation because they rapidly lose integrity and cells dissipate from the injection site. In certain embodiments, highly crosslinked gelatin beads may persist too long at the injection site and may hinder the de-novo ECM secretion, cell integration, angiogenesis and tissue regeneration. The present disclosure allows for the in vivo residence time of the crosslinked beads to be finely tuned. In order to tailor the biodegradability of biomaterials, different crosslinker concentrations of carbodiimide are used while the overall reaction conditions were kept constant for all samples. For example, the enzymatic susceptibility of carbodiimide-crosslinked beads can be finely tuned by varying the concentration of crosslinking agent from about zero to about 1M. In certain embodiments, the concentration is about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 21 mM, about 22 mM, about 23 mM, about 24 mM, about 25 mM, about 26 mM, about 27 mM, about 28 mM, about 29 mM, about 30 mM, about 31 mM, about 32 mM, about 33 mM, about 34 mM, about 35 mM, about 36 mM, about 37 mM, about 38 mM, about 39 mM, about 40 mM, about 41 mM, about 42 mM, about 43 mM, about 44 mM, about 45 mM, about 46 mM, about 47 mM, about 48 mM, about 49 mM, about 50 mM, about 55 mM, about 60 mM, about 65 mM, about 70 mM, about 75 mM, about 80 mM, about 85 mM, about 90 mM, about 95 mM, or about 100 mM. The crosslinker concentration may also be about 0.15 M, about 0.2 M, about 0.25 M, about 0.3 M, about 0.35 M, about 0.4 M, about 0.45 M, about 0.5 M, about 0.55 M, about 0.6 M, about 0.65 M, about 0.7 M, about 0.75 M, about 0.8 M, about 0.85 M, about 0.9 M, about 0.95 M, or about 1 M. In certain embodiments, the crosslinking agent is 1-Ethyl-3-[3-dimethylaminopropyl]carbodiimide hydrochloride (EDC). In certain embodiments, the EDC-crosslinked beads are gelatin beads. The % degradation of the beads can be finely tuned depending upon the concentration of crosslinking agent. In certain embodiments, gelatin beads may be mixed with beads or microparticles other than gelatin (for example, without limitation, alginate or HA) to additionally facilitate the potency of the bioactive cell population being delivered.

Crosslinked beads may have certain characteristics that favor the seeding, attachment, or encapsulation of bioactive cell populations and/or microvesicles (e.g., exosomes). For example, the beads may have a porous surface and/or may be substantially hollow. In certain embodiments, the presence of pores provides an increased cell attachment surface allowing for a greater number of cells to attach as compared to a non-porous or smooth surface. In addition, the pore structure can support host tissue integration with the porous beads supporting the formation of de novo tissue. In certain embodiments, the beads have a size distribution that can be fitted to a Weibull plot corresponding to the general particle distribution pattern. In certain embodiments, the crosslinked beads have an average diameter of less than about 120 µm, about 115 µm, about 110 µm, about 109 µm, about 108 µm, about 107 µm, about 106 µm, about 105 µm, about 104 µm, about 103 µm, about 102 µm, about 101 µm, about 100 µm, about 99 µm, about 98 µm, about 97 µm, about 96 µm, about 95 µm, about 94 µm, about 93 µm, about 92 µm, about 91 µm, or about 90 µm. In certain embodiments, the characteristics of the crosslinked beads vary depending upon the casting process. In certain embodiments, a process in which a stream of air is used to aerosolize a liquid gelatin solution and spray it into liquid nitrogen with a thin layer chromatography reagent sprayer (ACE Glassware) is used to provide beads having the afore-mentioned characteristics. Those of skill in the art will appreciate that modulating the parameters of the casting process provides the opportunity to tailor different characteristics of the beads, e.g., different size distributions. In certain embodiments, the microtopography, surface and internal characteristics of the beads may be further modified to facilitate cell attachment.

In certain embodiments, the cytocompatibility of the crosslinked beads is assessed in vitro prior to formulation using cell culture techniques in which beads are cultured with cells that correspond to the final bioactive cell formulation. In certain embodiments, the beads are cultured with primary renal cells prior to preparation of a bioactive renal cell formulation and live/dead cell assays are used to confirm cytocompatibility. In addition to cellular viability, specific functional tests to measure cellular metabolic activity, secretion of certain key cytokines and growth factors and exosomes and the expression of certain key protein and nucleic acid markers including miRNAs associated with functionally bioactive renal cell populations are well known to those of ordinary skill in the art and are additionally used to confirm cell potency upon formulation with crosslinked beads.

In certain formulations, the biocompatible crosslinked beads are combined with a temperature-sensitive biomaterial in solution at about 5% (w/w) to about 15% (w/w) of the volume of the solution. The crosslinked beads may be present at about 5% (w/w), about 5.5% (w/w), about 6% (w/w), about 6.5% (w/w), about 7% (w/w), about 7.5% (w/w), about 8% (w/w), about 8.5% (w/w), about 9% (w/w), about 9.5% (w/w), about 10% (w/w), about 10.5% (w/w), about 11% (w/w), about 11.5% (w/w), about 12% (w/w), about 12.5% (w/w), about 13% (w/w), about 13.5% (w/w), about 14% (w/w), about 14.5% (w/w), or about 15% (w/w) of the volume of the solution.

In an aspect, the present disclosure provides formulations that contain biomaterials which degrade over a period time on the order of minutes, hours, or days. This is in contrast to a large body of work focusing on the implantation of solid materials that then slowly degrade over days, weeks, or months.

In an aspect, the present disclosure provides formulations having biocompatible crosslinked beads seeded with bioactive cells together with a delivery matrix. In certain embodiments, the delivery matrix has one or more of the following characteristics: biocompatibility, biodegradeability/bioresorbability, a substantially solid state prior to and during implantation into a subject, loss of structural integrity (substantially solid state) after implantation, and a cytocompatible environment to support cellular viability. In certain embodiments, the delivery matrix's ability to keep implanted particles (e.g., crosslinked beads) spaced out during implantation enhances native tissue ingrowth. In certain embodiments, if the delivery matrix is absent, then compaction of cellularized beads during implantation can lead to inadequate room for sufficient tissue ingrowth. In certain embodiments, the delivery matrix facilitates implantation of solid formulations. In certain embodiments, the short duration of the structural integrity means that soon after implantation, the matrix does not provide a significant barrier to tissue ingrowth, de novo angiogenesis or integration of the delivered cells/materials with host tissue. In certain embodiments, the delivery matrix provides for localization of the formulation described herein since insertion of a solid unit helps prevent the delivered materials from dispersing within the tissue during implantation. In certain embodiments, application of a delivery matrix as described herein helps prevent rapid loss of implanted cells through urination upon delivery to the renal parenchyme. In certain embodiments, for cell-based formulations, a solid delivery matrix improves stability and viability of anchorage dependent cells compared to cells suspended in a fluid.

In certain embodiments, the delivery matrix is a population of biocompatible beads that is not seeded with cells. In certain embodiments, the unseeded beads are dispersed throughout and in between the individual cell-seeded beads. In certain embodiments, the unseeded beads act as "spacer beads" between the cell-seeded beads prior to and immediately after transplantation. In certain embodiments, the spacer beads contain a temperature-sensitive biomaterial having a substantially solid state at a first temperature and a substantially liquid state at a second temperature, wherein the first temperature is lower than the second temperature. For example, the spacer beads contain a biomaterial having a substantially solid state at about ambient temperature or below and a substantially liquid state at about 37° C., such as that described herein. In certain embodiments, the ambient temperature is about room temperature. In certain embodiments, the biomaterial is a gelatin solution. In certain embodiments, the gelatin solution is present at about 4%, about 4.5%, about 5%, about 5.5%, about 6%, about 6.5%, about 7%, about 7.5%, about 8%, about 8.5%, about 9%, about 9.5%, about 10%, about 10.5%, or about 11%, (w/v). In certain embodiments, the gelatin solution may be provided in PBS, cell culture media (e.g., DMEM), or another suitable solvent. In certain embodiments, the biomaterial is hyaluronic acid. In certain embodiments, the biomaterial is decellularized extracellular matrix sourced from human or animal kidney which may be further reconstituted as a hydrogel.

In an aspect, the present disclosure provides formulations that contain biomaterials which are implanted in a substantially solid form (e.g., spacer beads) and then liquefy/melt or otherwise lose structural integrity following implantation into the body. This is in contrast to the significant body of work focusing on the use of materials that can be injected as a liquid, which then solidify in the body.

The temperature-sensitivity of spacer beads can be assessed in vitro prior to formulation. For example, in certain embodiments, spacer beads can be labeled and mixed with unlabeled non-temperature-sensitive beads. The mixture is then incubated at 37° C. to observe changes in physical transition. The loss of shape of the labeled temperature-sensitive beads at the higher temperature is observed over time. For example, temperature-sensitive gelatin beads may be made with Alcian blue dye to serve as a marker of physical transition. The blue gelatin beads are mixed with crosslinked beads (white), loaded into a catheter, then extruded and incubated in 1×PBS, pH 7.4, at 37° C. The loss of shape of the blue gelatin beads is followed microscopically at different time points. Changes in the physical state of the blue gelatin beads are visible after 30 min becoming more pronounced with prolonged incubation times. The beads do not completely dissipate because of the viscosity of the material.

Modified Release Formulations

In an aspect, the formulations of the present disclosure are provided as modified release formulations. In general, the modified release is characterized by an initial release of a first active agent upon administration followed by at least one additional, subsequent release of a second active agent. The first and second active agents may be the same or they may be different. In certain embodiments, the formulations provide modified release through multiple components in the same formulation. In certain embodiments, the modified release formulation contains an active agent as part of a first component that allows the active agent to move freely throughout the volume of the formulation, thereby permitting immediate release at the target site upon administration. The first component may be a temperature-sensitive biomaterial having a substantially liquid phase and a substantially solid phase, wherein the first component is in a substantially liquid phase at the time of administration. In certain embodiments, the active agent is in the substantially liquid phase such that it is substantially free to move throughout the volume of the formulation, and therefore is immediately released to the target site upon administration.

In certain embodiments, the modified release formulation has an active agent as part of a second component in which the active agent is attached to, deposited on, coated with, embedded in, seeded upon, or entrapped in the second component, which persists before and after administration to the target site. The second component contains structural elements with which the active agent is able to associate with, thereby preventing immediate release of the active agent from the second component at the time of administration. For example, the second component is provided in a substantially solid form, e.g., biocompatible beads, which may be crosslinked to prevent or delay in vivo enzymatic degradation. In certain embodiments, the active agent in the substantially solid phase retains its structural integrity within the formulation before and after administration and therefore it does not immediately release the active agent to the target site upon administration. Suitable carriers for modified release formulations have been described herein but those of ordinary skill in the art will appreciate other carriers that are appropriate for use in the present disclosure.

In certain embodiments, the formulation provides an initial rapid delivery/release of delivered elements, including cells, microvesicles (e.g., exosomes), nanoparticles, therapeutic molecules, etc. followed by a later delayed release of elements. In certain embodiments, the formulation provides an initial rapid delivery/release of microvesicles (e.g., exosomes), miRNA and other bioactive nucleic acid or protein molecules that are soluble and are secreted, bioactive products sourced from renal or other cell populations. Other molecules or therapeutic agents associated with regenerative bioactivity will be appreciated by those of ordinary skill in the art. The formulations of the present disclosure can be designed for such biphasic release profile where the agent to be delivered is provided in both an unattached form (e.g., microvesicles and/or cells in a solution) and an attached form (e.g., microvesicles and/or cells together with beads or another suitable carrier). Upon initial administration, the unencumbered agent is provided immediately to the site of delivery while release of the encumbered agent is delayed until structural integrity of the carrier (e.g., beads) fails at which point the previously attached agent is released. As discussed below, other suitable mechanisms of release will be appreciated by those of ordinary skill in the art.

In certain embodiments, the time delay for release can be adjusted based upon the nature of the active agent. For example, the time delay for release in a microvesicle (e.g., exosome) and/or bioactive cell formulation may be on the order of seconds, minutes, hours, or days. In certain embodiments, a delay on the order of weeks may be appropriate. In certain embodiments, for other active agents, such as small or large molecules, the time delay for release in a formulation may be on the order of seconds, minutes, hours, days, weeks, or months. It is also possible for the formulation to contain different biomaterials that provide different time delay release profiles. For example, a first biomaterial with a first active agent may have a first release time and a second biomaterial with a second active agent may have a second release time. The first and second active agent may be the same or different.

In certain embodiments, the time period of delayed release may generally correspond to the time period for loss of structural integrity of a biomaterial. However, those of ordinary skill in the art will appreciate other mechanisms of delayed release. For example, an active agent may be continually released over time independent of the degradation time of any particular biomaterial, e.g., diffusion of a drug from a polymeric matrix. In addition, microvesicles (e.g., exosomes) and/or bioactive cells can migrate away from a formulation containing a biomaterial and the bioactive cells to native tissue. In certain embodiments, bioactive cells migrate off of a biomaterial, e.g., a bead, to the native tissue. In certain embodiments, bioactive cells migrate off a biomaterial to the native tissue and induce secretion of growth factors, cytokines, exosomes, miRNA and other nucleic acids and proteins associated with regenerative bioactivity. In certain embodiments, exosomes and other extracellular microvesicles, as well as miRNA, other bioactive nucleic acids and proteins migrate off of a biomaterial. In certain embodiments, bioactive cells migrate off a biomaterial to the native tissue and mediate mobilization of host stem and progenitor cells that then migrate or home towards the injury or disease location.

In certain embodiments, biodegradable, biocompatible polymers can be used, such as ethylene vinyl acetate, polyanhydrides, polyglycolic acid, collagen, polyorthoesters, and polylactic acid. Prolonged absorption of injectable formulations can be brought about by including in the formulation an agent that delays absorption, for example, monostearate salts and gelatin. Many methods for the preparation of such formulations are patented or generally known to those skilled in the art. See, e.g., Sustained and Controlled Release Drug Delivery Systems, J. R. Robinson, ed., Marcel Dekker, Inc., New York, 1978. Additional methods applicable to the controlled or extended release of polypeptide agents are described, for example, in U.S. Pat. Nos. 6,306,406 and 6,346,274, as well as, for example, in U.S. Patent Application Nos. US20020182254 and US20020051808, all of which are incorporated herein by reference.

Exemplary Bioactive Cell Formulations

In certain embodiments, vesicles (such as microvesicles, e.g., exosomes) provided herein are included in a bioactive cell formulation. Alternatively or in addition, vesicles may be administered before, concurrently with, or after a bioactive cell formulation.

In certain embodiments, formulations described herein contain implantable constructs made from the above-referenced biomaterials having bioactive renal cells described herein for the treatment of kidney disease in a subject in need. In certain embodiments, bioactive cell formulations provided herein further comprise vesicles (e.g., microvesicles such as exosomes secreted by bioactive renal cells).

In certain embodiments, the construct is made up of a biocompatible material or biomaterial, scaffold or matrix composed of one or more synthetic or naturally-occurring biocompatible materials and one or more cell populations or microvesicles (e.g., exosomes) described herein deposited on or embedded in a surface of the scaffold by attachment and/or entrapment. In certain embodiments, the construct is made up of a biomaterial and one or more cell populations or products thereof (such as microvesicles, e.g., exosomes) described herein coated with, deposited on, deposited in, attached to, entrapped in, embedded in, seeded, or combined with the biomaterial component(s). Any of the microvesicles (e.g., exosomes) and/or cell populations described herein may be used in combination with a matrix to form a construct.

In certain embodiments, the bioactive cell formulation is an injectable product composed of SRC genetically modified to reduce immunogenicity and formulated in a biomaterial (e.g. gelatin-based hydrogel). In an aspect, allogeneic SRC are obtained from isolation and expansion of renal cells from a donor patient's renal cortical tissue via a kidney biopsy, genetic modification of the SRC using gene editing techniques and selection by density gradient centrifugation from the expanded renal cells. In certain embodiments, SRC are composed primarily of renal epithelial cells which are well known for their regenerative potential (Humphreys et al. (2008) Intrinsic epithelial cells repair the kidney after injury. Cell Stem Cell. 2(3):284-91). In certain embodiments, other parenchymal (vascular) and stromal (collecting duct) cells may be sparsely present in the SRC population. Injection of SRC into recipient kidneys has resulted in significant improvement in animal survival, urine concentration and filtration functions in nonclinical studies. However, SRC have limited shelf life and stability. Formulation of SRC in a gelatin-based hydrogel biomaterial provides enhanced stability of the cells thus extending product shelf life, improved stability during transport and delivery into the kidney cortex for clinical utility.

In an aspect, bioactive cell formulations are manufactured by first obtaining renal cortical tissue from the donor using a standard-of-clinical-care kidney biopsy procedure. Renal cells are isolated from the kidney tissue by enzymatic digestion and expanded using standard cell culture techniques. Cell culture medium is designed to expand primary renal cells and does not contain any differentiation factors. Harvested renal cells are subjected to density gradient separation to obtain SRC. The use of gene editing techniques to modify the immunogenicity of the SRC may be carried out either before or after the density gradient separation.

In certain embodiments, the formulated cell population and/or microvesicles (e.g., exosomes) are substantially free to move throughout the volume of the biomaterial at about ambient temperature or above. Having the cell population suspended in the substantially solid phase at a lower temperature provides stability advantages for the cells, such as for anchorage-dependent cells, as compared to cells in a fluid. Moreover, having microvesicles (e.g., exosomes) and/or cells suspended in the substantially solid state provides one or more of the following benefits: i) prevents settling of the microvesicles and/or cells, ii) allows the cells to remain anchored to the biomaterial in a suspended state; iii) allows the microvesicles and/or cells to remain more uniformly dispersed throughout the volume of the biomaterial; iv) prevents the formation of microvesicle and/or cell aggregates; and v) provides better protection for the microvesicles and/or cells during storage and transportation of the formulation. A formulation that can retain such features leading up to the administration to a subject is advantageous at least because the overall health of the cells in the formulation will be better and a more uniform and consistent dosage of cells will be administered.

In certain embodiments, the gelatin-based hydrogel biomaterial used to formulate SRC is a porcine gelatin dissolved in buffer to form a thermally responsive hydrogel. In certain embodiments, this hydrogel is fluid at room temperature but gels when cooled to refrigerated temperature (2-8° C.). In certain embodiments, SRCs are formulated with the hydrogel, gelled by cooling and shipped to the clinic under refrigerated temperature (2-8° C.). In certain embodiments, at the clinical site, the product is warmed to room temperature before injecting into the patient's kidney. In certain embodiments, the bioactive cell formulation (e.g., supplemented with microvesicles, such as exosomes, from bioactive renal cells) is implanted into the kidney cortex using a needle and syringe suitable for delivery via a percutaneous or laparoscopic procedure.

Description and Composition of Exemplary Neo-Kidney Augment Composition

In certain embodiments, the bioactive cell formulation is a Neo-Kidney Augment (NKA), which is an injectable product composed of autologous, selected renal cells (SRC) formulated in a Biomaterial (gelatin-based hydrogel). In certain embodiments, the NKA is augmented or supplemented with vesicles (e.g., microvesicles such as exosomes secreted by bioactive renal cells).

In an aspect, autologous SRC are obtained from isolation and expansion of renal cells from the patient's renal cortical tissue via a kidney biopsy and selection by centrifugation of the expanded renal cells across a density boundary, barrier, or interface. In certain embodiments, autologous SRC are obtained from isolation and expansion of renal cells from the patient's renal cortical tissue via a kidney biopsy and selection of the expanded renal cells over a continuous or discontinuous single step or multistep density gradient. SRC are composed primarily of renal tubular epithelial cells which are well known for their regenerative potential (Humphreys et al. (2008) Intrinsic epithelial cells repair the kidney after injury. Cell Stem Cell. 2(3):284-91). Other parenchymal (vascular) and stromal (collecting duct) cells may be sparsely present in the autologous SRC population.

In certain embodiments, NKA is supplemented with microvesicles (e.g., exosomes) produced and isolated from an SRC population.

Injection of SRC into recipient kidneys has resulted in significant improvement in animal survival, urine concentration and filtration functions in preclinical studies. However, SRC have limited shelf life and stability. Formulation of SRC in a gelatin-based hydrogel biomaterial provides enhanced stability of the cells thus extending product shelf life, improved stability of NKA during transport and delivery of NKA into the kidney cortex for clinical utility.

In an aspect, NKA is manufactured by first obtaining renal cortical tissue from the donor/recipient using a standard-of-clinical-care kidney biopsy procedure. In certain embodiments, tenal cells are isolated from the kidney tissue by enzymatic digestion and expanded using standard cell culture techniques. In certain embodiments, a cell culture medium is designed to expand primary renal cells and does not contain any differentiation factors. In certain embodiments, harvested renal cells are subjected to separation across a density boundary or interface or density gradient to obtain SRCs. In certain embodiments, the SRCs are genetically modified in accordance with the present disclosure.

Included herein is a formulation made up of biomaterials designed or adapted to respond to external conditions as described herein. As a result, the nature of the association of the bioactive cell population and other active agents such as microvesicles (e.g., exosomes) with the biomaterial in a construct will change depending upon the external conditions. For example, a cell population's association with a temperature-sensitive biomaterial varies with temperature. In certain embodiments, the construct contains a bioactive renal cell population and biomaterial having a substantially solid state at about 8° C. or lower and a substantially liquid state at about ambient temperature or above, wherein the cell population is suspended in the biomaterial at about 8° C. or lower. However, the cell population is substantially free to move throughout the volume of the biomaterial at about ambient temperature or above. Having the cell population suspended in the substantially solid phase at a lower temperature provides stability advantages for the cells, such as for anchorage-dependent cells, as compared to cells in a fluid. Moreover, having microvesicles (e.g., exosomes) and cells suspended in the substantially solid state provides one or more of the following benefits: i) prevents settling of the microvesicles and cells, ii) allows the cells to remain anchored to the biomaterial in a suspended state; iii) allows the microvesicles and cells to remain more uniformly dispersed throughout the volume of the biomaterial; iv) prevents the formation of microvesicle or cell aggregates; and v) provides better protection for the microvesicles and cells during storage and transportation of the formulation. In certain embodiments, a formulation that can retain such features leading up to the administration to a subject is advantageous at least because the overall health of the cells in the formulation will be better and a more uniform and consistent dosage of cells will be administered.

In certain embodiments, the gelatin-based hydrogel biomaterial used to formulate SRC into NKA is a porcine gelatin dissolved in buffer to form a thermally responsive hydrogel. This hydrogel is fluid at room temperature but gels when cooled to refrigerated temperature (2-8° C.). SRC are formulated with the hydrogel to obtain NKA. NKA is gelled by cooling and is shipped to the clinic under refrigerated temperature (2-8° C.). NKA has a shelf life of 3 days. At the clinical site, the product is warmed to room temperature before injecting into the patient's kidney. NKA is implanted into the kidney cortex using a needle and syringe suitable for delivery of NKA via a percutaneous or laparoscopic procedure. In certain embodiments, the hydrogel is derived from gelatin or another extracellular matrix protein of recombinant origin. In certain embodiments, the hydrogel is derived from extracellular matrix sourced from kidney or another tissue or organ. In certain embodiments, the hydrogel is derived from a recombinant extracellular matrix protein. In certain embodiments, the hydrogel comprises gelatin derived from recombinant collagen (i.e., recombinant gelatin).

Cell Viability Agents

In an aspect, the bioactive cell formulation also includes a cell viability agent. In certain embodiments, vesicles provided herein comprise cell viability agents. In certain embodiments, the cell viability agent is selected from the group consisting of an antioxidant, an oxygen carrier, an immunomodulatory factor, a cell recruitment factor, a cell attachment factor, an anti-inflammatory agent, an angiogenic factor, a matrix metalloprotease, a wound healing factor, and products secreted from bioactive cells.

In an aspect, a microvesicle (such as an exosome) comprises (e.g. within the lumen thereof, in the lipid bilayer thereof, or on the surface thereof) a cell viability agent. In certain embodiments, the microvesicle was secreted by cells that were cultured in the presence of the cell viability agent.

In certain embodiments, the cell viability agent is selected from the group consisting of an antioxidant, an oxygen carrier, an immunomodulatory factor, a cell recruitment factor, a cell attachment factor, an anti-inflammatory agent, an angiogenic factor, a matrix metalloprotease, a wound healing factor, and products secreted from bioactive cells.

Antioxidants are characterized by the ability to inhibit oxidation of other molecules. Antioxidants include, without limitation, one or more of 6-hydroxy-2,5,7,8-tetramethyl-chroman-2-carboxylic acid (Trolox®), carotenoids, flavonoids, isoflavones, ubiquinone, glutathione, lipoic acid, superoxide dismutase, ascorbic acid, vitamin E, vitamin A, mixed carotenoids (e.g., beta carotene, alpha carotene, gamma carotene, lutein, lycopene, phytopene, phytofluene, and astaxanthin), selenium, Coenzyme Q10, indole-3-carbinol, proanthocyanidins, resveratrol, quercetin, catechins, salicylic acid, curcumin, bilirubin, oxalic acid, phytic acid, lipoic acid, vanilic acid, polyphenols, ferulic acid, theaflavins, and derivatives thereof. Those of ordinary skill in the art will appreciate other suitable antioxidants may be used in certain embodiments of the present disclosure.

Oxygen carriers are agents characterized by the ability to carry and release oxygen. They include, without limitation, perfluorocarbons and pharmaceuticals containing perfluorocarbons. Suitable perfluorocarbon-based oxygen carriers include, without limitation, perfluorooctyl bromide (C8F17Br); perfluorodichorotane (C8F16C12); perfluorodecyl bromide; perfluobron; perfluorodecalin; perfluorotripopylamine; perfluoromethylcyclopiperidine; Fluosol® (perfluorodecalin & perfluorotripopylamine); Perftoran® (perfluorodecalin & perfluoromethylcyclopiperidine); Oxygent® (perfluorodecyl bromide & perfluobron); Ocycyte™ (perfluoro (tert-butylcyclohexane)). Those of ordinary skill in the art will appreciate other suitable perfluorocarbon-based oxygen carriers may be used in certain embodiments of the present disclosure.

Immunomodulatory factors include, without limitation, osteopontin, FAS Ligand factors, interleukins, transforming growth factor beta, platelet derived growth factor, clusterin, transferrin, regulated upon action, normal T-cell expressed, secreted protein (RANTES), plasminogen activator inhibitor-1 (Pai-1), tumor necrosis factor alpha (TNF-alpha), interleukin 6 (IL-6), alpha-1 microglobulin, and beta-2-microglobulin. Those of ordinary skill in the art will appreciate other suitable immunomodulatory factors may be used in certain embodiments of the present disclosure.

Anti-inflammatory agents or immunosuppressant agents (described below) may also be part of the formulation. Those of ordinary skill in the art will appreciate other suitable antioxidants may be used in certain embodiments of the present disclosure.

Cell recruitment factors include, without limitation, monocyte chemotactic protein 1 (MCP-1), and CXCL-1. Those of ordinary skill in the art will appreciate other suitable cell recruitment factors may be used in certain embodiments of the present disclosure.

Cell attachment factors include, without limitation, fibronectin, procollagen, collagen, ICAM-1, connective tissue growth factor, laminins, proteoglycans, specific cell adhesion peptides such as RGD and YSIGR. Those of ordinary skill in the art will appreciate other suitable cell attachment factors may be used in certain embodiments of the present disclosure.

Angiogenic factors include, without limitation, vascular endothelial growth factor F (VEGF) and angiopoietin-2 (ANG-2). Those of ordinary skill in the art will appreciate other suitable angiogenic factors may be used in certain embodiments of the present disclosure.

Matrix metalloproteases include, without limitation, matrix metalloprotease 1 (MMP1), matrix metalloprotease 2 (MMP2), matrix metalloprotease 9 (MMP-9), and tissue inhibitor and matalloproteases-1 (TIMP-1).

Wound healing factors include, without limitation, keratinocyte growth factor 1 (KGF-1), tissue plasminogen activator (tPA), calbindin, clusterin, cystatin C, trefoil factor 3. Those of ordinary skill in the art will appreciate other suitable wound healing factors may be used in certain embodiments of the present disclosure.

Secreted products from bioactive cells described herein may also be added to the bioactive cell formulation as a cell viability agent.

Compositions sourced from body fluids, tissue or organs from human or animal sources, including, without limitation, human plasma, human platelet lysate, bovine fetal plasma or bovine pituitary extract, may also be added to the bioactive cell formulations as a cell viability agent.

Those of ordinary skill in the art will appreciate there are several suitable methods for depositing or otherwise combining cell populations with biomaterials to form a construct.

In certain embodiments, BRCs (such as SRCs) cultured in media comprising a cell viability agent produce vesicles that comprise the cell biability agent.

Methods of Use

In an aspect, provided herein is method of treating a renal disease in a subject. In certain embodiments, the method comprises administering to the subject an effective amount of isolated secreted renal cell vesicles (e.g., microvesicles such as exosomes). In certain embodiments, the vesicles comprise a compound that is not produced by the cells that created the vesicles. In certain embodiments, the vesicles are within a composition or formulation disclosed herein.

In an aspect, provided herein is a method of treating a renal disease in a subject. In certain embodiments, the method comprises administering to the subject an effective amount of vesicles from a vesicle preparation, wherein a vesicle from the vesicle preparation has been identified as regenerative according to a method disclosed herein.

In an aspect, provided herein is a method of treating a renal disease in a subject. In certain embodiments, the method comprises administering to the subject an effective amount of a composition comprising a bioactive renal cell population supplemented with renal cell vesicles that have not been secreted by the bioactive renal cell population.

In certain embodiments, the composition is administered by intravenous injection. In certain embodiments, the composition is administered by transcatheter delivery. In certain embodiments, the vesicles are injected intravenously into a peripheral vessel. In certain embodiments, the transcatheter delivery is into the subject's left renal artery or right renal artery.

In certain embodiments, the subject has chronic kidney disease. In certain embodiments, the chronic kidney disease is Stage I, II, III, IV, or V kidney disease.

In certain embodiments, treating the renal disease comprises reducing or preventing renal fibrosis in the subject.

In certain embodiments, the subject has received dialysis at least 1, 2, or 3 times per week for at least 1 or 2 weeks.

In certain embodiments, the subject has Type II diabetes.

In certain embodiments, the subject has congenital anomalies of the kidney and urinary tract (CAKUT).

In certain embodiments, the subject has a glomerular filtration rate (GFR) of less than 90 mL/min/1.73 m$^2$, microalbuminuria, or macroalbuminuria.

In certain embodiments, cells are not administered to the subject. In certain embodiments, cells (e.g., BRCs such as SRCs) are ad ministered to the subject. In certain embodiments, the vesicles are administered separately from the cells. In certain embodiments, the vesicles are administered before, concurrently with, or after the cells. In certain embodiments, isolated vesicles are administered in a composition that further comprises cells (e.g., cells other than the cells from which the vesicles were isolated). In certain embodiments, the renal cell vesicles have been secreted by a bioactive renal cell population that has the same origin as and/or contains the same cell types as the bioactive renal cell population in the composition.

In certain embodiments, the vesicles have been produced by a BRC population. In certain embodiments, the BRC population is an SRC population.

In certain embodiments, vesicles secreted by primary renal cells are administered to the subject. In certain embodiments, vesicles secreted by primary renal cells and vesicles secreted by SRCs are administered to the subject.

In certain embodiments, vesicles secreted by endothelial cells or mesenchymal stem cells are also administered to the subject.

In certain embodiments, a non-renal cell vesicle is also administered to the subject. In certain embodiments, the non-renal cell vesicle has been secreted by a non-renal endothelial progenitor cell, a non-renal mesenchymal stem cell, or a non-renal adipose-derived progenitor.

In certain embodiments, an effective amount of vesicles is an amount that is effective in the absence of bioactive renal cell administration (e.g., an amount that is sufficient for treatment without the administration of bioactive renal cells). In certain embodiments, an effective amount of bioactive renal cells is an amount that is effective in the absence of vesicle administration (e.g., an amount that is sufficient for treatment without the administration of vesicles). In certain embodiments, an effective amount of the vesicles is an amount that is less than would be effective without the co-administration of bioactive renal cells. In certain embodiments, an effective amount of the bioactive renal cells is an amount that is less than would be effective without the co-administration of vesicles.

Microvesicles (e.g., exosomes), cells and formulations of the present invention are suitable for use in the methods of use described herein. In certain embodiments, the formulations of the present invention may be administered for the treatment of kidney disease. In certain embodiments, microvesicles (e.g., exosomes) and/or bioactive cells may be administered to a native organ as part of a formulation described herein. In certain embodiments, the microvesicles (e.g., exosomes) and/or bioactive cells may be sourced from the native organ that is the subject of the administration or from a source that is not the target native organ.

In certain embodiments, the present disclosure provides methods for the treatment of a kidney disease, in a subject in need with the formulations containing microvesicles (e.g., exosomes) and/or bioactive renal cell populations as described herein. In certain embodiments, the formulations are suitable for administration to a subject in need of improved kidney function.

In an aspect, the effective treatment of a kidney disease in a subject by the methods of the present disclosure can be observed through various indicators of kidney function. In certain embodiments, the indicators of kidney function include, without limitation, serum albumin, albumin to globulin ratio (A/G ratio), serum phosphorous, serum sodium, kidney size (measurable by ultrasound), serum calcium, phosphorous:calcium ratio, serum potassium, proteinuria, urine creatinine, serum creatinine, blood nitrogen urea (BUN), cholesterol levels, triglyceride levels and glomerular filtration rate (GFR). Furthermore, several indicators of general health and well-being include, without limitation, weight gain or loss, survival, blood pressure (mean systemic blood pressure, diastolic blood pressure, or systolic blood pressure), and physical endurance performance.

In an aspect, an effective treatment with a formulation is evidenced by stabilization of one or more indicators of kidney function. In certain embodiments, the stabilization of kidney function is demonstrated by the observation of a change in an indicator in a subject treated by a method of the present disclosure as compared to the same indicator in a subject that has not been treated by a method of the present disclosure. In certain embodiments, the stabilization of kidney function may be demonstrated by the observation of a change in an indicator in a subject treated by a method of the present disclosure as compared to the same indicator in the same subject prior to treatment. The change in the first indicator may be an increase or a decrease in value. In certain embodiments, the treatment provided by the present disclosure may include stabilization of serum creatinine and/or blood urea nitrogen (BUN) levels in a subject where the BUN levels observed in the subject are lower as compared to a subject with a similar disease state who has not been treated by the methods of the present disclosure. In certain embodiments, the treatment may include stabilization of serum creatinine levels in a subject where the serum creatinine levels observed in the subject are lower as compared to a subject with a similar disease state who has not been treated by the methods of the present disclosure.

Those of ordinary skill in the art will appreciate that one or more additional indicators described herein or known in the art may be measured to determine the effective treatment of a kidney disease in the subject.

In certain embodiments, an effective treatment with a formulation is evidenced by improvement of one or more indicators of kidney structure and/or function. In certain embodiments, microvesicles (e.g., exosomes) and/or bioactive renal cells provide an improved level of serum creatinine and/or blood urea nitrogen (BUN). In certain embodiments, the microvesicles (e.g., exosomes) and/or bioactive renal cells provide an improved retention of protein in the serum. In certain embodiments, the microvesicles (e.g., exosomes) and enriched bioactive renal cells provide improved levels of serum albumin as compared to a non-enriched cell population or cells without added microvesicles (e.g., exosomes). In certain embodiments, the microvesicles (e.g., exosomes) provide improved levels of serum albumin as compared to bioactive renal cells. In certain embodiments, the microvesicles (e.g., exosomes) and/or enriched bioactive renal cell population provides improved A:G ratio as compared to a non-enriched cell population. In certain embodiments, the bioactive renal cell population provides improved levels of serum cholesterol and/or triglycerides. In certain embodiments, microvesicles (e.g., exosomes) and/or a bioactive renal cell population provides an improved level of Vitamin D In certain embodiments, microvesicles (e.g., exosomes) and/or an enriched bioactive renal cell population provides an improved phosphorus:calcium ratio as compared to a non-enriched cell population. In certain embodiments, microvesicles (e.g., exosomes) and/or a bioactive renal cell population provides an improved level of hemoglobin as compared to a non-enriched cell population. In certain embodiments, microvesicles (e.g., exosomes) and/or a bioactive renal cell population provides an improved level of serum creatinine as compared to a non-enriched cell population. In certain embodiments, microvesicles (e.g., exosomes) and/or an enriched bioactive renal cell population provides an improved level of hematocrit as compared to a non-enriched cell population. In certain embodiments, the improvement of one or more of the above indicators of kidney function is the result of treatment with microvesicles (e.g., exosomes) and/or a selected renal cell formulation. In an embodiment, the improvement of one or more of the above indicators of kidney function is the result of treatment with microvesicles (e.g., exosomes) and/or a selected renal cell formulation.

In an aspect, the present disclosure provides formulations for use in methods for the regeneration of a native kidney in a subject in need thereof. In certain embodiments, the method includes the step of administering or implanting a bioactive cell population, cell product, or construct described herein to the subject. A regenerated native kidney may be characterized by a number of indicators including, without limitation, development of function or capacity in the native kidney, improvement of function or capacity in the native kidney, and the expression of certain markers in the native kidney. In certain embodiments, the developed or improved function or capacity may be observed based on the various indicators of kidney function described above. In certain embodiments, the regenerated kidney is characterized by differential expression of one or more stem cell markers. The stem cell marker may be one or more of the following: SRY (sex determining region Y)-box 2 (Sox2); Undifferentiated Embryonic Cell Transcription Factor (UTF1); Nodal Homolog from Mouse (NODAL); Prominin 1 (PROM1) or CD133 (CD133); CD24; and any combination thereof (see Ilagan et al. PCT/US2011/036347 incorporated herein by reference in its entirety), see also Genheimer et al., 2012. Molecular characterization of the regenerative response induced by intrarenal transplantation of selected renal cells in a rodent model of chronic kidney disease. Cells Tissue Organs 196: 374-384, incorporated by reference in its entirety. In certain embodiments, the expression of the stem cell marker(s) is up-regulated compared to a control.

In an aspect, provided herein is method of treating kidney disease in a subject, the method comprising injecting a formulation, composition, cell population, or microvesicles (e.g., exosomes) disclosed herein into the subject. In certain embodiments, the formulation, composition, cell population, or cell product (such as microvesicles, e.g., exosomes) is injected through a 18 to 30 gauge needle. In certain embodiments, the formulation, composition, cell population, or cell product (such as microvesicles, e.g., exosomes) is injected through a needle that is smaller than 20 gauge. In certain embodiments, the formulation, composition, cell population, or cell product (such as microvesicles, e.g., exosomes) is injected through a needle that is smaller than 21 gauge. In certain embodiments, the formulation, composition, cell population, or cell product (such as microvesicles, e.g., exosomes) is injected through a needle that is smaller than 22 gauge. In certain embodiments, the formulation, composition, cell population, or cell product (such as microvesicles, e.g., exosomes) is injected through a needle that is smaller than 23 gauge. In certain embodiments, the formulation, composition, cell population, or cell product (such as microvesicles, e.g., exosomes) is injected through a needle that is smaller than 24 gauge. In certain embodiments, the formulation, composition, cell population, or cell product (such as microvesicles, e.g., exosomes) is injected through a needle that is smaller than 25 gauge. In certain embodiments, the formulation, composition, cell population, or cell product (such as microvesicles, e.g., exosomes) is injected through a needle that is smaller than 26 gauge. In certain embodiments, the formulation, composition, cell population, or cell product (such as microvesicles, e.g., exosomes) is injected through a needle that is smaller than 27 gauge. In certain embodiments, the formulation, composition, cell population, or cell product (such as microvesicles, e.g., exosomes) is injected through a needle that is smaller than 28 gauge. In certain embodiments, the formulation, composition, cell population, or cell product (such as microvesicles, e.g., exosomes) is injected through a needle that is smaller than 29 gauge. In certain embodiments, the formulation, composition, cell population, or cell product (such as microvesicles, e.g., exosomes) is injected through a needle that is about 20 gauge. In certain embodiments, the formulation, composition, cell population, or cell product (such as microvesicles, e.g., exosomes) is injected through a needle that is about 21 gauge.

In certain embodiments, the formulation, composition, cell population, or cell product (such as microvesicles, e.g., exosomes) is injected through a needle that is about 22 gauge. In certain embodiments, the formulation, composition, cell population, or cell product (such as microvesicles, e.g., exosomes) is injected through a needle that is about 23 gauge. In certain embodiments, the formulation, composition, cell population, or cell product (such as microvesicles, e.g., exosomes) is injected through a needle that is about 24 gauge. In certain embodiments, the formulation, composition, cell population, or cell product (such as microvesicles, e.g., exosomes) is injected through a needle that is about 25 gauge. In certain embodiments, the formulation, composition, cell population, or cell product (such as microvesicles, e.g., exosomes) is injected through a needle that is about 26 gauge. In certain embodiments, the formulation, composition, cell population, or cell product (such as microvesicles, e.g., exosomes) is injected through a needle that is about 27 gauge. In certain embodiments, the formulation, composition, cell population, or cell product (such as microvesicles, e.g., exosomes) is injected through a needle that is about 28 gauge. In certain embodiments, the formulation, composition, cell population, or cell product (such as microvesicles, e.g., exosomes) is injected through a needle that is about 29 gauge.

In certain embodiments, the inter diameter of the needle is less than 0.84 mm. In certain embodiments, the inter diameter of the needle is less than 0.61 mm. In certain embodiments, the inter diameter of the needle is less than 0.51 mm. In certain embodiments, the inter diameter of the needle is less than 0.41 mm. In certain embodiments, the inter diameter of the needle is less than 0.33 mm. In certain embodiments, the inter diameter of the needle is less than 0.25 mm. In certain embodiments, the inter diameter of the needle is less than 0.20 mm. In certain embodiments, the inter diameter of the needle is less than 0.15 mm. In certain embodiments, the outer diameter of the needle is less than 1.27 mm. In certain embodiments, the outer diameter of the needle is less than 0.91 mm. In certain embodiments, the outer diameter of the needle is less than 0.81 mm. In certain embodiments, the outer diameter of the needle is less than 0.71 mm. In certain embodiments, the outer diameter of the needle is less than 0.64 mm. In certain embodiments, the outer diameter of the needle is less than 0.51 mm. In certain embodiments, the outer diameter of the needle is less than 0.41 mm. In certain embodiments, the outer diameter of the needle is less than 0.30 mm. In certain embodiments, a needle has one of the sizes in the following table:

| Gauge | ID Size | | OD Size | |
| --- | --- | --- | --- | --- |
| | in | mm | in | mm |
| 14 | 0.060 | 1.55 | 0.072 | 1.83 |
| 15 | 0.054 | 1.37 | 0.065 | 1.65 |
| 16 | 0.047 | 1.19 | n/a | n/a |
| 18 | 0.033 | 0.84 | 0.050 | 1.27 |
| 20 | 0.023 | 0.61 | 0.036 | 0.91 |
| 21 | 0.020 | 0.51 | 0.032 | 0.81 |
| 22 | 0.016 | 0.41 | 0.028 | 0.71 |
| 23 | 0.013 | 0.33 | 0.025 | 0.64 |
| 25 | 0.010 | 0.25 | 0.020 | 0.51 |
| 27 | 0.008 | 0.20 | 0.016 | 0.41 |
| 30 | 0.006 | 0.15 | 0.012 | 0.30 |
| 32 | 0.004 | 0.10 | 0.009 | 0.23 |

Methods and Routes of Administration

In certain embodiments, vesicles (e.g., microvesicles, such as renal exosomes) are administered in the absence of cells (e.g., BRCs, such as SRCs). In certain embodiments, vesicles are administered together with cells. In certain embodiments, vesicles are administered in the same composition as cells, as well as separately from the cells. In certain embodiments, vesicles and cells are administered by different routes of administration. In certain embodiments, vesicles and cells are administered by one route of administration, and vesicles are also separately administered by another route of administration. In certain embodiments, vesicles are administered more frequently than the cells.

In certain embodiments, vesicles are administered intravenously. In certain embodiments, vesicles are administered intravenously into a peripheral vessel. In certain embodiments, vesicles are administered by transcatheter delivery. In certain embodiments, the transcatheter delivery is into the subject's left renal artery or right renal artery.

The formulations of the present invention can be administered alone or in combination with other bioactive components. In certain embodiments, the formulations are suitable for injection or implantation of incorporated tissue engineering elements to the interior of solid organs to regenerate tissue. In certain embodiments, the formulations are used for the injection or implantation of tissue engineering elements to the wall of hollow organs to regenerate tissue. In certain embodiments, such formulations are administered in combination with additional formulations suitable for systemic or transcetheter delivery.

In an aspect, the present invention provides methods of providing a bioactive cell formulation described herein to a subject in need. In certain embodiments, the bioactive cell formulation is supplemented with vesicles. In certain embodiments, the bioactive cell formulation is not supplemented with vesicles, but the subject further receives a separate formulation comprising vesicles. In certain embodiments, the source of the bioactive cells and/or vesicles may be allogeneic or syngeneic, and any combination thereof. In certain embodiments, the methods may include the administration of an immunosuppressant agent. (see e.g. U.S. Pat. No. 7,563,822).

In certain embodiments, the treatment methods of the subject invention involve the delivery of a bioactive cell formulation described herein. In certain embodiments, direct administration of cells and/or vesicles to the site of intended benefit is performed. A subject in need may also be treated by in vivo contacting of a native kidney with a bioactive cell formulation described herein together with products secreted from one or more enriched renal cell populations, and/or an admixture or construct containing the same. The step of in vivo contacting provides a regenerative effect to the native kidney. In certain embodiments, isolated vesicles (e.g., vesicles in the absence of cells) are administered before, concurrently with, or after a bioactive cell formulation (e.g., via the same or a different route of administration).

A variety of means for administering compositions of selected renal cells to subjects will, in view of this specification, be apparent to those of skill in the art. Such methods include injection of the cells into a target site in a subject.

Delivery Vehicles

In certain embodiments, cells and/or secreted products can be inserted into a delivery device or vehicle, which facilitates introduction by injection or implantation into the subjects. In certain embodiments, the delivery vehicle can include natural materials. In certain embodiments, the delivery vehicle can include synthetic materials. In certain embodiments, the delivery vehicle provides a structure to mimic or appropriately fit into the organ's architecture. In certain embodiments, the delivery vehicle is fluid-like in nature. Such delivery devices can include tubes, e.g., catheters, for injecting cells and fluids into the body of a recipient subject. In certain embodiments, the tubes additionally have a needle, e.g., a syringe, through which the cells of the invention can be introduced into the subject at a desired location. In certain embodiments, mammalian kidney-derived cell populations are formulated for administration into a blood vessel via a catheter (where the term "catheter" is intended to include any of the various tube-like systems for delivery of substances to a blood vessel). In certain embodiments, the cells can be inserted into or onto a biomaterial or scaffold, including but not limited to textiles, such as weaves, knits, braids, meshes, and non-wovens, perforated films, sponges and foams, and beads, such as solid or porous beads, microparticles, nanoparticles, and the like (e.g., Cultispher-S gelatin beads—Sigma). The cells can be prepared for delivery in a variety of different forms. In certain embodiments, the cells can be suspended in a solution or gel. In certain embodiments, cells can be mixed with a pharmaceutically acceptable carrier or diluent in which the cells of the invention remain viable.

Pharmaceutically acceptable carriers and diluents include saline, aqueous buffer solutions, solvents and/or dispersion media. The use of such carriers and diluents is well known in the art. The solution is preferably sterile and fluid, and will often be isotonic. Preferably, the solution is stable under the conditions of manufacture and storage and preserved against the contaminating action of microorganisms such as bacteria and fungi through the use of, for example, parabens, chlorobutanol, phenol, ascorbic acid, thimerosal, and the like. One of skill in the art will appreciate that the delivery vehicle used in the delivery of the cell populations and admixtures thereof of the instant invention can include combinations of the above-mentioned characteristics.

In certain embodiments, a subject is administered (i) a formulation comprising vesicles, (ii) a formulation comprising bioactive renal cells, and/or (iii) a formulation comprising both bioactive renal cells and vesicles.

In certain embodiments, a subject is administered bioactive renal cells (such as selected renal cells), 1-3 times. In certain embodiments, a subject is administered bioactive renal cells (such as selected renal cells), 1 time. In certain embodiments, a subject is administered bioactive renal cells (such as selected renal cells), 2 times. In certain embodiments, a subject is administered bioactive renal cells (such as selected renal cells), 3 times.

In certain embodiments, a subject is administered renal vesicles (e.g., microvesicles, such as exosomes) 1-10 times. In certain embodiments, a subject is administered renal vesicles (e.g., microvesicles, such as exosomes) 1 time. In certain embodiments, a subject is administered renal vesicles (e.g., microvesicles, such as exosomes) 2 times. In certain embodiments, a subject is administered renal vesicles (e.g., microvesicles, such as exosomes) 3 times. In certain embodiments, a subject is administered renal vesicles (e.g., microvesicles, such as exosomes) 4 times. In certain embodiments, a subject is administered renal vesicles (e.g., microvesicles, such as exosomes) 5 times. In certain embodiments, a subject is administered renal vesicles (e.g., microvesicles, such as exosomes) 6 times. In certain embodiments, a subject is administered renal vesicles (e.g., microvesicles, such as exosomes) 7 times. In certain embodiments, a subject is administered renal vesicles (e.g., microvesicles, such as exosomes) 8 times. In certain embodiments, a subject is administered renal vesicles (e.g., microvesicles, such as exosomes) 9 times. In certain embodiments, a subject is administered renal vesicles (e.g., microvesicles, such as exosomes) 10 times.

Modes of Administration

Modes of administration of the formulations include, but are not limited to, systemic, intra-renal (e.g., parenchymal), intravenous or intra-arterial injection, transcatheter delivery, and injection directly into the tissue at the intended site of activity. In certain embodiments, modes of administration to be used in accordance with the present invention include single or multiple injection(s) via direct laparotomy, via direct laparoscopy, transabdominal, or percutaneous. In certain embodiments, modes of administration to be used in accordance with the present invention include, for example, retrograde and ureteropelvic infusion. Surgical means of administration include one-step procedures such as, but not limited to, partial nephrectomy and construct implantation, partial nephrectomy, partial pyelectomy, vascularization with omentum±peritoneum, multifocal biopsy needle tracks, cone or pyramidal, to cylinder, and renal pole-like replacement, as well as two-step procedures including, for example, organoid-internal bioreactor for replanting. In certain embodiments, the formulations containing mixtures of cells and vesicles are delivered via the same route at the same time. In certain embodiments, cell compositions and vesicle compositions are delivered separately to specific locations or via specific methodologies, either simultaneously or in a temporally-controlled manner, by one or more of the methods described herein. In certain embodiments, the selected renal cells are percutaneously injected into the renal cortex of a kidney. In certain embodiments, a guiding cannula is inserted percutaneously and used to puncture the kidney capsule prior to injection of the composition into the kidney. In certain embodiments, vesicles are administered by intravenous injection or transcatheter delivery.

A laparoscopic or percutaneous technique may be used to access the kidney for injection of formulated BRC or SRC population (e.g., together with or separately from vesicles). Use of laparoscopic surgical techniques allows for direct visualization of the kidney so that any bleeding or other adverse events can be spotted during injection and addressed immediately. Use of a percutaneous approach to the kidney has been in use for over a decade, primarily for ablating intrarenal masses. These procedures insert an electrode or cryogenic needle into a defined mass in the kidney, and remain in contact for (typically) 10 to 20 minutes while the lesion is ablated. For injection of the therapeutic formulation, the percutaneous instrumentation is no larger nor more complex, and this approach offers the safety advantages of no surgery (avoiding abdominal puncture wounds and inflation with gas) and minimal immobilization time. Furthermore, the access track can have hemostatic biodegradable material left in place, to further reduce any chance of significant bleeding.

In certain embodiments of the delivery by injection, the therapeutic bioactive cell formulation (which may or may not be supplemented with vesicles) is injected into the renal cortex. In certain embodiments, it is important to distribute the therapeutic formulation in the renal cortex as widely as possible, which can be achieved, for example, by entering the renal cortex at an angle allowing deposition of the therapeutic formulation in the renal cortex, distributed as widely as feasible. This could require imaging the kidney in a longitudinal or transverse approach using ultrasound guidance or with axial computed tomography (CT) imaging, depending upon individual patient characteristics. Ideally the injection will involve multiple deposits as the injection needle/cannula is gradually withdrawn. The full volume of the therapeutic formulation may be deposited at a single or multiple entry points. In certain embodiments, up to two entry points may be used to deposit the full volume of therapeutic formulation into the kidney. In certain embodiments, the injection may be administered to a single kidney, using one or more entry points, e.g. one or two entry points. In certain embodiments, the injection is made into both kidneys, in each kidney using one or more entry point, e.g. one or two entry points.

The foregoing written description is considered to be sufficient to enable one skilled in the art to practice the invention. It should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. The following Examples are offered for illustrative purposes only, and are not intended to limit the scope of the present invention in any way. Indeed, various modifications of the invention in addition to those shown and described herein will become apparent to those skilled in the art from the foregoing description and fall within the scope of the appended claims.

All patents, patent applications, and literature references cited in the present specification are hereby incorporated by reference in their entirety.

EXAMPLES

Example 1: Non-Limiting Examples of Methods and Compositions for Producing SRCs

Example 1.1—Preparation of Solutions

This example section provides the compositions of the various media formulations and solutions used for the isolation and characterization of the heterogeneous renal cell population, and manufacture of the regenerative therapy product, in this example.

TABLE 6

Culture Media and Solutions

| Material | Composition |
| --- | --- |
| Tissue Transport Medium | Viaspao ™ or HypoThermosol-FRS ® or DMEM |
| | Kanamycin: 100 µg/mL |
| Renal Cell Growth Medium | DMEM:KSFM (50:50) |
| | 5% FBS |
| | Growth Supplements: |
| | HGF: 10 mg/L |
| | EGF: 2.5 µg/L |
| | Insulin: 10.0 mg/L, |
| | Transferrin: 5.5 mg/L |
| | Selenium: 670 µg/L |
| | Kanamycin: 100 µg/mL |
| Tissue Wash Solution | DMEM |
| | Kanamycin: 100 µg/mL |
| Digestion Solution | Collagenase IV: 300 Units |
| | Dispase: 5 mg/mL |
| | Calcium Chloride: 5 mM |
| Cell Dissociation Solution | TrypLE ™ |
| Density Gradient Solution | 7% OptiPrep |
| | OptiMEM |
| Cryopreservation Solution | DMEM or HypoThermosol-FRS |
| | 10% DMSO |
| | 10% FBS |

Dulbecco's Phosphate Buffered Saline (DPBS) was used for all cell washes.

Example 1.2—Isolation of the Heterogeneous Unfractionated Renal Cell Population

This example section illustrates the isolation of an unfractionated (UNFX) heterogeneous renal cell population from human. Initial tissue dissociation was performed to generate heterogeneous cell suspensions from human kidney tissue.

Renal tissue via kidney biopsy provided the source material for a heterogeneous renal cell population. Renal tissue comprising one or more of cortical, corticomedullary junction or medullary tissue may be used. It is preferred that the corticomedullary junction tissue is used. Multiple biopsy cores (minimum 2), avoiding scar tissue, were required from a CKD kidney. Renal tissue was obtained by the clinical investigator from the patient at the clinical site approximately 4 weeks in advance of planned implantation of the final NKA. The tissue was transported in the Tissue Transport Medium of Example 1.1.

The tissue was then washed with Tissue Wash Solution of Example 1.1 in order to reduce incoming bioburden before processing the tissue for cell extractions.

Renal tissue was minced, weighed, and dissociated in the Digestion Solution of Example 1.1. The resulting cell suspension was neutralized in Dulbecco's Modified Eagle Medium (D-MEM)+10% fetal bovine serum (FBS) (Invitrogen, Carlsbad Calif.), washed, and resuspended in serum-free, supplement-free, Keratinocyte Media (KSFM) (Invitrogen). Cell suspensions were then centrifuged over a 15% (w/v) iodixanol (OptiPrep™, Sigma) density boundary to remove red blood cells and debris prior to initiation of culture onto tissue culture treated polystyrene flasks or dishes at a density of 25,000 cells per cm² in Renal Cell Growth Medium of Example 1.1. For example, cells may be plated onto T500 Nunc flask at $25 \times 10^6$ cells/flask in 150 ml of 50:50 media.

Example 1.3—Cell Expansion of the Isolated Renal Cell Population

Renal cell expansion is dependent on the amount of tissue received and on the success of isolating renal cells from the incoming tissue. Isolated cells can be cryopreserved, if required (see infra). Renal cell growth kinetics may vary from sample to sample due to the inherent variability of cells isolated from individual patients.

A defined cell expansion process was developed that accommodates the range of cell recoveries resulting from the variability of incoming tissue Table 7. Expansion of renal cells involves serial passages in closed culture vessels (e.g., T-flasks, Cell Factories, HyperStacks®) in Renal Cell Growth Medium Table 6 using defined cell culture procedures.

A BPE-free medium was developed for human clinical trials to eliminate the inherent risks associated with the use of BPE. Cell growth, phenotype (CK18) and cell function (GGT and LAP enzymatic activity) were evaluated in BPE-free medium and compared to BPE containing medium used in the animal studies. Renal cell growth, phenotype and function were equivalent in the two media. (data not shown)

TABLE 7

Cell Recovery from Human Kidney Biopsies

| Source | Renal cells (cells/10 mg tissue) | |
|---|---|---|
| | (passage 0) | (passage 1) |
| Human Kidney Tissue Samples (n = 7) | $1.44$–$10.80 \times 10^6$ | $4.61$–$23.10 \times 10^7$ |

Figure 2A:
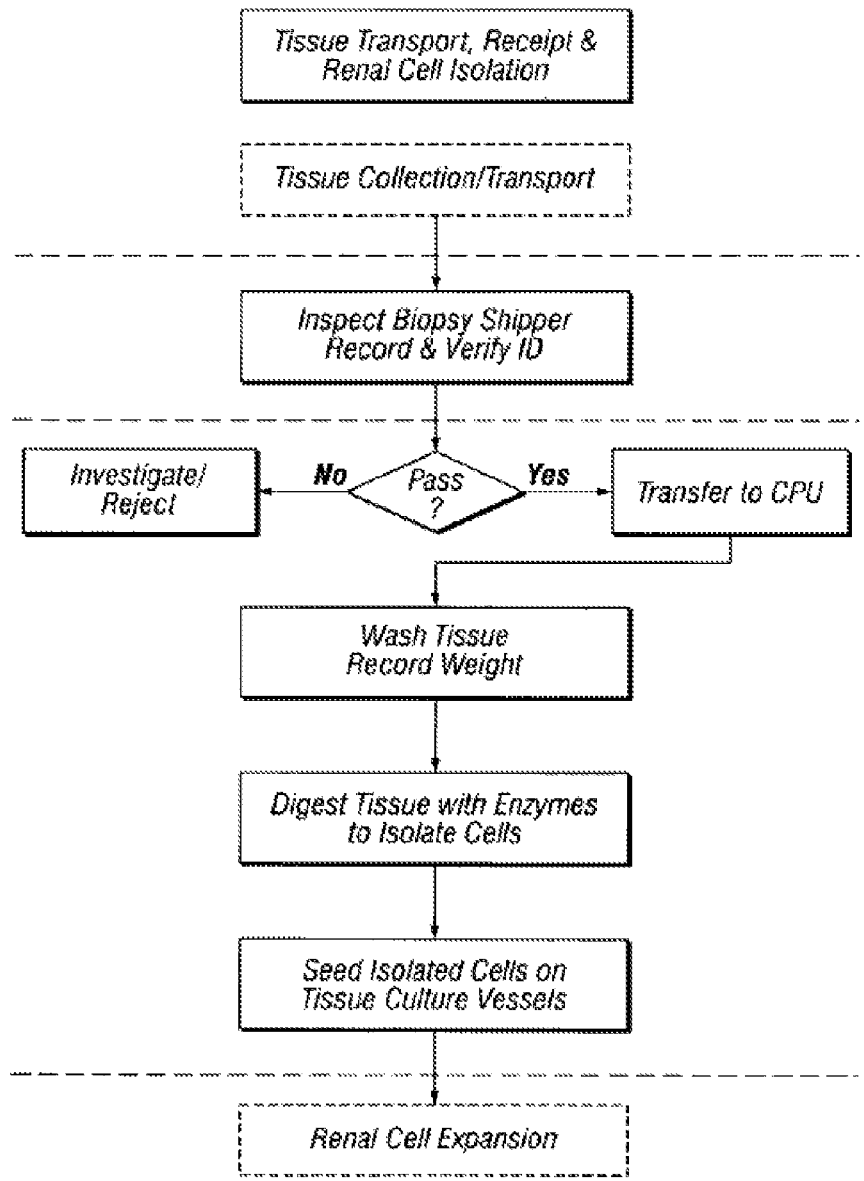
FIGS. 2A-D: Flow diagrams providing further details of the non-limiting example process depicted in FIG. 1.
Figure 2B:
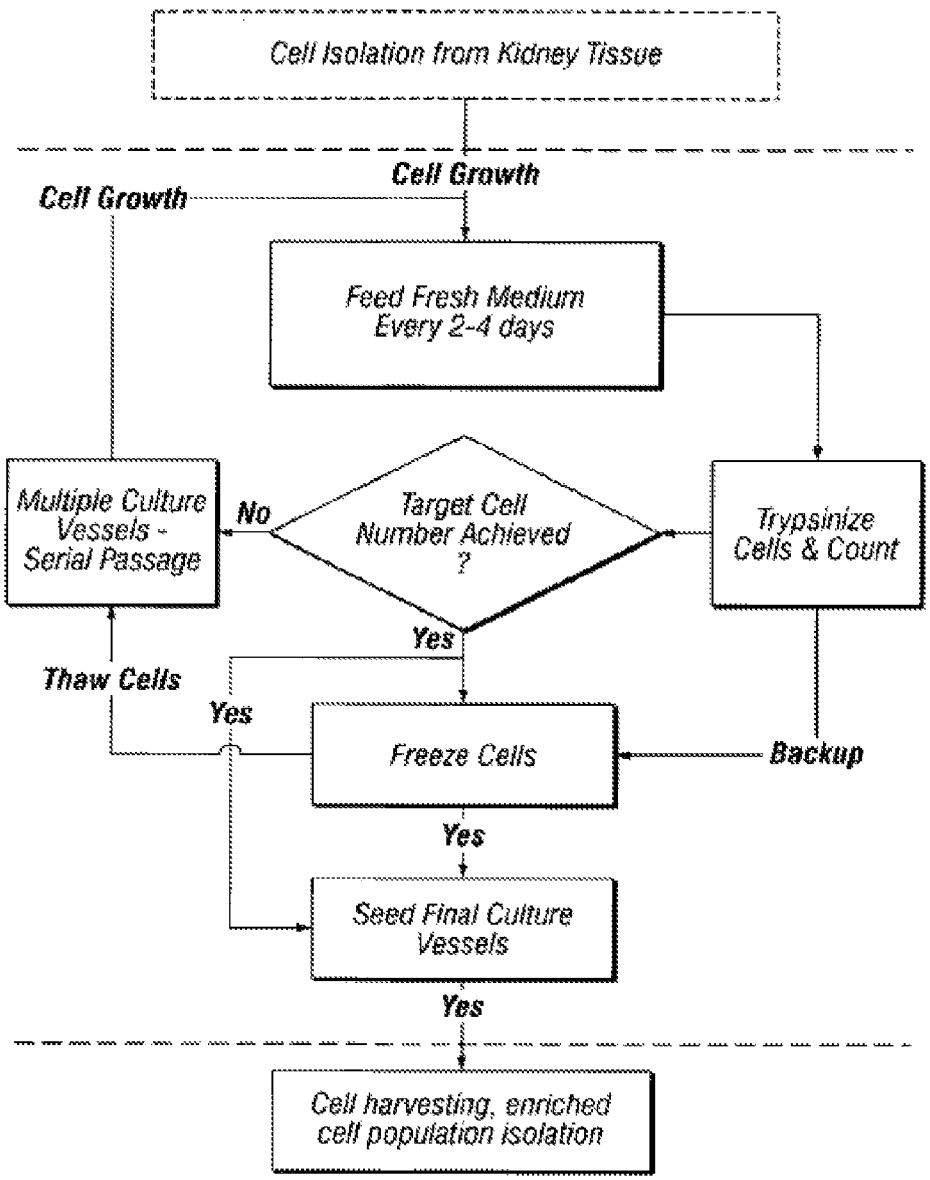

Once cell growth was observed in the initial T-flasks (passage 0) and there were no visual signs of contamination, culture medium was replaced and changed thereafter every 2-4 days (FIG. 2B). Cells were assessed to verify renal cell morphology by visual observation of cultures under the microscope. Cultures characteristically demonstrated a tight pavement or cobblestone appearance, due to the cells clustering together. These morphological characteristics vary during expansion and may not be present at every passage. Cell culture confluence was estimated at various levels of confluence in the culture vessels employed throughout cell expansions.

Renal cells were passaged by trypsinization when culture vessels are at least 50% confluent (FIG. 2B). Detached cells were collected into vessels containing Renal Cell Growth Medium, counted and cell viability calculated. At each cell passage, cells were seeded at 500-4000 cells/cm² in a sufficient number of culture vessels in order to expand the cell number to that required for formulation of NKA (FIG. 2B). Culture vessels were placed in a 37° C. incubator in a 5% $CO_2$ environment. As described above, cell morphology and confluence was monitored and tissue culture media was replaced every 2-4 days. Table 8 lists the viability of human renal cells observed during cell isolation and expansion of six kidney biopsies from human donors.

TABLE 8

Cell Viability of Human Renal Cells in Culture

| Passage (n = 6) | Cell Viability (Average %) | Range (%) |
|---|---|---|
| P0 | 88 | 84-93 |
| P1 | 91 | 80-98 |
| P2 | 94 | 92-99 |
| P3 | 98 | 97-99 |

Inherent variability of tissue from different patients resulted in different cell yield in culture. Therefore, it is not practical to strictly define the timing of cell passages or number and type of culture vessels required at each passage to attain target cell numbers. Typically renal cells undergo 2 or 3 passages; however, duration of culture and cell yield can vary depending on the cell growth rate.

Cells were detached for harvest or passage with 0.25% Trypsin with EDTA (Invitrogen). Viability was assessed via Trypan Blue exclusion and enumeration was performed manually using a hemacytometer or using the automated Cellometer® counting system (Nexcelom Bioscience, Lawrence Mass.).

Example 1.4 Cryopreservation of Cultured Cells

Expanded renal cells were routinely cryopreserved to accommodate for inherent variability of cell growth from individual patients and to deliver product on a pre-determined clinical schedule. Cryopreserved cells also provide a backup source of cells in the event that another NKA is needed (e.g., delay due to patient sickness, unforeseen process events, etc.). Conditions were established that have been used to cryopreserve cells and recover viable, functional cells upon thawing.

For cryopreservation, cells were suspended to a final concentration of about $50 \times 10^6$ cells/mL in Cryopreservation Solution (see Example 1.1) and dispensed into vials. One ml vials containing about $50 \times 10^6$ cells/mL were placed in the freezing chamber of a controlled rate freezer and frozen at a pre-programmed rate. After freezing, the cells were transferred to a liquid nitrogen freezer for in-process storage.

Example 1.5 Preparation of SRC Cell Population

Selected Renal Cells (SRC) can be prepared from the final culture vessels that are grown from cryopreserved cells or directly from expansion cultures depending on scheduling (FIG. 2B).

If using cryopreserved cells, the cells were thawed and plated on tissue culture vessels for one final expansion step. When the final culture vessels were approximately 50-100% confluent cells were ready for processing for SRC separation. Media exchanges and final washes of NKA dilute any residual Cryopreservation Solution in the final product.

Once the final cell culture vessels have reached at least 50% confluence the culture vessels were transferred to a hypoxic incubator set for 2% oxygen in a 5% $CO_2$ environment at 37° C. (FIG. 2C). and cultured overnight. Cells may be held in the oxygen-controlled incubator set to 2% oxygen for as long as 48 hours. Exposure to the more physiologically relevant low-oxygen (2%) environment improved cell separation efficiency and enabled greater detection of hypoxia-induced markers such as VEGF.

After the cells have been exposed to the hypoxic conditions for a sufficient time (e.g., overnight to 48 hours), the cells were detached with 0.25% Trypsin with EDTA (Invitrogen). Viability was assessed via Trypan Blue exclusion and enumeration was performed manually using a hemacytometer or using the automated Cellometer® counting system (Nexcelom Bioscience, Lawrence Mass.). Cells were washed once with DPBS and resuspended to about $850 \times 10^6$ cells/mL in DPBS.

Centrifugation across a density boundary/interface was used to separate harvested renal cell populations based on cell buoyant density. Renal cell suspensions were separated by centrifugation over a 7% iodixanol Solution (OptiPrep; 60% (w/v) in OptiMEM; see Example 1.1).

The 7% OptiPrep density interface solution was prepared and refractive index indicative of desired density was measured (R.I. 1.3456+/−0.0004) prior to use. Harvested renal cells were layered on top of the solution. The density interface was centrifuged at 800 g for 20 min at room temperature (without brake) in either centrifuge tubes or a cell processor (e.g., COBE 2991). The cellular fraction exhibiting buoyant density greater than approximately 1.045 g/mL was collected after centrifugation as a distinct pellet. Cells maintaining a buoyant density of less than 1.045 g/mL were excluded and discarded.

Figure 2C:
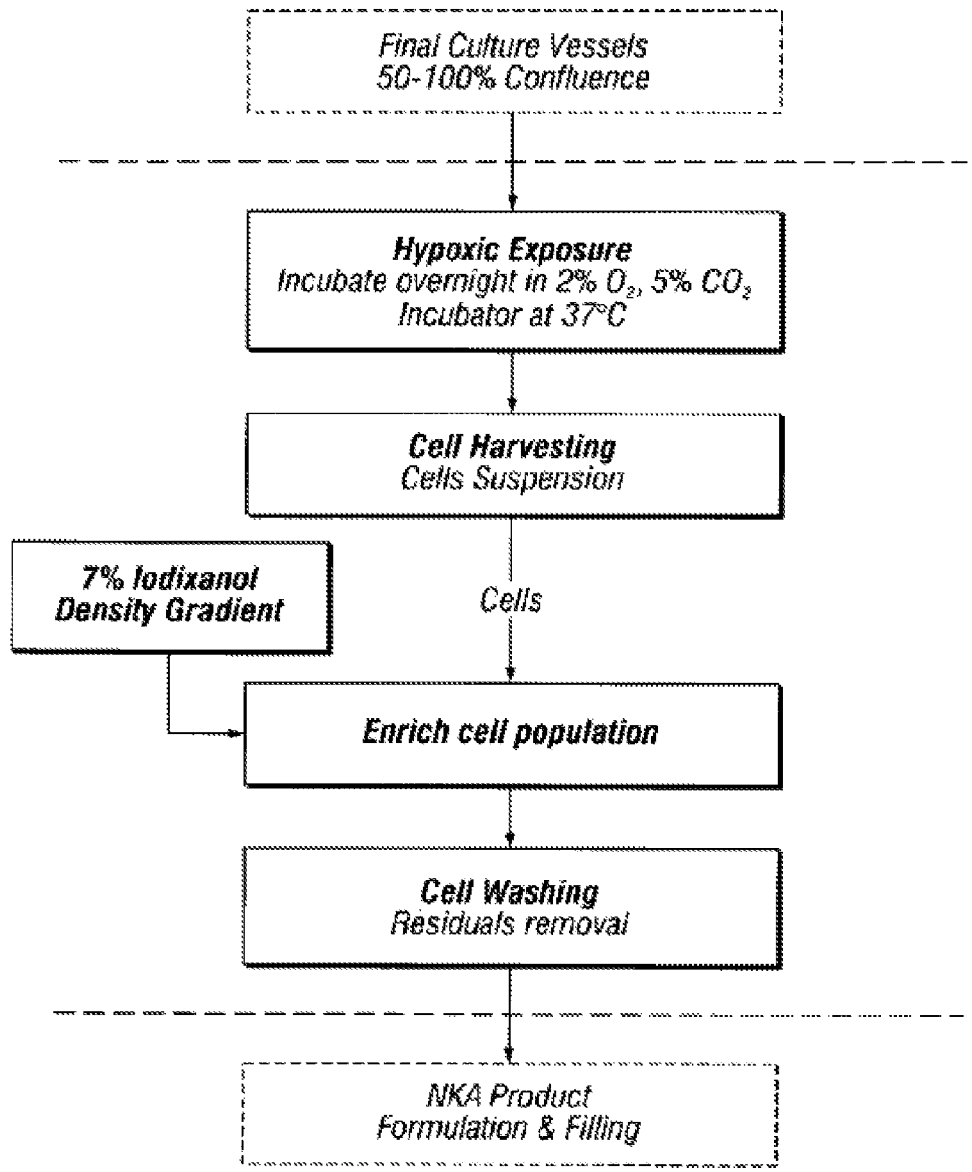
Figure 2D:
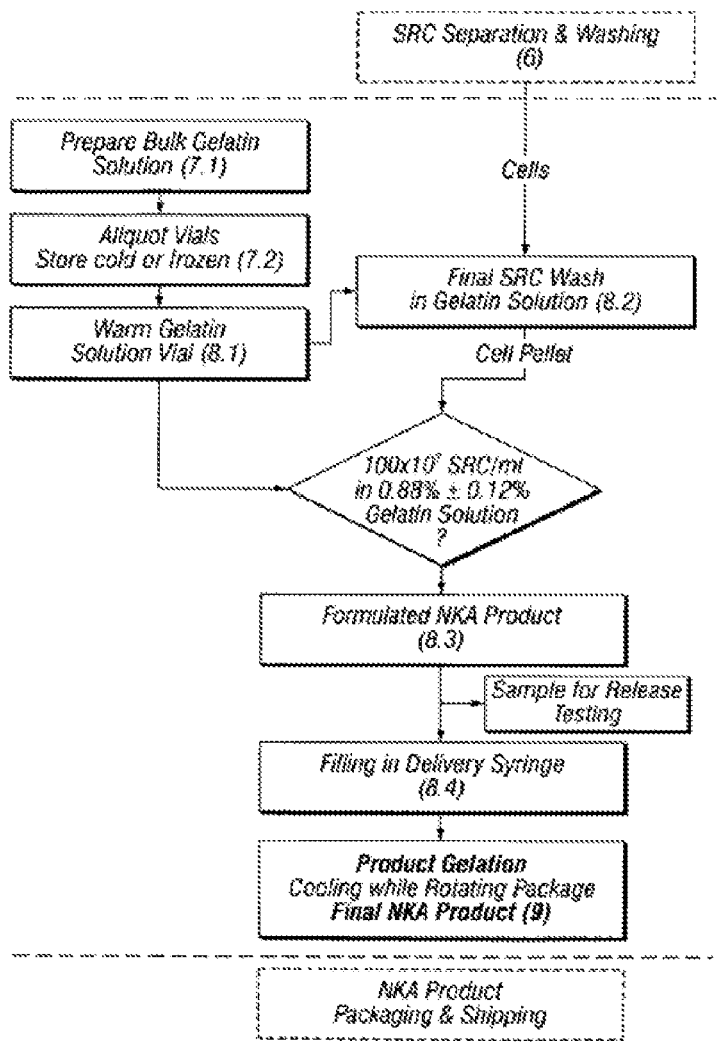
Figure 3A:
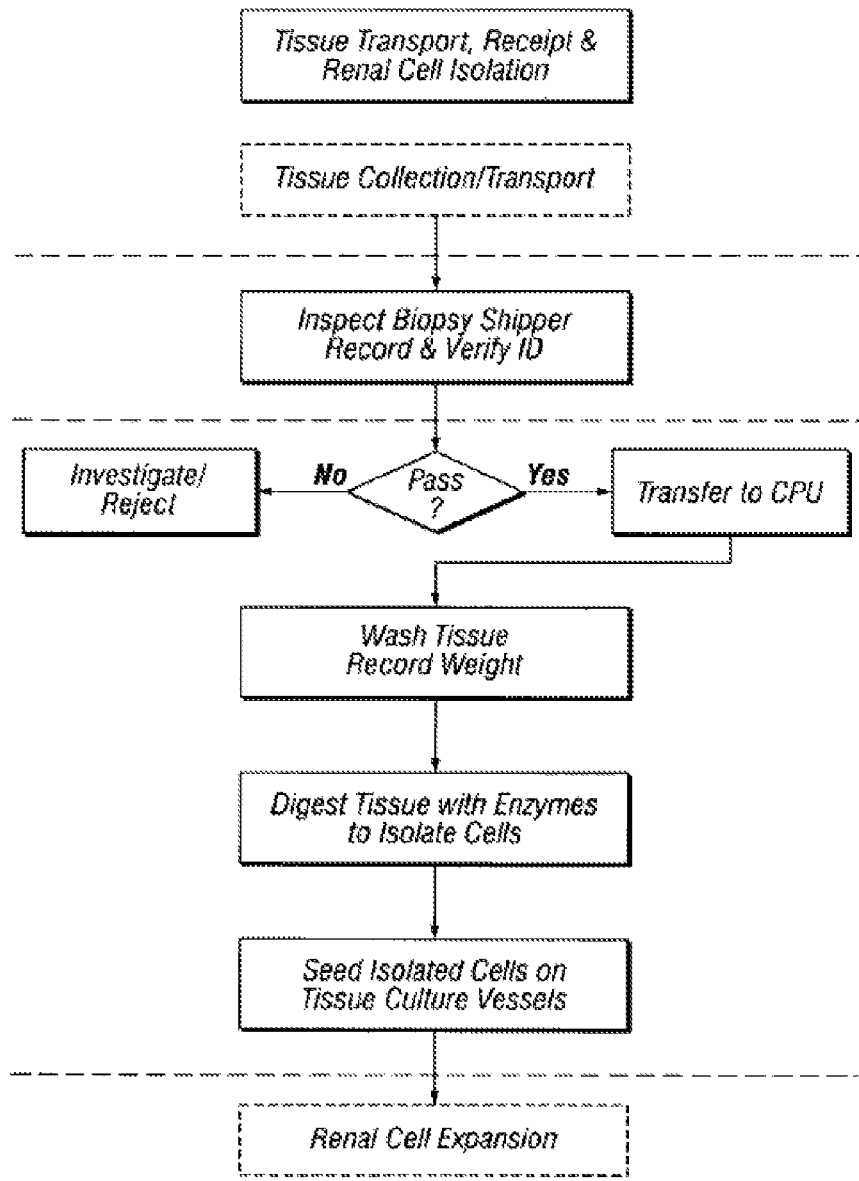
FIGS. 3A-D: Flow diagrams of a non-limiting example of the production of NKA that is supplemented with exosomes from SRCs.
Figure 3B:
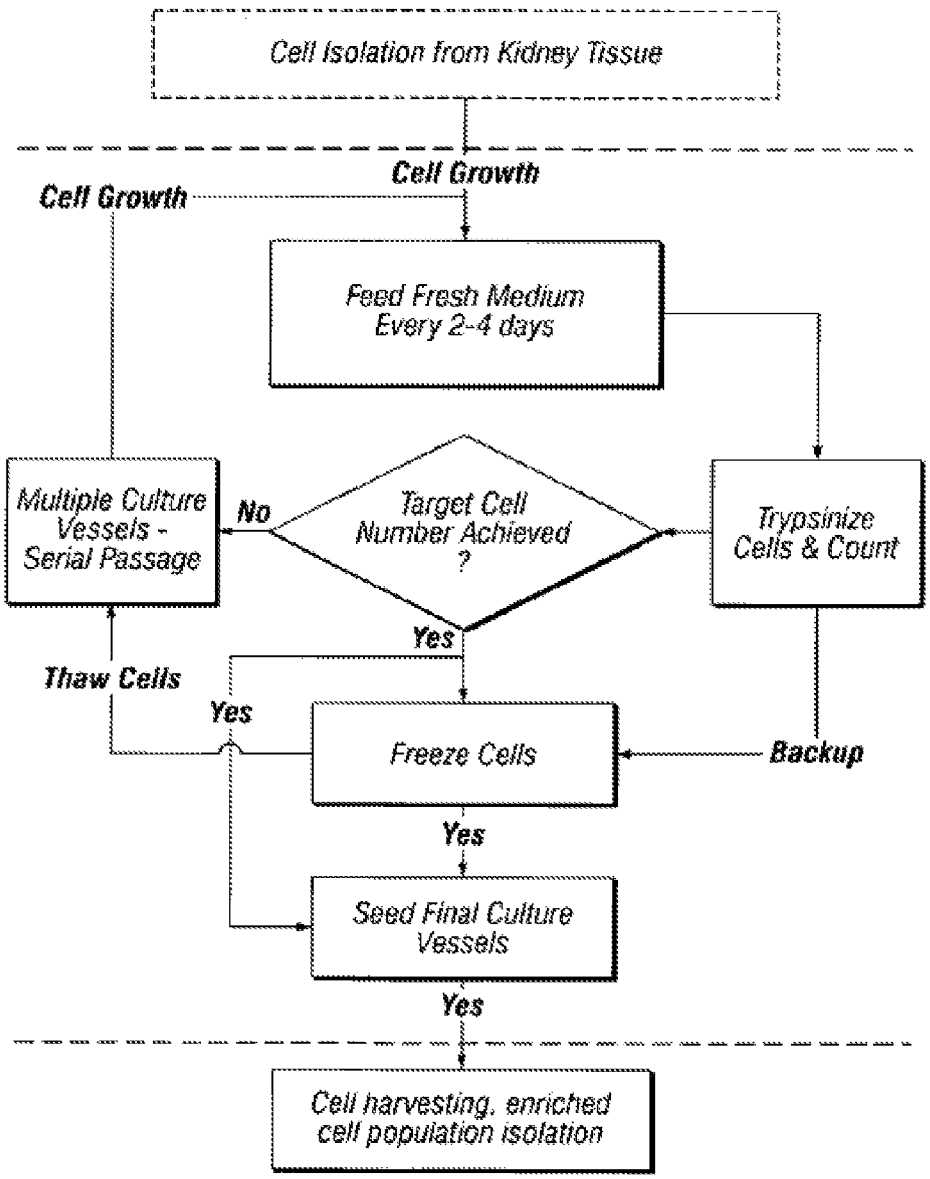
Figure 3C:
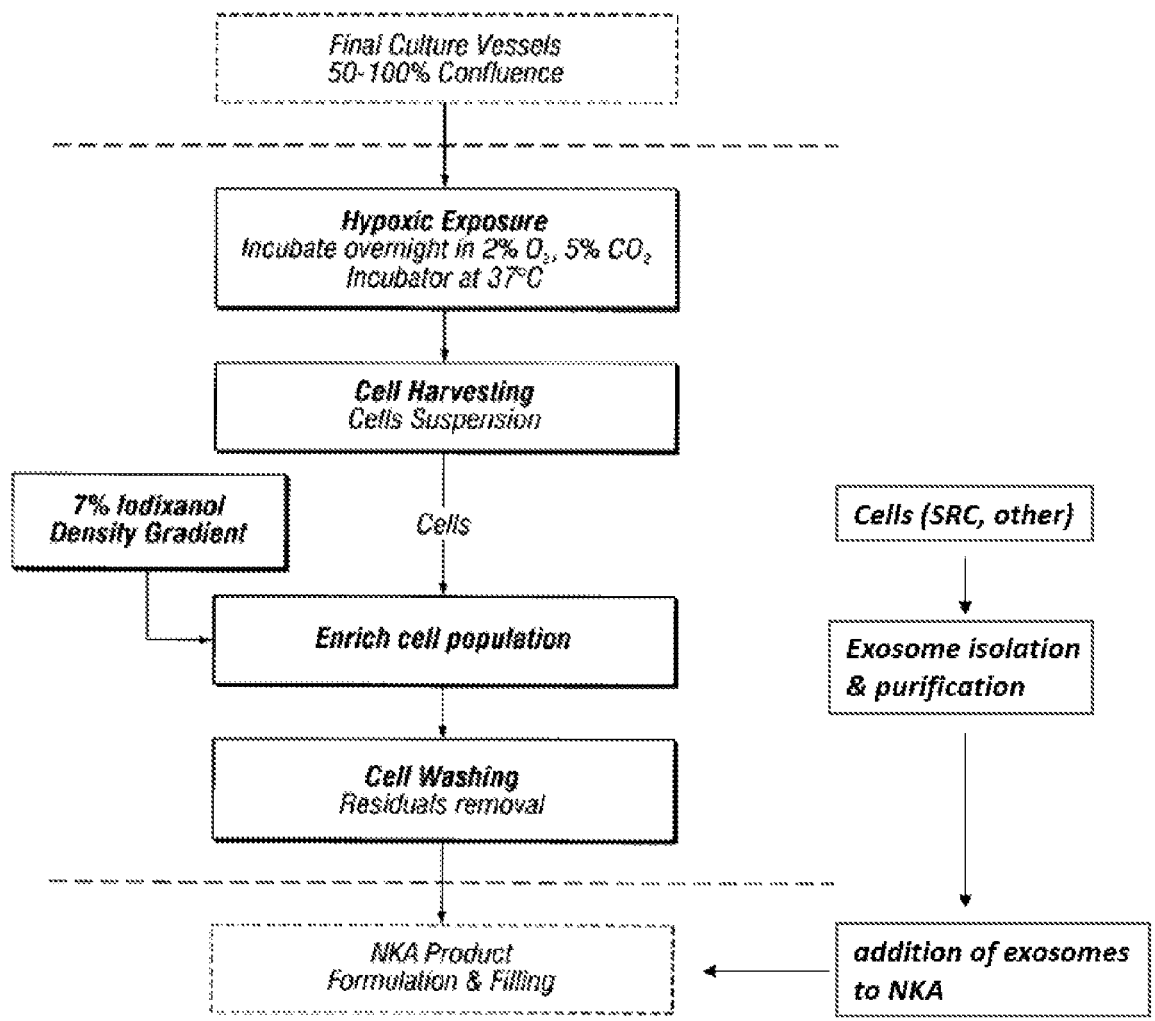
Figure 3D:
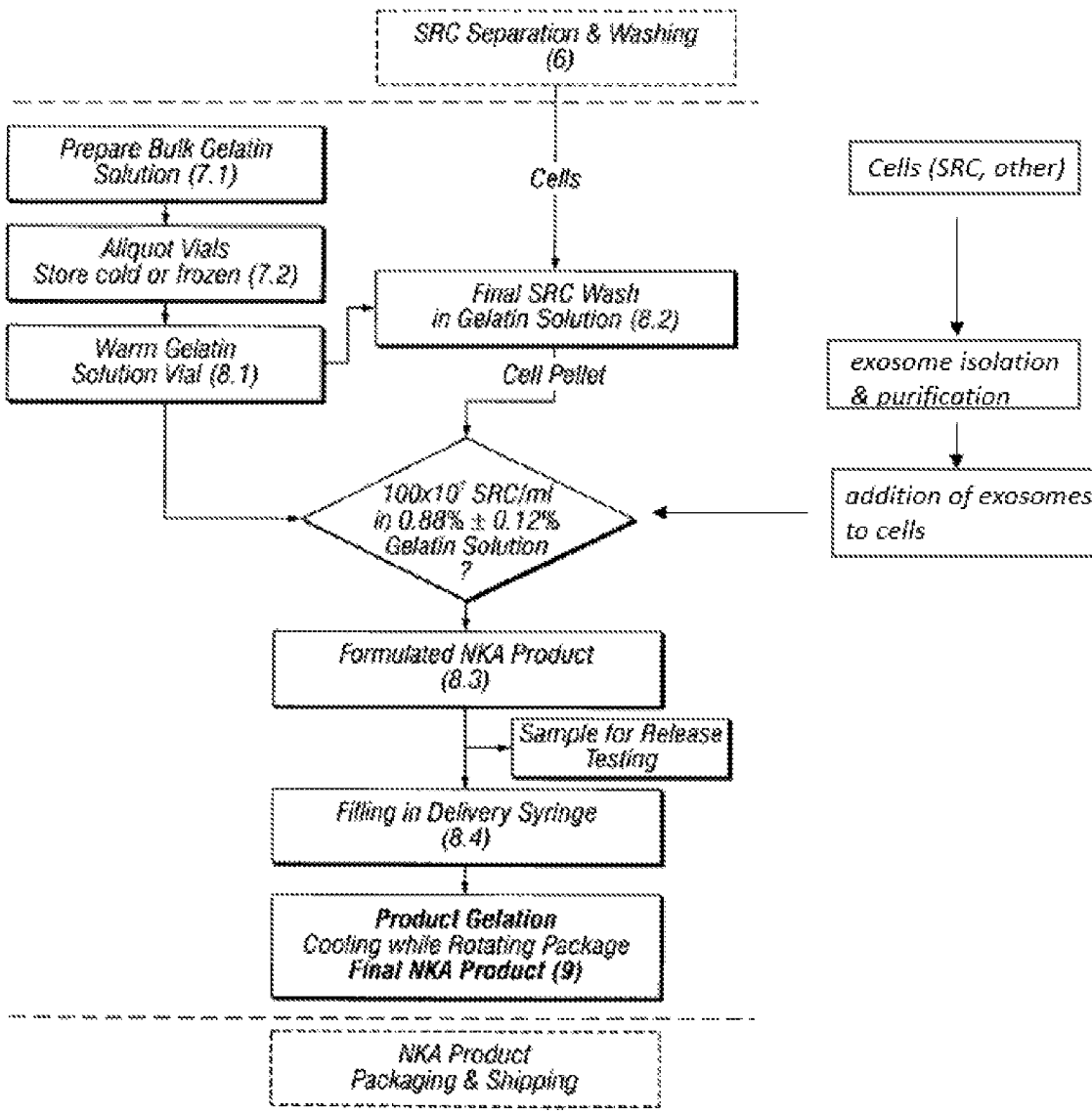
Figure 4A:
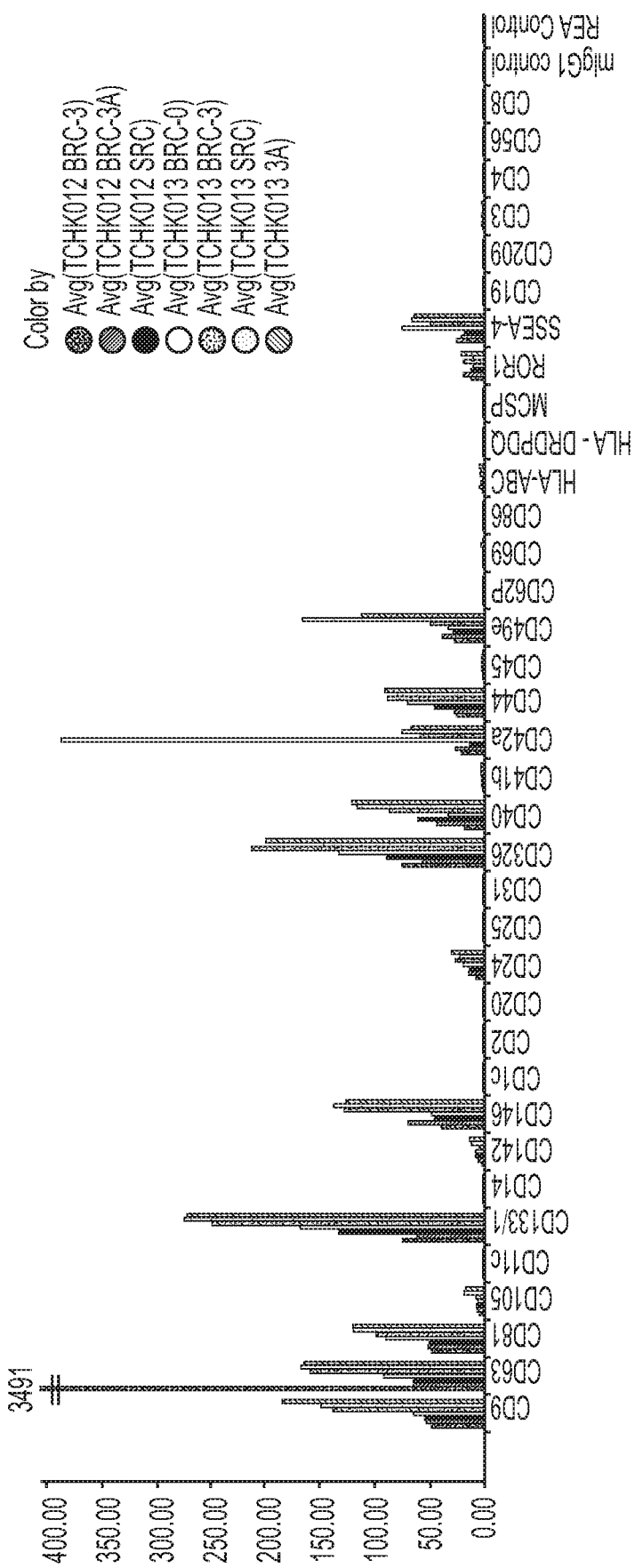
FIGS. 4A-D: are graphs showing surface protein analysis of secreted exosomes isolated from both TCHK0012 and TCHK0013. The analysis revealed that CD133, CD326, and CD49e are upregulated in expression for SRC compared to BRC. While the precise function of CD133 remains unknown, it has been proposed that it acts as an organizer of cell membrane topology. Epithelial cell adhesion molecule (EpCAM) (also known as CD326) is a transmembrane glycoprotein mediating Ca2+-independent homotypic cell-cell adhesion in epithelia. EpCAM is also involved in cell signaling, migration, proliferation, and differentiation. In addition to adhesion, integrins such as CD49e are known to participate in cell-surface mediated signalling. Arrows have been added to FIGS. 4B-D to emphasize comparisons between exosomes from BRC-3A and SRC.
Figure 4B:
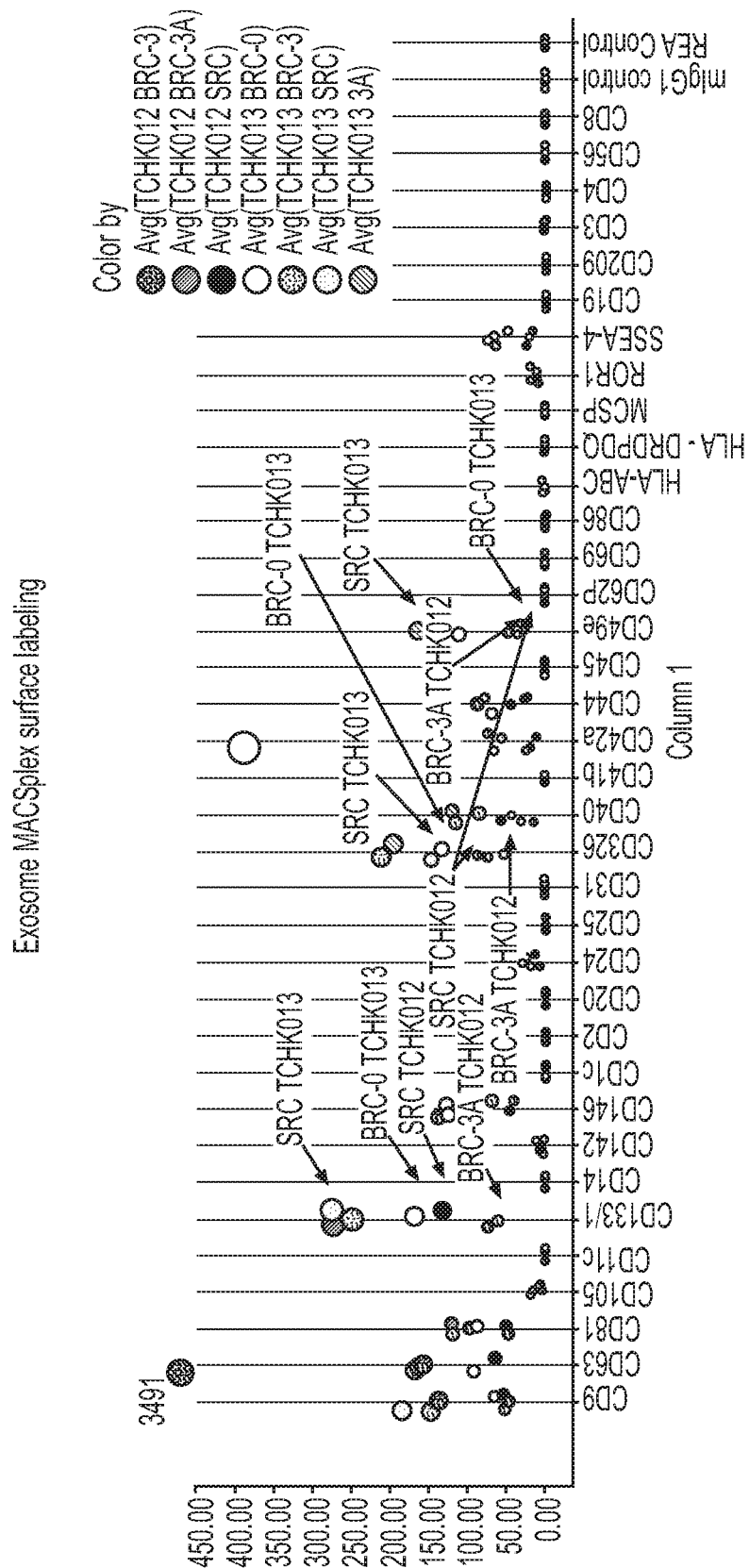
Figure 4C:
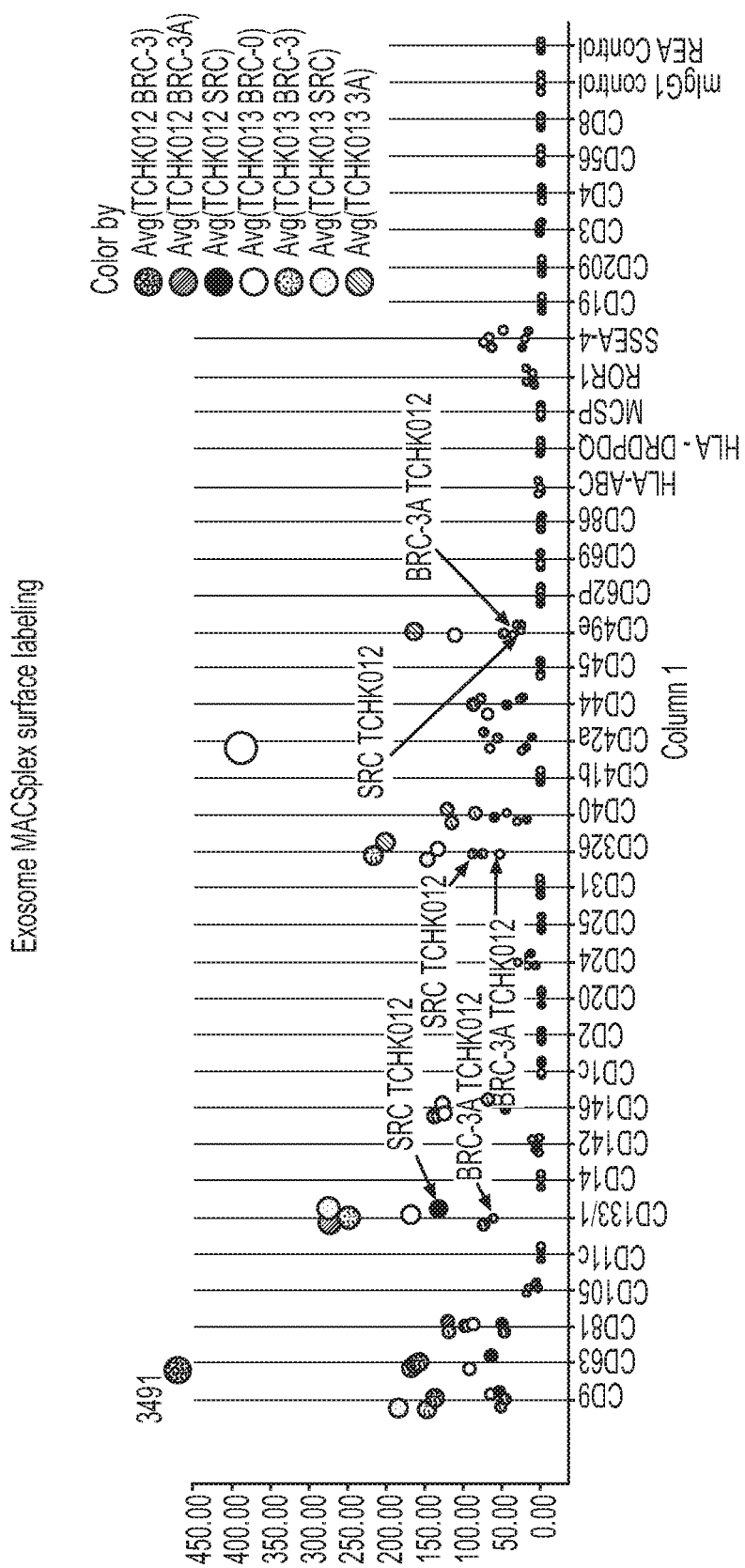
Figure 4D:
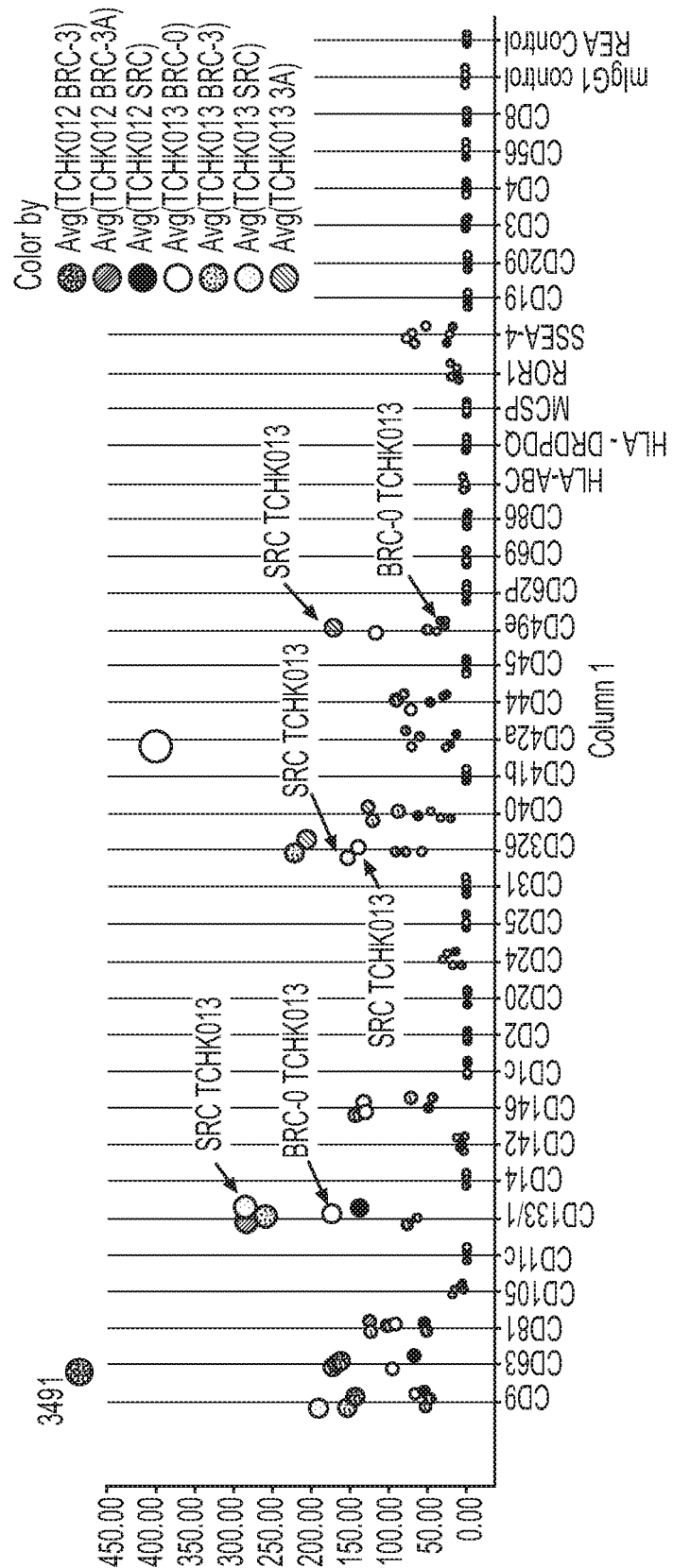

The SRC pellet was re-suspended in DPBS (FIG. 2C). The carry-over of residual OptiPrep, FBS, culture medium and ancillary materials in the final product is minimized by 4 DPBS wash and 1 Gelatin Solution steps.

Example 2: Exosome Compositions and Use Thereof for Treatment of Kidney Disease and Function Example 2.1—Technical Field This example relates to kidney cell exosome compositions, and preparation thereof, for uses including tissue engineered and regenerative medicine application to kidney repair and function.

Example 2.2—General Comments

Considerable research continues to focus on exploiting exosomes in biological fluids for biomarkers of disease. The therapeutic potential of exosomes is more recently being addressed, most of which is centered on cancer immunotherapy, vaccine development, autoimmune disease treatment, and delivery of therapeutic agents (compounds, siRNA). Exosomes as a potential therapeutic to modulate neovascularization, a key component in tissue regeneration, has been gaining attention over the last 7 years (7, 8).

Secreted extracellular vesicles (EVs), such as exosomes, are packed with potent pro-repair proteins and RNA cargos that are both cell type-specific, as well as, differentially produced and secreted according to the cellular environment. An excellent review on this subject as directly relevant to kidney disease has been published by Zhang at al. (Am J Physiol Renal Physiol. 2016 Nov. 1; 311 (5):F844-F851. doi: 10.1152/ajprenal.00429.2016. Epub 2016 Aug. 31. Extracellular vesicles in diagnosis and therapy of kidney diseases Zhang W, Zhou X, Zhang H, Yao Q, Liu Y, Dong Z.).

Chronic kidney disease (CKD) is a global health problem; the growing gap between the number of patients awaiting transplant and organs actually transplanted highlights the need for new treatments to restore renal function. Regenerative medicine is a promising approach from which treatments for organ-level disorders have emerged and translated to clinics. Regenerative templates, composed of biodegradable material and autologous cells, isolated and expanded ex vivo, stimulate native-like organ tissue regeneration after implantation.

Recent research has demonstrated an emerging role of EVs in mediating cell-cell or intercellular communication (9, 10). The unique biological activity of EVs has displayed potential benefit for the correction of cellular dysfunction and, in turn, the therapy of diseases (11). EVs have also been considered to be ideal nanovectors for biodelivery, specifically for drug delivery in clinical application (12). In kidneys, renal EVs are produced and secreted by kidney cells and have been implicated in renal function and diseases (10).

Mechanistically, several studies attributed the protective effect of EVs on kidney diseases mostly to their RNA content, especially microRNAs (13, 14).

There is intensive research on the potential of EVs as biomarkers for CKD. In contrast, very limited is known about the therapeutic effect of EVs in CKD. Without being limited by any scientific theory, we rationalize that the success in treating CKD with our SRC is due, at least in part, to hypoxic treatment of the SRC resulting in 'tuned' EVs being secreted from the implanted cells, which in turn 'rescue' the diseased cells thereby improving their function.

In certain embodiments, hypoxic tuning of selected renal cells following gradient banding prior to exosome isolation provides EVs with enhanced regenerative properties.

Example 2.3—Exosome Isolation—Quantitation and Size Determination

Based on the purification methods used (15), exosomes have been described as being 30-150 nm in range (16, 17), with an approximate density of 1.10-1.20 g/mL (18, 19), depending upon the density gradient material (sucrose or OptiPrep) used for analysis. Microvesicles have been described as being larger than exosomes, and are often described as being 100-300 nm in diametersize. The degree of overlap in the sizes for these classes of EVs varies depending upon the publication and the technology used to make the measurement. As used herein, the term "microvesicle" means a of cell-derived membranous extracellular vesicle between 30 and 1,000 nanometers (nm) in diameter. As used herein the term "exosome" means a cell-derived membranous microvesicle that is about 30-150 nm in diameter. Thus, as used herein, the term "microvesicle" encompasses exosomes, as well as larger vesicles. While a position statement (20) has been published by key opinion leaders within the International Society of Extracellular Vesicles (ISEV) in late 2014 and 2015, there is yet no uniform consensus on how best to isolate, size, and characterize exosomes. It is anticipated that as the field moves forward, particularly in the area of biological function, techniques to best isolate, size, and characterize particles will be driven by which method gives the desired biological effect. In certain embodiments, EVs comprising exosomes are obtained by process of centrifugation of EV-containing culture media at 3000×g for 20 min to pellet cellular debris, followed by ultracentrifugation of the clarified supernate at 100,000×g to pellet EVs. These preparations currently demonstrate biological activity (see proliferation and tubulogenesis assay below).

Cells are grown for 24 hr in serum-free culture medium. The medium is collected. To isolate exosomes, the collected serum-free conditioned medium is subjected to centrifugation in two steps: 1) 3000×g, 20 minutes to remove cell debris; 2) 100,000×g, 2 hours, to pellet exosomes. Exosomes are resuspended in DPBS and stored at −80° C. until use.

To determine the size distribution and concentration of the exosomes, we analyzed samples by tunable resistive pulse sensing (TRPS; (qNano, Izon Science Ltd) using a NP150 nanopore membrane at a 47 mm stretch. The concentration of particles was standardized using multi-pressure calibration with 114 nm carboxylated polystyrene beads at a concentration of $1.0 \times 10^{13}$ particles/mL. Samples were diluted 1:100 in DPBS immediately before analysis. Results and yields are shown in the table below (Table 9) for 4 different lots. While there is size and concentration variability across lots, particle size for all lots is well within the operational definition of exosomes (30-150 nm).

TABLE 9

Results And Yields of Exosome Isolation, Quantitation and Size Determination

| Lot | Sample | Particles/mL | Mode diameter (nm) |
|---|---|---|---|
| TCHK004 | BRC-3 | 1.3 × 10E11 | 115.3 |
| TCHK004 | BRC-3A | 3.7 × 10E11 | 117.9 |
| TCHK004 | SRC | 2.2 × 10E11 | 116.3 |
| TCHK006 | BRC-3 | 3.0 × 10E11 | 115.4 |
| TCHK006 | BRC-3A | 8.4 × 10E11 | 126.3 |
| TCHK006 | SRC | 9.8 × 10E11 | 124.9 |
| TCHK012 | BRC-3 | 2.5 × 10E12 | 117.7 |
| TCHK012 | BRC-3A | 4.8 × 10E11 | 131.7 |
| TCHK012 | SRC | 1.4 × 10E11 | 117.1 |
| TCHK013 | BRC-0 | 1.3 × 10E12 | 118.2 |
| TCHK013 | BRC-3 | 1.9 × 10E11 | 121.7 |
| TCHK013 | BRC-3A | 3.5 × 10E11 | 130.7 |
| TCHK013 | SRC | 4.4 × 10E11 | 123.3 |

In this and other examples, "BRC-0" are bioactive renal cells that are unpassaged primary cells. "BRC-1" are bioactive renal cells that have been passaged once. "BRC-2" are bioactive renal cells that have been passaged twice. "BRC-3" are bioactive renal cells that have been passaged three times. "BRC-3A" are bioactive renal cells that have been passaged three times and then cultured under hypoxia conditions (denotes the cells after hypoxic culture is completed). "SRC" denotes selected renal cells.

Example 2.4—SRC Exosome Micro RNA (miRNA) Characterization

Since exosome cargo contents can include several analytes including proteins, metabolites and RNA, we have characterized the microRNA found associated with SRC-derived exosomes. MicroRNAs (miRNAs) are small non-coding RNAs, comprising approximately 18-23 nucleotides, which bind to the 3'-untranslated region of messenger RNAs to repress translation or promote degradation. miRNA profiles reflect various physiological and pathological conditions. They are expressed in a tissue- or cell-specific manner. The expression levels of miRNAs change in accordance with the various physiological processes, and most of the human protein-coding genes are thought to be targeted by miRNAs.

With their function being essentially negative; i.e.: repressing RNA translation, perhaps by competitive binding or promoting degradation, miRNA have a global function of regulating cell growth and proliferation. For example, cell proliferation promotion may involve miRNA functioning to inhibit growth suppressive protein translation, and therefore expression. Alternatively, inhibiting growth promoting protein translation/expression can inhibit cell proliferation.

It must be recognized that the functions of these miRNAs has largely been determined by studying abnormal cell growth, as would be found in cancer cells and other disease states. As such, extrapolating their function in normal cells needs to be evaluated carefully. For example, just because a miRNA has been found to be elevated, or repressed, in a cancer cell does not necessarily imply that they function solely to promote cellular transformation; the balance between cellular proliferation and growth suppression has been shifted towards cellular proliferation in a cancer cell. With this in mind, it is not surprising that the majority of the above miRNAs have been identified in these kidney cells.

Experimental Outline:
  miRNA from each sample was isolated using miRNeasy Mini Kit, which enables purification of total RNA, which includes RNA from approximately 18 nucleotides (nt) upwards. miRNA was quantitated using NanoDrop Spectrophotometer.
  Sequencing Service Provided: Small RNA-Seq. Sequencing Platform: Illumina NextSeq 500. Sequencing Platform Reagent: NextSeq Mid Output Kit v2. Product Used for Library Preparation: Norgen Biotek Small RNA Library Prep Kit. Small RNA-Seq Data Analysis Workflow Used: exceRpt small RNA-seq Pipeline (v4.6.2). (Weblink: genboree.org/theCommons/projects/exrnatools-may2014/wild/Small_RNA-seq_Pipeline). Sources of small RNA reference sequences: miRNAs miRBase version 21; tRNAs gtRNAdb, piRNAs, RNAdb, Genome Gencode version 21 (hg38).

Results:
  Computational analysis of the resulting sequences reveals the following miRNAs differentially expressed in exosomes secreted by SRCs:
  miR-145—hypothesized to be a tumor suppressor
  mir-22—can function as a tumor suppressor
  miR-7—a highly conserved miRNA which displays restricted spatiotemporal expression during development and in maturity. May also function as a cell growth/tumor suppressor.
  miR-10a—Regulates pro-inflammatory phenotype, marker for renal injury. It has been experimentally verified that miR-10a downregulates the human HOXA1 and HOXA3 genes. Control of the Hox genes by miR-10 suggests that this microRNA may play an important role in development.
  miR-143—tumor suppressor, growth inhibitor
  let7b—given that the expression levels of let-7 members are significantly low in human cancers and cancer stem cells, the major function of let-7 genes may be to promote terminal differentiation in development and tumor suppression.

Example 2.5—Exosome MACSplex Surface Labeling

Exosome surface marker characterization was carried out using a multiplex assay comprised of FACS analysis for 39 surface markers reported to be present on EVs.

Experimental Outline:
    Exosomes isolated from cultured cell (BRC-0, BRC-3, BRC-3A, SRC) conditioned medium by ultracentrifugation.
    Particle diameter and concentration were assessed by tunable resistive pulse sensing (TRPS; (qNano, Izon Science Ltd) using a NP150 nanopore membrane at a 47 mm stretch. The concentration of particles was standardized using multi-pressure calibration with 110 nm carboxylated polystyrene beads at a concentration of $1.1 \times 10E13$ particles/mL.
    $1 \times 10E10$ particles were used for each sample.
    Exosomes are immunoisolated using a cocktail of CD63, CD9, and CD81.
    This population is then screened for expression of 37 different markers.
Results: See FIG. 4
    In exosomes isolated from both TCHK0012 and TCHK0013, the following are upregulated in expression for SRC compared to BRC
    CD133—While the precise function remains unknown, it has been proposed that it acts as an organizer of cell membrane topology.
    CD326—Epithelial cell adhesion molecule (EpCAM) is a transmembrane glycoprotein mediating $Ca2+$-independent homotypic cell-cell adhesion in epithelia. EpCAM is also involved in cell signaling, migration, proliferation, and differentiation.
    CD49e—In addition to adhesion, integrins are known to participate in cell-surface mediated signalling.

Example 2.6—Exosome-Mediated Lipophilic Dye Transfer to Kidney Cells

Figure 5:
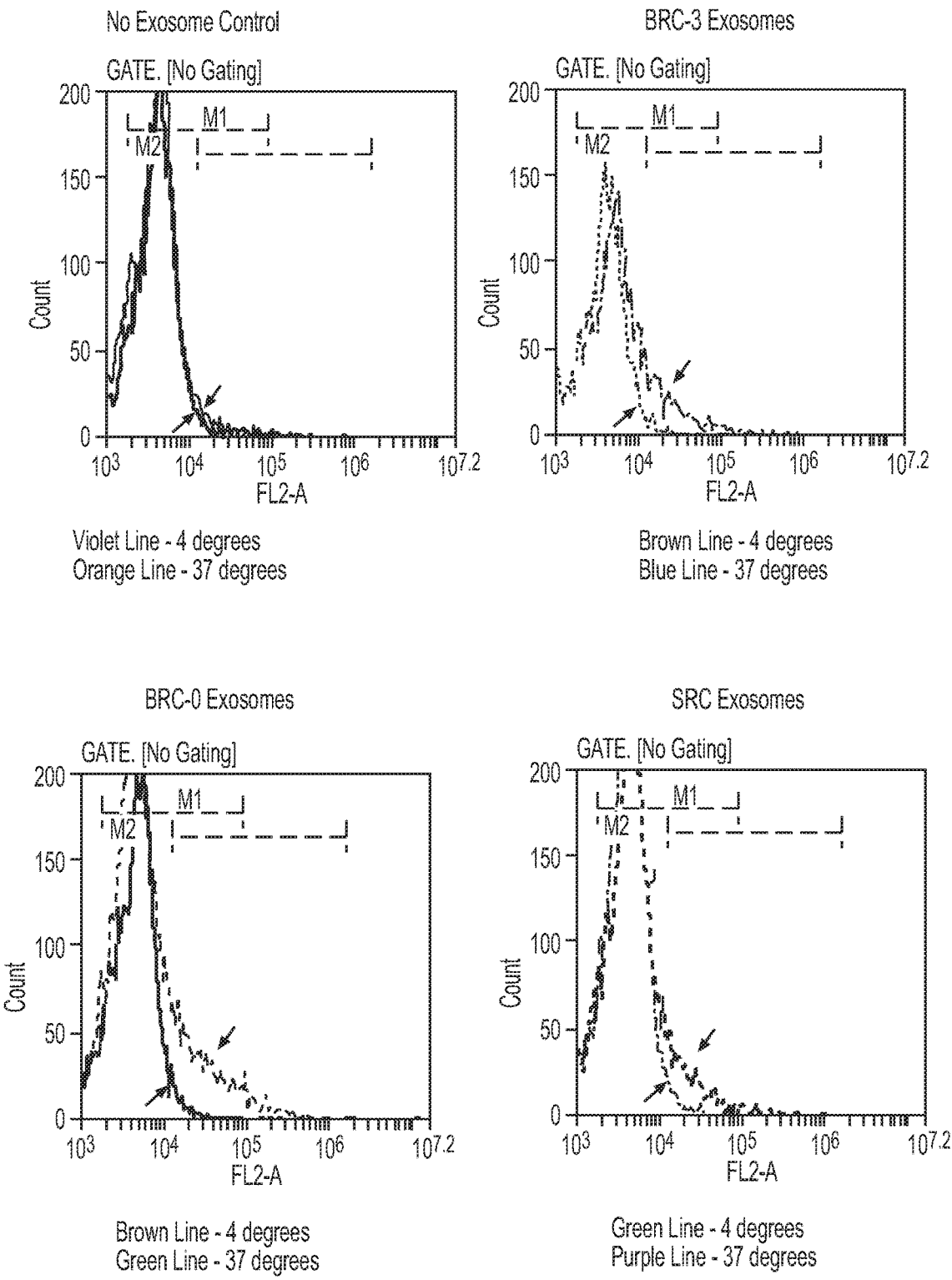
FIG. 5: Graphs from FACs analysis of exosome fusion to cells. Fluorescent labelling of cells, indicative of lipophilic dye transfer from exosomes to cell membrane, results in a shift of the of the histogram line from left to right. Exosomes will not attach and intergrated with cell membranes at 4 degrees C. This is the negative control. Incubation at 37 degrees C. allows attachment and integration, thus fluorescent labeling of the cells, thereby shifting the histogram from left to right.

In order for exosomes to deliver their protein or nucleic acid cargo, it is assumed that the exosomes must attach and fuse with the recipient cell membrane to do so. Exosome mediated delivery of a lipophilic dye to the cell membrane is one way to demonstrate exosome fusion to the recipient cell (21).
Experimental Outline:
    Dye transfer. To assess the capacity for exosomes to deliver their cargo, we monitored the ability of exosomes to transfer a lipophilic dye to kidney cells in culture by flow cytometry.
    An aliquot of exosomes (BRC-0, BRC-3, SRC) were labeled with Vybrant DiI cell labeling solution for 20 minutes at 37° C.
    Following removal of excess dye by untracentrifugation, 5×E09 labeled exosomes were added to each well of a 6-well dish, each containing approximately 250,000 cells/well.
    After 4 hr incubation at either 4 degrees C. or 37 degrees C., cultures were washed to remove any unincorporated, labeled exosomes.
    Recovered cells were then recovered and analyzed by FACs.
    Fluorescently labeled cells, indicative of lipophilic dye transfer from exosomes to cell membrane, results in a shift of the of the histogram line from left to right.
Results: See FIG. 5
    As expected, no exosome binding, as indicated by a lack of transfer of the lipophilic dye, was observed at 4 degrees. This supports the notion that cell need to be biologically active for exosomes to be taken up.
    Also as expected, in the no exosome control histogram, there is no shift to the right compared to the 4 degree histogram.
    The area between the histograms, as indicated by the arrows, indicated the population of cells which took up the dye.
    Based on this experiment, there appears to be a differential in exosome binding between BRC-0 (the greatest) and BRC-3 and SRC (approximately the same degree of binding).

Example 2.7—Cell Proliferation Assay

Figure 6:
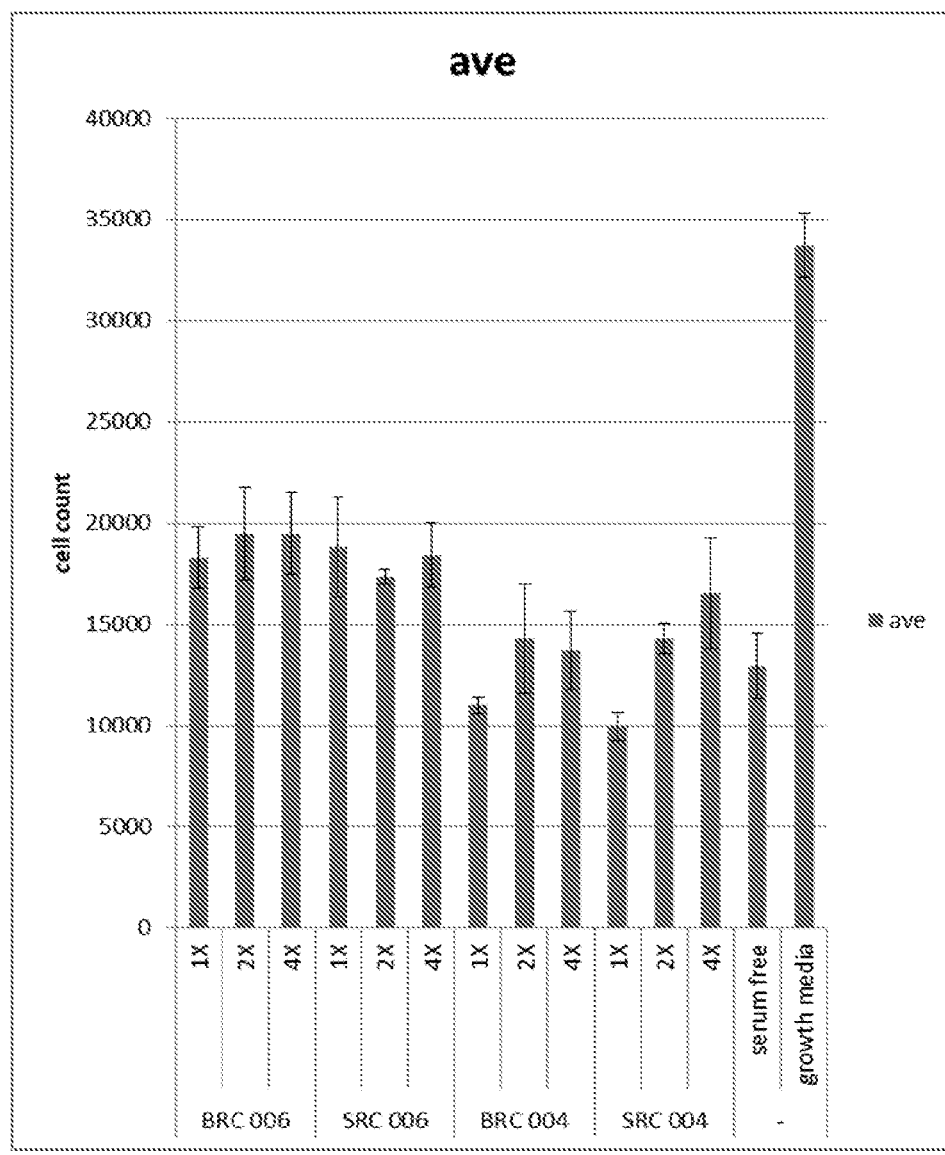
FIG. 6: Graph showing cell proliferation as mean cell count (y-axis) in response to variable dose of exosomes sourced from renal cell populations (dose/response with 1×=x ng/ml exosome).

For exosomes to play a role in kidney tissue repair and regeneration, it may be argued that having the ability stimulate kidney cell proliferation would be a desirable function.
Experimental Outline:
    Human kidney cells were plated 50,000 cells/well on a 12-well plate.
    Exosomes were isolated from indicated cell supernates.
    Exosome volumes of 25, 50, 100 uL (1×, 2×, 4×) were added to respective wells
    Samples were tested in duplicate.
    Plates were enumerated 3-days after treatment using the ArrayScan.
    SF=serum-free medium (negative control).
    Growth media=serum containing media (positive control).
Results: See FIG. 6
    All treatment dilutions of TCHK006 BRC-3 and SRC increased cell proliferation, almost to the same level, above that of the negative control.
    Treatment dilutions of TCHK004 BRC-3 and SRC demonstrated a dose-like effect on proliferation; only the 4× volume of SRC increased proliferation above that of the negative control.

Example 2.7—Tubule Formation/Angiogenesis Assay

The ability to stimulate angiogenesis is also assumed to be a desirable function for a tissue engineered/regenerative medicine product. One of the most widely used in vitro assays to model the reorganization stage of angiogenesis is the tube formation assay. The assay measures the ability of endothelial cells, plated at subconfluent densities with the appropriate extracellular matrix support, to form capillary-like structures (a.k.a tubes). Scientists typically employ this assay to determine the ability of various compounds to promote or inhibit tube formation. Upon plating, endothelial cells attach and generate mechanical forces on the surrounding extracellular support matrix to create tracks or guidance pathways that facilitate cellular migration. The resulting cords of cells will eventually form hollow lumens.
Compounds that are able to inhibit tube formation could be useful in various diseases, such as cancer, where tumors stimulate new blood vessel formation to receive oxygen and nutrients in order to grow beyond a relatively small size. In contrast, compounds or biologics (i.e.: exosomes) that can stimulate tube formation can be useful in tissue engineering/regenerative medicine applications.
Experimental Outline:
    50,000 vascular endothelial cells were plated onto an extracellular matrix (GelTrex) in a 48-well plate.
    Cells incubated in serum-free growth medium supplemented with growth factors as the positive control.

Cells were incubated in serum-free growth factor-free medium as the negative control.

Cells incubated in serum-free and growth factor-free medium supplemented with exosomes (TCHK004, SRC, 10E10 particles) is the test article.

Figure 7:
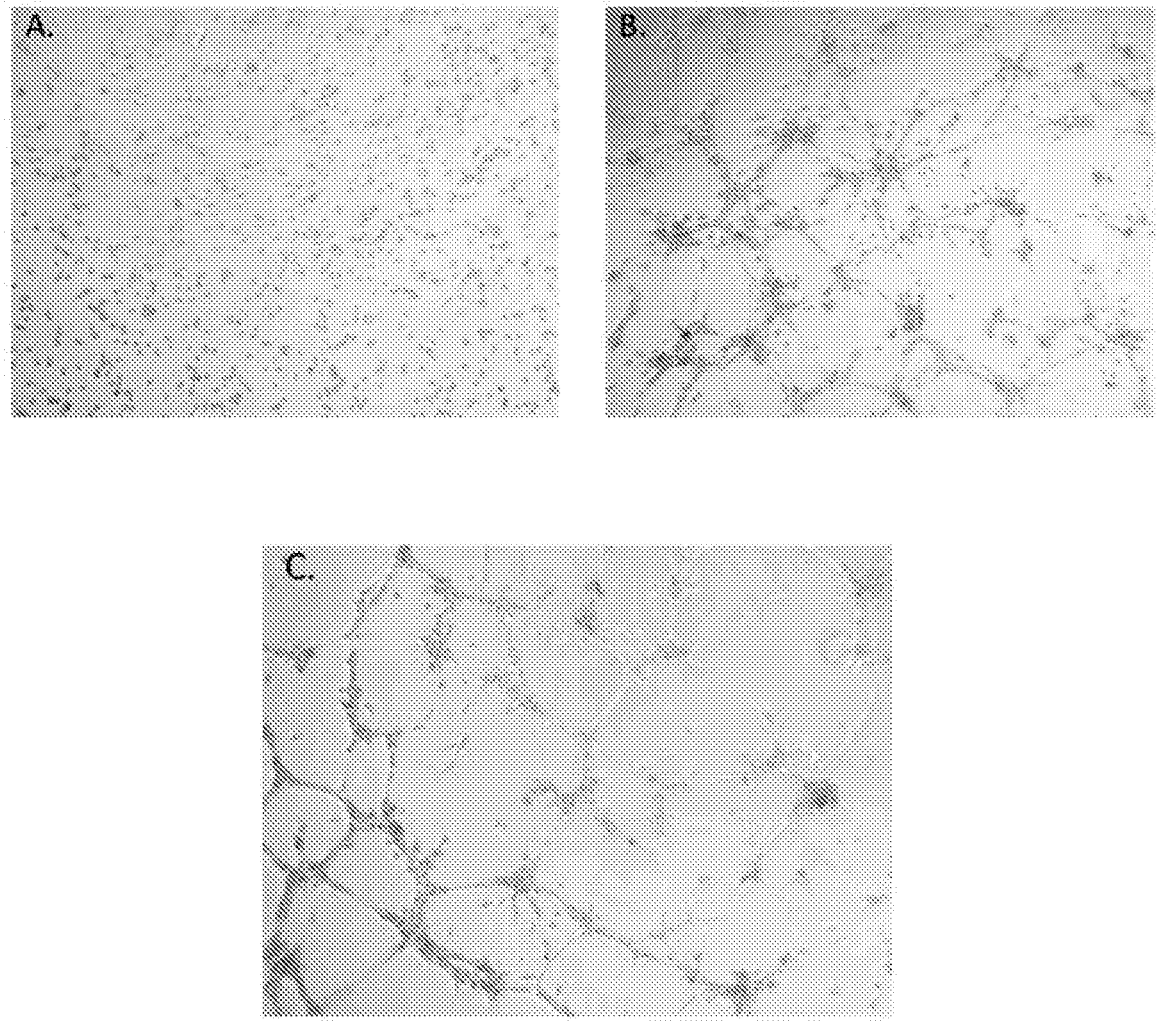
FIGS. 7A-C: Images of cells. Cultures were incubated for 9 hr following treatment. A. Serum-free, Growth factor-free medium (negative control). B. Serum-free, growth factor-free medium supplemented with 10E10 exosomes (test article). C. Serum-free medium supplemented with growth factors (positive control).

Results: See FIG. 7

While tubule formation occurred more rapidly in the positive control (tubules becoming visible by T=2 hr), by T=9 hr, robust tubule formation was observed for the exosome treated cells.

Exosomes successfully replaced a defined growth factor cocktail, containing, hEGF, bFGF, IGF-1 and VEGF, in supporting the formation of tubules.

Cultures were incubated for 9 hr following treatment. A. Serum-free, Growth factor—free medium (negative control). B. Serum-free, growth factor-free medium supplemented with 10E10 exosomes (test article). C. Serum-free medium supplemented with growth factors (positive control).

Example 2.8—References

1. Kowal J, Tkach M, Théry C. Biogenesis and secretion of exosomes. Curr Opin Cell Biol. 2014 Jun. 21; 29C:116-125. doi: 10.1016/j.ceb.2014.05.004. [Epub ahead of print] Review. PMID: 24959705
2. Revenfeld A L, Bæk R, Nielsen M H, Stensballe A, Varming K, Jørgensen M. Diagnostic and Prognostic Potential of Extracellular Vesicles in Peripheral Blood. Clin Ther. 2014 Jun. 1; 36(6):830-846. doi: 10.1016/j.clinthera.2014.05.008. Review. PMID: 24952934
3. Lamichhane T N, Sokic S, Schardt J S, Raiker R S, Lin J W, Jay S M. Emerging roles for extracellular vesicles in tissue engineering and regenerative medicine. Tissue Eng Part B Rev. 2014 Jun. 23. [Epub ahead of print] PMID: 24957510
4. Simons M, Raposo G. Exosomes-vesicular carriers for intercellular communication. Curr Opin Cell Biol 2009, August; 21(4):575-581. doi: 10.1016/j.ceb.2009.03.007. Epub 2009 May 11. Review. PMID: 19442504
5. Stoorvogel W, Kleijmeer M J, Geuze H J, Raposo G. The biogenesis and functions of exosomes. Traffic 2002, May; 3(5):321-330. PMID: 11967126
6. Nieuwland R, Sturk A. Why do cells release vesicles? Thrombosis Research 2010, 125 (Supplement 1):549-S51. doi: 10.1016/j.thromres.2010.01.037. Epub 2010 Feb. 11. Review. PMID: 20149923
7. Martinez M C, Andriantsitohaina R: Microparticles in angiogenesis: therapeutic potential. Circ Res 2011, Jun. 24, 109(1):110-119. doi: 10.1161/CIRCRESAHA.110.233049. Review. PMID: 21700952
8. Sahoo S, Klychko E, Thorne T, Misener S, Schultz K M, Millay M, Ito A, Liu T, Kamide C, Agrawal H et al: Exosomes from human CD34(+) stem cells mediate their proangiogenic paracrine activity. Circ Res 2011, Sep. 16, 109(7):724-728. doi: 10.1161/CIRCRESAHA.111.253286. Epub 2011 Aug. 11. PMID: 21835908
9. Camussi G, Deregibus M C, Bruno S, Cantaluppi V, Biancone L. Exosomes/microvesicles as a mechanism of cell-to-cell communication. Kidney Int 78: 838-848, 2010.
10. Krause M, Samoylenko A, Vainio S J. Exosomes as renal inductive signals in health and disease, and their application as diagnostic markers and therapeutic agents. Front Cell Dev Biol 3: 65, 2015.
11. Erdbrugger U, Le T H. Extracellular vesicles in renal diseases: More than novel biomarkers? J Am Soc Nephrol 27: 12-26, 2016.
12. Vader P, Mol E A, Pasterkamp G, Schiffelers R M. Extracellular vesicles for drug delivery. Adv Drug Deliv Rev (Epub ahead of print).
13. Chen T S, Lai R C, Lee M M, Choo A B, Lee C N, Lim S K. Mesenchymal stem cell secretes microparticles enriched in pre-microRNAs. Nucleic Acids Res 38: 215-224, 2010.
14. Wang B, Yao K, Huuskes B M, Shen H H, Zhuang J, Godson C, Brennan E P, Wilkinson-Berka J L, Wise A F, Ricardo S D. Mesenchymal stem cells deliver exogenous microRNA-let7c via exosomes to attenuate renal fibrosis. Mol Ther 24: 1290-1301, 2016.
15. Lane R E, Korbie D, Anderson W, Vaidyanathan R, Trau M. Analysis of exosome purification methods using a model liposome system and tunable-resistive pulse sensing. Sci Rep. 2015 Jan. 6; 5:7639. doi: 10.1038/srep07639
16. Dragovic R A, Gardiner C, Brooks A S, Tannetta D S, Ferguson D J, Hole P, Carr B, Redman C W, Harris A L, Dobson P J, Harrison P, Sargent I L. Sizing and phenotyping of cellular vesicles using Nanoparticle Tracking Analysis. Nanomedicine. 2011 December; 7(6):780-8. doi: 10.1016/j.nano.2011.04.003. Epub 2011 May 4
17. van der Pol E, Hoekstra A G, Sturk A, Otto C, van Leeuwen T G, Nieuwland R. Optical and non-optical methods for detection and characterization of microparticles and exosomes. J Thromb Haemost. 2010 December; 8(12):2596-607. doi: 10.1111/j.1538-7836.2010.04074.x.
18. Tauro B J1, Greening D W, Mathias R A, Ji H, Mathivanan S, Scott A M, Simpson R J. Comparison of ultracentrifugation, density gradient separation, and immunoaffinity capture methods for isolating human colon cancer cell line LIM1863-derived exosomes. Methods. 2012 February; 56(2):293-304. doi: 10.1016/j.ymeth.2012.01.002. Epub 2012 Jan. 21
19. Kalra H, Adda C G, Liem M, Ang C S, Mechler A, Simpson R J, Hulett M D, Mathivanan S. Comparative proteomics evaluation of plasma exosome isolation techniques and assessment of the stability of exosomes in normal human blood plasma. Proteomics. 2013 November; 13(22):3354-64. doi: 10.1002/pmic.201300282. Epub 2013 Oct. 18
20. Lötvall J, Hill A F, Hochberg F, Buzás E I, Di Vizio D, Gardiner C, Gho Y S, Kurochkin I V, Mathivanan S, Quesenberry P, Sahoo S, Tahara H, Wauben M H, Witwer K W, Théry C. Minimal experimental requirements for definition of extracellular vesicles and their functions: a position statement from the International Society for Extracellular Vesicles. J Extracell Vesicles. 2014 Dec. 22; 3:26913. doi: 10.3402/jev.v3.26913. eCollection 2014
21. Deregibus, M. C., et al., Endothelial progenitor cell derived microvesicles activate an angiogenic program in endothelial cells by a horizontal transfer of mRNA. Blood, 2007. 110(7): p. 2440-8.
22. Dursun I, Poyrazoglu H M, Gunduz Z, Ulger H, Yykylmaz A, Dusunsel R, Patyroglu T, Gurgoze M. The relationship between circulating endothelial microparticles and arterial stiffness and atherosclerosis in children with chronic kidney disease. Nephrol Dial Transplant 24: 2511-2518, 2009.

Example 3: Profiling of miRNA Present in Secreted Exosomes and Intra-Cellular Vesicles of Human SRC, BRC3/3A and BRC0

Bioinformatics analysis of SRC secreted proteins and exosomal miRNA identifies specific signaling pathways that, upon activation or deactivation by SRC-derived factors, can modulate progression of CKD. These signaling pathways can be leveraged in vitro as quantitative potency assays linked directly to putative SRC MOA and/or the identified proteins/miRNA can be applied as proxies for potency and assessed by ELISA/PCR-based methodologies from the conditioned media. This approach leads to identification of signaling pathways involved in renal disease progression and SRC MOA function through paracrine mechanisms that leverage the activity of secreted, biologically active ligands and miRNAs transferred from donor to host cell through the activity of exosomes and other secreted micro-vesicular elements.

miRNA was isolated from exosomes purified from secreted media or from the intracellular niche. Using n=6 independent donors, statistically rigorous comparisons could be made for the following: BRC3/3A and BRC0/SRC. miRNAs that discriminate these manufacturing intermediates were identified.

Approach

1. Application of Computational/Bioinformatics Approaches to Cell Secretome

We have characterized the secretome and miRNA profiles (intracellular and exosomal) from SRC and SRC manufacturing intermediates (n=6). Data sets are continuously being analyzed by bioinformatics methodologies to computationally identify disease relevant and regeneration associated signaling networks that are directly impacted by secreted proteins or miRNA generated by SRC.

To date, these data demonstrate that the BRC3-BRC3A transition (the hypoxic step) induce major changes in the bio-signature of the BRC cell population such that the manufacturing end-product (SRC) is clearly distinguishable from the starting material (BRC0).

2. Profiling of miRNA Present in Secreted Exosomes and Intra-Cellular Vesicles of Human SRC, BRC3/3A and BRC0 miRNA was isolated from exosomes purified from secreted media or from the intracellular niche. Using n=6 independent donors, statistically rigorous comparisons are continuously being made for the following: BRC3/3A and BRC0/SRC.

miRNAs that discriminate these manufacturing intermediates were identified Unlike standard phenotypic description and functional analysis, the approach of characterizing SRC and BRC-0 cell secretome and miRNA provides increased depth of understating how SRC not only differs from BRC-0, but also provides a unique and useful approach for potency assays. The data we have collected clearly distinguished SRC from BRC-0. Without being bound by any scientific theory, many of the differences are most likely due to the hypoxia step, as there are also differences between BRC-3, BRC-3A, and SRC.

Example 3.1: Experimental Design

| Item | Treatment | versus | Control |
|---|---|---|---|
| 1 | F1 | -> | A1 |
| 2 | E1 | -> | D1 | n=6, TCHK007-TCHK012
A1 Exosomes produced by BRC0 cells.
D1 Exosomes produced by BRC3 cells.
E1 Exosomes produced by BRC3A cells.
F1 Exosomes produced by SRCs.

Example 3.2—Differentially Expressed miRNA

Based on the experimental design, the number of differentially expressed miRNA for each comparison is shown in the table below. Standard selection criteria to identify differentially expressed miRNA are as follows: |Loge Fold Change|≥1 and P-value<0.05.

TABLE 10

Number of Differentially Expressed miRNA

| Comparison | # of Up Regulated DE miRNA | # of Down Regulated DE miRNA |
|---|---|---|
| E1-D1 | 7 | 3 |
| F1-A1 | 55 | 26 |

In the tables below, "hsa-" denotes a human miRNA.

TABLE 11

Top 10 Differentially Expressed miRNAs in E1 vs. D1
(in order of increasing p-values)
BRC3A/BRC3 EXO

| Precursor id | miRNA | log2 Fold Change | pvalue | padj |
|---|---|---|---|---|
| hsa-mir-29c | hsa-miR-29c-5p | 3.181232 | 0.003832 | 1 |
| hsa-mir-29c | hsa-miR-29c-3p | 3.291516 | 0.004117 | 1 |
| hsa-mir-365b | hsa-miR-365b-5p | -2.43265 | 0.008775 | 1 |
| hsa-mir-671 | hsa-miR-671-3p | -1.49642 | 0.009594 | 1 |
| hsa-mir-582 | hsa-miR-582-5p | 3.157731 | 0.012213 | 1 |
| hsa-mir-5000 | hsa-miR-5000-3p | -2.91283 | 0.016513 | 1 |
| hsa-mir-500a | hsa-miR-500a-5p | 2.418366 | 0.036039 | 1 |
| hsa-mir-664a | hsa-miR-664a-3p | 1.326512 | 0.041323 | 1 |
| hsa-mir-15b | hsa-miR-15b-5p | -0.84746 | 0.043942 | 1 |
| hsa-mir-34c | hsa-miR-34c-5p | 1.564816 | 0.044587 | 1 |

TABLE 12

Top 10 Up-regulated miRNAs in E1 vs. D1
(in order of decreasing fold change)
BRC3A/BRC3 EXO

| Precursor id | miRNA | log2 Fold Change | pvalue | padj |
|---|---|---|---|---|
| hsa-mir-29c | hsa-miR-29c-3p | 3.291516 | 0.004117 | 1 |
| hsa-mir-29c | hsa-miR-29c-5p | 3.181232 | 0.003832 | 1 |
| hsa-mir-582 | hsa-miR-582-5p | 3.157731 | 0.012213 | 1 |
| hsa-mir-5680 | hsa-miR-5680 | 2.543134 | 0.090018 | 1 |
| hsa-mir-500a | hsa-miR-500a-5p | 2.418366 | 0.036039 | 1 |
| hsa-mir-2277 | hsa-miR-2277-5p | 2.393392 | 0.067911 | 1 |
| hsa-mir-1-2 | hsa-miR-1-3p | 2.371696 | 0.077617 | 1 |
| hsa-mir-3653 | hsa-miR-3653-3p | 2.248527 | 0.049627 | 1 |
| hsa-mir-3651 | hsa-miR-3651 | 2.177202 | 0.064631 | 1 |
| hsa-mir-7-1 | hsa-miR-7-1-3p | 2.172073 | 0.079683 | 1 |

TABLE 13

Top 10 Down-regulated miRNAs in E1 vs. D1
(in order of increasing fold change)
BRC3A/BRC3 EXO

| Precursor id | miRNA | log2 Fold Change | pvalue | padj |
|---|---|---|---|---|
| hsa-mir-5000 | hsa-miR-5000-3p | -2.91283 | 0.016513 | 1 |
| hsa-mir-365b | hsa-miR-365b-5p | -2.43265 | 0.008775 | 1 |
| hsa-mir-1268a | hsa-miR-1268a | -2.39538 | 0.074862 | 1 |

TABLE 13-continued

Top 10 Down-regulated miRNAs in E1 vs. D1
(in order of increasing fold change)
BRC3A/BRC3 EXO

| Precursor id | miRNA | log2 Fold Change | pvalue | padj |
|---|---|---|---|---|
| hsa-mir-1268b | hsa-miR-1268b | −2.33643 | 0.093362 | 1 |
| hsa-mir-128-1 | hsa-miR-128-1-5p | −2.29152 | 0.050057 | 1 |
| hsa-mir-17 | hsa-miR-17-3p | −2.27629 | 0.065182 | 1 |
| hsa-mir-4449 | hsa-miR-4449 | −2.17279 | 0.070184 | 1 |
| hsa-mir-7976 | hsa-miR-7976 | −2.0448 | 0.087451 | 1 |
| hsa-mir-642a | hsa-miR-642a-3p | −1.98354 | 0.240152 | 1 |
| hsa-mir-5582 | hsa-miR-5582-3p | −1.82181 | 0.219667 | 1 |

TABLE 14

Top 10 Differentially Expressed miRNAs in F1 vs. A1
(in order of increasing p-values)
SRC/BRC0 EXO

| Precursor id | miRNA | log2 Fold Change | pvalue | padj |
|---|---|---|---|---|
| hsa-mir-204 | hsa-miR-204-5p | −4.66355 | 2.90E−09 | 1.39E−06 |
| hsa-mir-362 | hsa-miR-362-5p | 4.867464 | 2.31E−07 | 4.80E−05 |
| hsa-mir-192 | hsa-miR-192-5p | −2.34005 | 3.00E−07 | 4.80E−05 |
| hsa-mir-203a | hsa-miR-203a-3p | 3.94543 | 5.33E−06 | 0.000638 |
| hsa-mir-22 | hsa-miR-22-3p | 3.050149 | 1.63E−05 | 0.001488 |
| hsa-mir-574 | hsa-miR-574-3p | 3.232923 | 1.86E−05 | 0.001488 |
| hsa-mir-181b-2 | hsa-miR-181b-5p | 2.433367 | 5.62E−05 | 0.003843 |
| hsa-mir-1260b | hsa-miR-1260b | 3.370156 | 7.11E−05 | 0.004258 |
| hsa-mir-181b-1 | hsa-miR-181b-5p | 2.413852 | 9.42E−05 | 0.004735 |
| hsa-mir-363 | hsa-miR-363-3p | −3.42898 | 0.000101 | 0.004735 |

TABLE 15

Top 10 Up-regulated miRNAs in F1 vs. A1
(in order of decreasing fold change)
SRC/BRC0 EXO

| Precursor id | miRNA | log2 Fold Change | pvalue | padj |
|---|---|---|---|---|
| hsa-mir-1248 | hsa-miR-1248 | 5.98246 | 0.000109 | 0.004735 |
| hsa-mir-3168 | hsa-miR-3168 | 5.31601 | 0.001835 | 0.032096 |
| hsa-mir-362 | hsa-miR-362-5p | 4.867464 | 2.31E−07 | 4.80E−05 |
| hsa-mir-7113 | hsa-miR-7113-5p | 4.016855 | 0.003731 | 0.05415 |
| hsa-mir-203a | hsa-miR-203a-3p | 3.94543 | 5.33E−06 | 0.000638 |
| hsa-mir-758 | hsa-miR-758-3p | 3.857586 | 0.006731 | 0.078639 |
| hsa-mir-937 | hsa-miR-937-3p | 3.44296 | 0.005679 | 0.069752 |
| hsa-mir-1260b | hsa-miR-1260b | 3.370156 | 7.11E−05 | 0.004258 |
| hsa-mir-4455 | hsa-miR-4455 | 3.344144 | 0.02912 | NA |
| hsa-mir-4521 | hsa-miR-4521 | 3.287809 | 0.004999 | 0.064717 |

TABLE 16

Top 10 Down-regulated miRNAs in F1 vs. A1
(in order of increasing fold change)
SRC/BRC0 EXO

| Precursor id | miRNA | log2 Fold Change | pvalue | padj |
|---|---|---|---|---|
| hsa-mir-204 | hsa-miR-204-5p | −4.66355 | 2.90E−09 | 1.39E−06 |
| hsa-mir-1-2 | hsa-miR-1-3p | −3.98849 | 0.000843 | 0.018358 |
| hsa-mir-1-1 | hsa-miR-1-3p | −3.51065 | 0.004483 | 0.060499 |
| hsa-mir-363 | hsa-miR-363-3p | −3.42898 | 0.000101 | 0.004735 |
| hsa-mir-143 | hsa-miR-143-3p | −3.31279 | 0.000337 | 0.011515 |
| hsa-mir-150 | hsa-miR-150-5p | −3.16467 | 0.031217 | 0.228275 |
| hsa-mir-509-1 | hsa-miR-509-3p | −3.1211 | 0.043174 | 0.265132 |
| hsa-mir-509-2 | hsa-miR-509-3p | −3.1211 | 0.043174 | 0.265132 |
| hsa-mir-509-3 | hsa-miR-509-3p | −3.1211 | 0.043174 | 0.265132 |
| hsa-mir-653 | hsa-miR-653-5p | −2.9247 | 0.048203 | NA |

Figure 8:
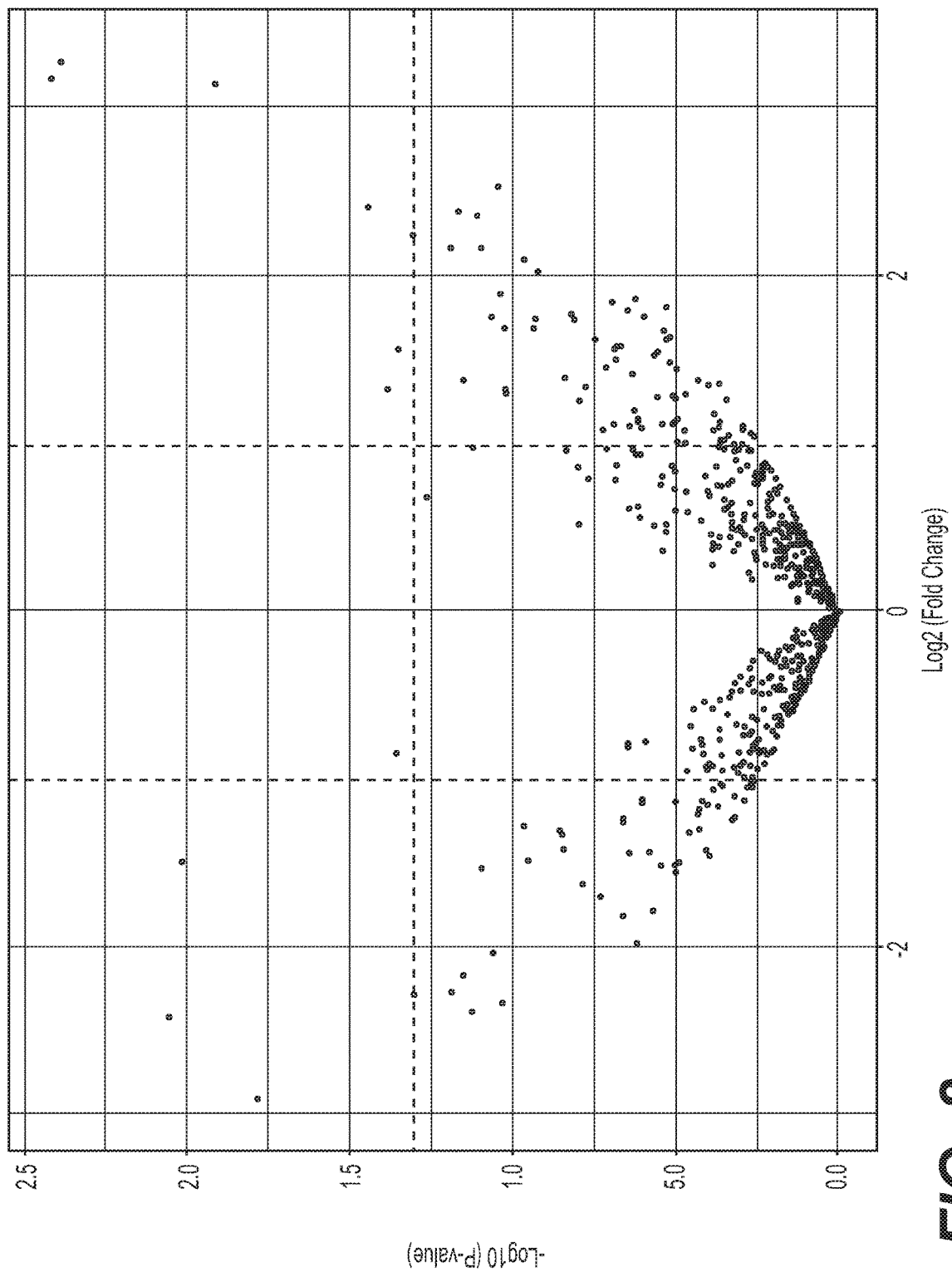
FIG. 8: miRNA groups that differ significantly between the pairs of experimental conditions E1 vs D1 are revealed in the volcano plot. The volcano plot shows the distribution of differentially expressed miRNAs according to fold-change (x-axis) and significance (negative logarithm of the P-value on the y-axis). The horizontal dotted line is the P-value cut-off (0.05), and the vertical dotted lines are the fold change cut-off ($|Log_2$ fold change$|\geq 1$). See also Tables 11-13.
Figure 9:
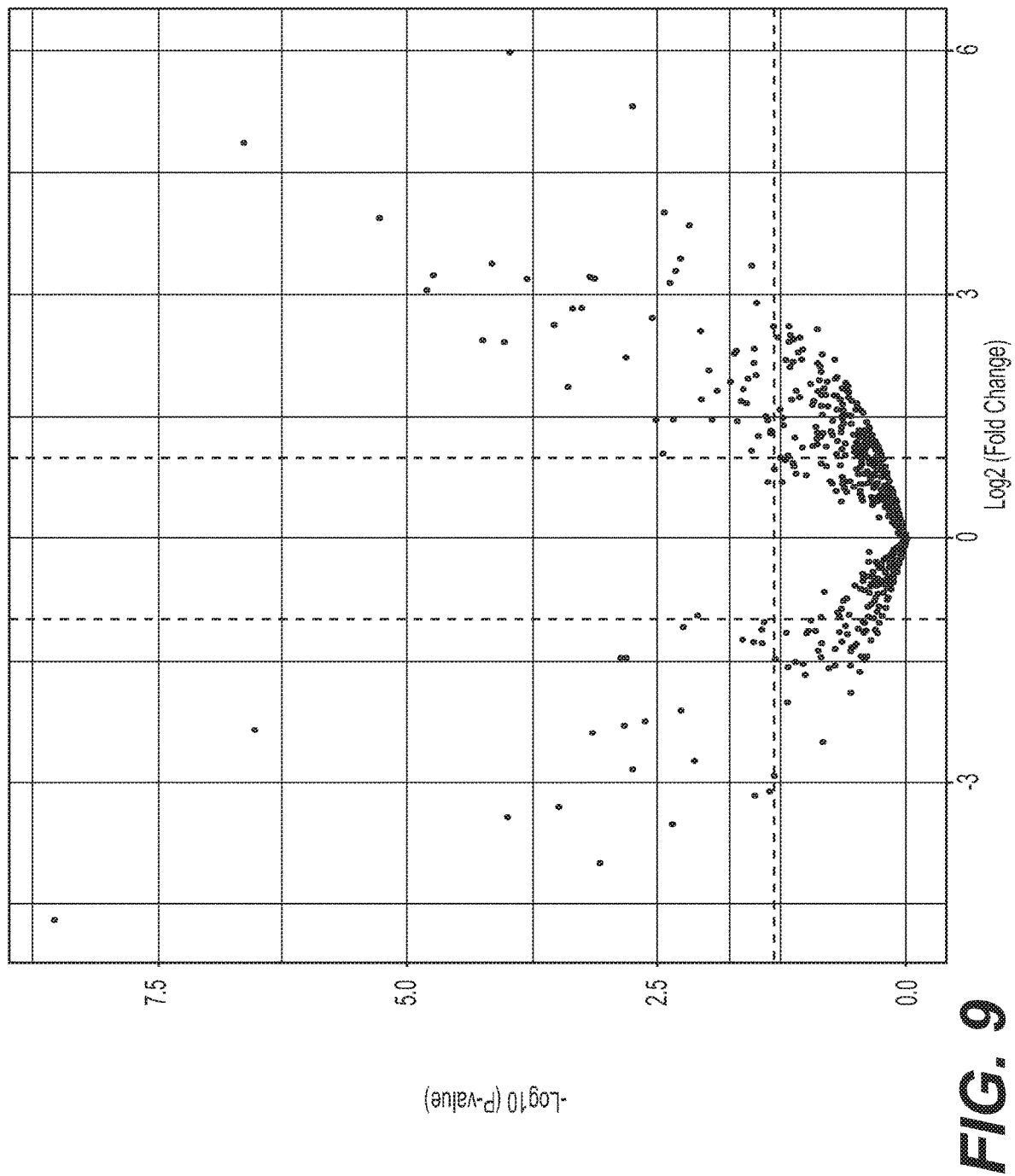
FIG. 9: miRNA groups that differ significantly between the pairs of the experimental conditions F1 vs A1 are revealed in the volcano plot. See also Tables 14-16.
Figure 10:
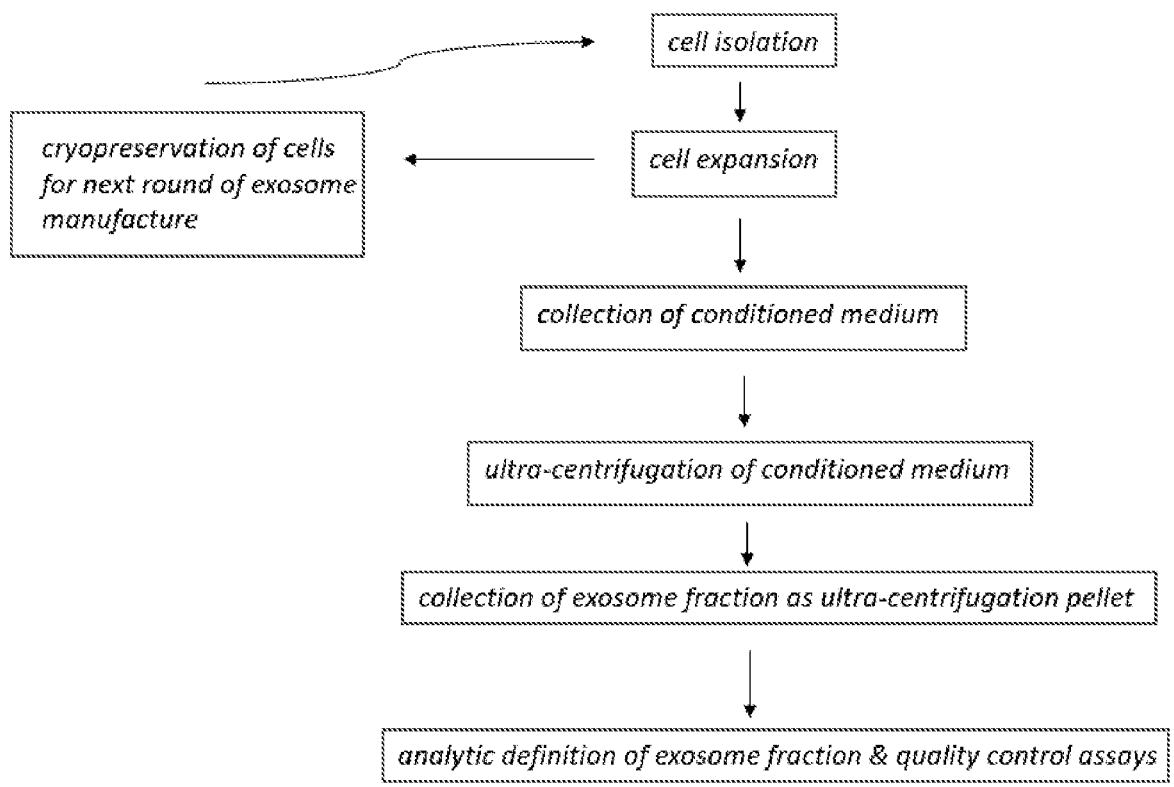
FIG. 10: Flow diagram of a non-limiting example of an exosome manufacturing process.

The miRNA groups that differ significantly between the pairs of experimental conditions E1 vs D1 are revealed in the volcano plot in FIG. 8. The miRNA groups that differ significantly between the pairs of experimental conditions F1 vs A1 are revealed in the volcano plot in FIG. 9.

What is claimed is:

1. A method for detecting whether a vesicle secreted by a renal cell is regenerative and for treatment of a renal disease in a subject with a vesicle preparation comprising the vesicle having been identified as regenerative, the method comprising:
    (i) obtaining the vesicle secreted by the renal cell;
    (ii) detecting whether at least one protein is upregulated in the vesicle compared to vesicles secreted by unpassaged primary renal cells,
        wherein the at least one protein is CD9, CD326, CD40, and/or CD49e;
    (iii) identifying the vesicle as regenerative if the at least one protein is upregulated in the vesicle; and
    (iv) administering to a subject in need of treatment for renal disease a vesicle preparation comprising an effective amount of the vesicle having been identified in (iii) as regenerative.

2. The method of claim 1, wherein the vesicle is obtained in or from a biological sample from a subject.

3. The method of claim 2, wherein the biological sample is urine.

4. The method of claim 1, wherein the vesicle is obtained in or from a supernatant of a culture of renal cells.

5. The method of claim 2, wherein the renal cell is a bioactive renal cell.

6. The method of claim 5, wherein the bioactive renal cell is a selected renal cell.

7. The method of claim 3, wherein the renal cell is a bioactive renal cell.

8. The method of claim 7, wherein the bioactive renal cell is a selected renal cell.

9. The method of claim 4, wherein the renal cells are bioactive renal cells.

10. The method of claim 9, wherein the bioactive renal cells are selected renal cells.

11. The method of claim 1, wherein the at least one protein is CD326 and/or CD49e.

12. The method of claim 1, wherein the vesicle is an exosome or a microvesicle.

13. A method for detecting whether a vesicle secreted by a renal cell is regenerative and for treatment of a renal disease in a subject with a vesicle preparation comprising the vesicle having been identified as regenerative, the method comprising:
    (i) obtaining the vesicle secreted by the renal cell;
    (ii) detecting whether at least one protein is downregulated in the vesicle compared to vesicles secreted by unpassaged primary renal cells,
        wherein the at least one protein is CD42a, and/or SSEA-4;

(iii) identifying the vesicle as regenerative if the at least one protein is downregulated in the vesicle; and (iv) administering to a subject in need of treatment for renal disease a vesicle preparation comprising an effective amount of the vesicle having been identified in (iii) as regenerative.

14. The method of claim 13, wherein the vesicle is obtained in or from a biological sample from a subject.

15. The method of claim 14, wherein the biological sample is urine.

16. The method of claim 13, wherein the vesicle is obtained in or from a supernatant of a culture of renal cells.

17. The method of claim 14, wherein the renal cell is a bioactive renal cell.

18. The method of claim 17, wherein the bioactive renal cell is a selected renal cell.

19. The method of claim 15, wherein the renal cell is a bioactive renal cell.

20. The method of claim 19, wherein the bioactive renal cell is a selected renal cell.

21. The method of claim 16, wherein the renal cells are bioactive renal cells.

22. The method of claim 21, wherein the bioactive renal cells are selected renal cells.

23. The method of claim 13, wherein the vesicle is an exosome or a microvesicle.

* * * * *